(12) United States Patent
Takahashi et al.

(10) Patent No.: US 10,147,973 B2
(45) Date of Patent: Dec. 4, 2018

(54) BATTERY, BATTERY PACK, ELECTRONIC DEVICE, ELECTRIC VEHICLE, ELECTRICITY STORAGE DEVICE, AND POWER SYSTEM

(71) Applicant: Sony Corporation, Tokyo (JP)

(72) Inventors: Hidetoshi Takahashi, Fukushima (JP); Kazutaka Mita, Fukushima (JP); Shoichi Nishiyama, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 37 days.

(21) Appl. No.: 15/517,041

(22) PCT Filed: Jun. 2, 2016

(86) PCT No.: PCT/JP2016/002673
§ 371 (c)(1),
(2) Date: Apr. 5, 2017

(87) PCT Pub. No.: WO2016/199384
PCT Pub. Date: Dec. 15, 2016

(65) Prior Publication Data
US 2017/0301959 A1    Oct. 19, 2017

(30) Foreign Application Priority Data

Jun. 9, 2015   (JP) ................................ 2015-116252
Oct. 28, 2015  (JP) ................................ 2015-211519
Feb. 16, 2016  (JP) ................................ 2016-026762

(51) Int. Cl.
*H02J 7/00*     (2006.01)
*H01M 10/0587*  (2010.01)
(Continued)

(52) U.S. Cl.
CPC ..... *H01M 10/0587* (2013.01); *H01M 2/1072* (2013.01); *H01M 2/263* (2013.01);
(Continued)

(58) Field of Classification Search
CPC .............. H02J 7/0031; H02J 2007/004; H02J 2007/0037; Y02E 60/12; H01M 10/48
(Continued)

(56) References Cited

U.S. PATENT DOCUMENTS 5,834,133 A * 11/1998 Narukawa ........... H01M 2/0426
                                                    429/171
2002/0150815 A1* 10/2002 Ehara .................. H01M 2/1061
                                                    429/90
(Continued)

FOREIGN PATENT DOCUMENTS

JP    H11-176478 A    2/1999
JP    H11-176478 A    7/1999
(Continued)

OTHER PUBLICATIONS

International Search Report (with English translation) dated Aug. 23, 2016 in corresponding international application No. PCT/JP2016/002673 (5 pages).
(Continued)

*Primary Examiner* — Arun Williams
(74) *Attorney, Agent, or Firm* — K&L Gates LLP

(57) ABSTRACT

Provided is a battery in which a positive electrode and a negative electrode, to which electrode composite materials are seamlessly applied, are wound and accommodated in an exterior member, the battery having a part where foil exposed surfaces of the positive electrode and the negative electrode face each other with an insulator therebetween, the foil exposed surfaces being formed at one-side application parts on an outer side of the winding of the respective electrodes.

19 Claims, 26 Drawing Sheets

(51) Int. Cl.
- *H01M 2/10* (2006.01)
- *H01M 10/0525* (2010.01)
- *H01M 10/42* (2006.01)
- *H01M 10/44* (2006.01)
- *H01M 2/26* (2006.01)
- *H01M 10/04* (2006.01)
- *H01M 10/052* (2010.01)
- *B60L 11/18* (2006.01)

(52) U.S. Cl.
CPC ..... *H01M 10/0431* (2013.01); *H01M 10/052* (2013.01); *H01M 10/0525* (2013.01); *H01M 10/425* (2013.01); *H01M 10/44* (2013.01); *H02J 7/007* (2013.01); *H02J 7/0011* (2013.01); *B60L 11/1861* (2013.01); *H01M 2010/4271* (2013.01); *H01M 2010/4278* (2013.01); *H01M 2220/20* (2013.01); *H02J 2007/0096* (2013.01); *Y02E 60/122* (2013.01)

(58) Field of Classification Search
USPC .......................................................... 320/134
See application file for complete search history.

(56) References Cited

U.S. PATENT DOCUMENTS

| | | | | |
|---|---|---|---|---|
| 2005/0221173 A1* | 10/2005 | Tatebayashi | .......... | H01M 2/263 429/161 |
| 2007/0096688 A1* | 5/2007 | Suzuki | .................. | H01M 2/021 320/112 |
| 2007/0160904 A1* | 7/2007 | Uh | ...................... | H01M 2/0207 429/174 |
| 2007/0231685 A1* | 10/2007 | Takeuchi | ............ | H01M 2/0275 429/163 |
| 2009/0053592 A1* | 2/2009 | Mino | .................... | H01M 2/263 429/161 |
| 2010/0081052 A1* | 4/2010 | Morishima | ........... | H01M 2/263 429/211 |
| 2010/0216016 A1* | 8/2010 | Seino | .................... | H01M 2/021 429/185 |
| 2013/0071726 A1* | 3/2013 | Kim | ...................... | H01M 2/043 429/179 |
| 2013/0244073 A1 | 9/2013 | Fujimoto et al. | | |
| 2014/0356695 A1 | 12/2014 | Abe et al. | | |

FOREIGN PATENT DOCUMENTS

| | | |
|---|---|---|
| JP | 2003-331924 A | 11/2003 |
| JP | 2006-222077 A | 8/2006 |
| JP | 2007-109612 A | 4/2007 |
| JP | 2010-049967 A | 4/2010 |
| JP | 2014-235855 A | 12/2014 |
| WO | 2013/136461 A1 | 9/2013 |

OTHER PUBLICATIONS

Written Opinion dated Aug. 23, 2016 in corresponding international application No. PCT/JP2016/002673 (7 pages).
Japanese Office Action dated Sep. 12, 2017 in corresponding Japanese patent application No. 2017-501051.
Japan Patent Office, Office Action for Japanese Patent Application No. 2017-501051, dated May 30, 2017 (3 pages).

* cited by examiner

A

WOUND FOIL STRUCTURE 11a 12a 11a 11b

B 5  3 3  3  1
 2a 1a 2  1

ONE-SIDE FOIL-FOIL STRUCTURE (1)

11a 12a 12b    11b

ONE-SIDE FOIL-FOIL STRUCTURE (2)

11b 11a 12b 12a

ONE-SIDE FOIL-WOUND STRUCTURE (2)

ONE-SIDE FOIL-WOUND STRUCTURE (Y > X) EXAMPLE 11

ONE-SIDE FOIL-WOUND STRUCTURE (Y > X) EXAMPLE 13

A

B

A

B

A

B

C

A

B

BATTERY, BATTERY PACK, ELECTRONIC DEVICE, ELECTRIC VEHICLE, ELECTRICITY STORAGE DEVICE, AND POWER SYSTEM

CROSS-REFERENCE TO RELATED APPLICATIONS

The present application claims the benefit of International Application No. PCT/JP2016/002673, filed Jun. 2, 2016, which claims priority to Japanese Application No. 2016-026762, filed Feb. 16, 2016, and claims priority to Japanese Application No. 2015-211519, filed Oct. 28, 2015, and claims priority to Japanese Application No. 2015-116252, filed Jun. 9, 2015, the disclosures of which are incorporated herein by reference.

BACKGROUND

The present technology relates to a battery, a battery pack, an electronic device, an electric vehicle, an electricity storage device, and a power system in which electrodes to which electrode composite materials are applied are wound and accommodated in a laminate exterior member.

The energy density of a battery can be improved by decreasing the proportion of members that are not involved in charging and discharging inside a battery pack. If, however, the thickness of foil or a separator is reduced, the safety against nail penetration is lowered. Thus, in order to obtain a battery where the safety is secured, the thicknesses of such members need to be maintained at certain thickness or larger.

A structure in which a positive electrode current collector and a negative electrode current collector on which no active material containing coating film is formed are arranged with a separator therebetween on an outermost periphery of a battery having a wound structure (hereinafter referred to as a "wound foil structure") has been proposed (refer to Patent Document 1, for example).

CITATION LIST

Patent Document

Patent Document 1: Japanese Patent Application Laid-Open No. H11-176478

SUMMARY

Problems to be Solved by the Invention

The battery disclosed in Patent Document 1 is a cylindrical battery, which has a structure different from that of a battery covered by an exterior material like a laminated film. Furthermore, when a battery of the wound foil structure is actually produced, safety is improved as compared to a case where the positive and negative electrode current collectors are not provided in the outermost periphery, but the volumes of the current collectors that do not contributed to charge and discharge are increased in the outermost periphery, which causes a problem of lower energy density.

An object of the present technology is to provide a battery, a battery pack, an electronic device, an electric vehicle, an electricity storage device, and a power system capable of achieving higher energy density than conventional wound foil structures while maintaining safety.

Solutions to Problems

To solve the aforementioned problems, the present technology provides a battery including a wound electrode element in which a positive electrode and a negative electrode are wound with a separator therebetween, wherein the positive electrode has a positive electrode active material layer formed on a first face of a positive electrode current collector in an outer periphery of the wound electrode element, and has a first exposed surface where no positive electrode active material layer is formed on a second face of the positive electrode current collector, the negative electrode has a negative electrode active material layer formed on a first face of a negative electrode current collector in an outer periphery of the wound electrode element, and has a second exposed surface where no negative electrode active material layer is formed on a second face of the negative electrode current collector, and the first and second exposed surfaces face each other with the separator therebetween.

The present technology provides a battery including a wound electrode element in which a positive electrode and a negative electrode are wound with a separator therebetween, wherein the positive electrode has a positive electrode active material layer formed on a first face of a positive electrode current collector in an outer periphery of the wound electrode element, and has a first exposed surface where no positive electrode active material layer is formed on a second face of the positive electrode current collector, and the first exposed surface faces an area of a negative electrode current collector with the separator between the first exposed surface and the area, the area being an area where no negative electrode active material layer is provided on both faces of the negative electrode current collector.

The present technology provides a battery including a wound electrode element in which a positive electrode and a negative electrode are wound with a separator therebetween, wherein the negative electrode has a negative electrode active material layer formed on a first face of a negative electrode current collector in an outer periphery of the wound electrode element, and has a second exposed surface where no negative electrode active material layer is formed on a second face of the negative electrode current collector, and the second exposed surface faces an area of a positive electrode current collector with the separator between the second exposed surface and the area, the area being an area where no positive electrode active material layer is provided on both faces of the positive electrode current collector.

A battery pack, an electronic device, an electric vehicle, an electricity storage device, and a power system of the present technology include the battery described above.

Effects of the Invention

According to at least one embodiment, since a rear face of a current collector exposed surface is coated with an electrode active material layer and thus has functions as a battery, energy density is increased while the safety is secured. Note that the effects of the present technology are not limited to those stated here but may include any effect mentioned in relation to the present technology.

DETAILED DESCRIPTION

The following is a description of embodiments of the present technology. It should be noted that the embodiments described below are preferred specific examples of the present technology with various technically-preferred limitations; the scope of the present technology, however, is not limited to these embodiments unless particular limitation of the present technology is provided in the following description.

The present technology will be described in the following order.

<1. Example of battery>
<2. Embodiment of present technology>
<3. Applications>
<4. Modifications>

1. Example of Battery

Figure 1:
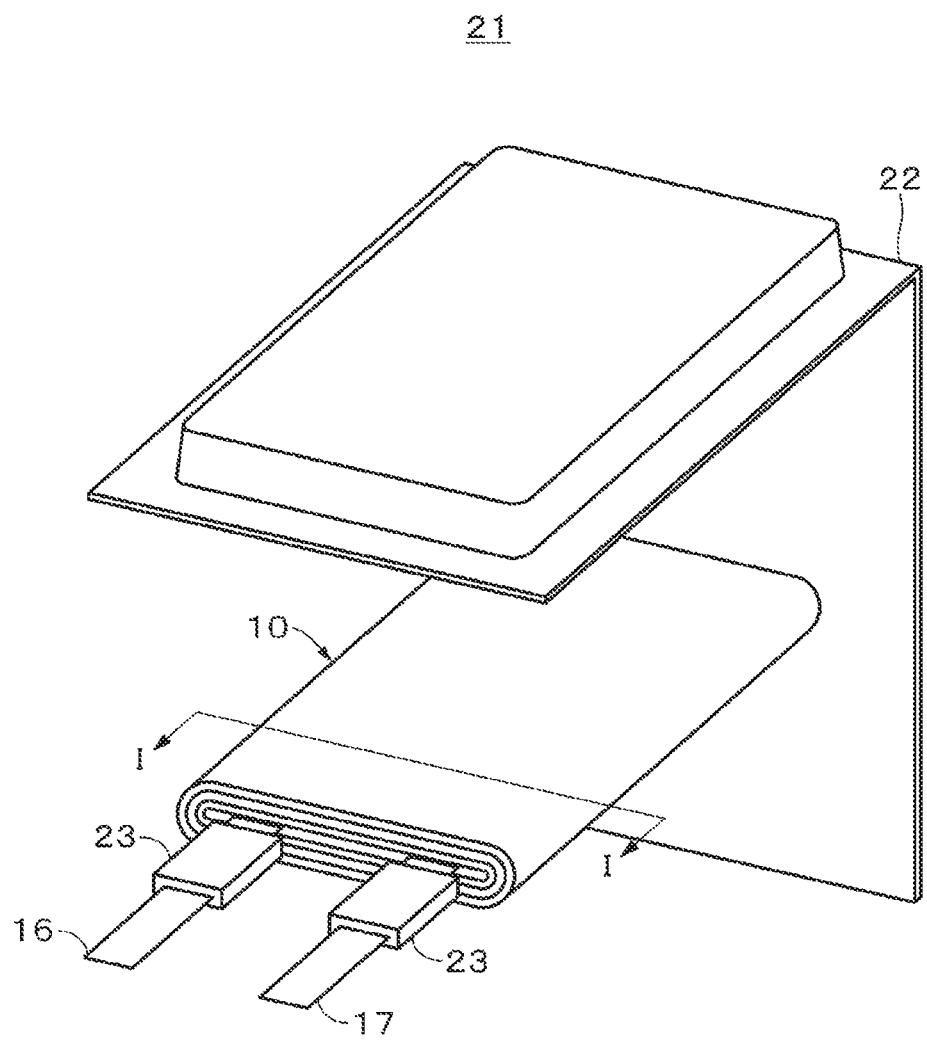
FIG. 1 is a perspective view for explaining a battery to which the present technology is applicable.

An example of a laminated film type battery to which the present technology is applicable will now be described (refer to Japanese Patent Application Laid-Open No. 2001-266946, for example). The present technology relates to a battery obtained by winding positive and negative electrodes to which electrode active material layers are seamlessly applied and accommodating the wound electrodes in an exterior member. FIG. 1 illustrates a configuration of a non-aqueous electrolyte battery 21. The non-aqueous electrolyte battery 21 includes a wound electrode element 10 contained inside a film exterior member 22 with an electrolyte (not illustrated).

The exterior member 22 is made of a laminated film having a metal layer and plastic layers on both sides of the metal layer. The laminated film has an outer plastic layer formed on a surface of the metal layer exposed to the outside of the battery, and an inner plastic layer formed on an inner surface of the battery facing power generation elements such as the wound electrode element 10. The metal layer serves the most important function of preventing entrance of moisture, oxygen and light to protect the elements contained, and is preferably made of aluminum (Al) or stainless steel for reasons of lightness, extensibility, low price, and easiness of processing. For the outer plastic layer, a plastic material that is good in external appearance, tough, flexible, and so on, such as nylon or polyethylene terephthalate (PET), is used. Since the inner plastic layer has portions melted by heat or ultrasonic waves and bonded with each other, polyolefin resin is suitable therefor and non-stretched polypropylene (CPP) is often used therefor. Adhesive layers may be provided between the metal layer and the outer plastic layer and between the metal layer and the inner plastic layer where necessary.

The exterior member 22 has a recess for accommodating the wound electrode element 10, the recess being formed from the inner plastic layer side toward the outer plastic layer side by deep drawing, for example, and the inner plastic layer facing the wound electrode element 10. The inner plastic layers of the exterior member 22 facing each other are adhered to each other at an outer edge of the recess by fusion or the like. Adhesion films 23 are provided between the exterior member 22 and the positive electrode lead 16 and between the exterior member 22 and the negative electrode lead 17, to improve adhesion between the inner plastic layer of the exterior member 22 and the positive electrode lead 16 made of a metal material, and between the inner plastic layer of the exterior member 22 and the negative electrode lead 17 made of a metal material.

Figure 2:
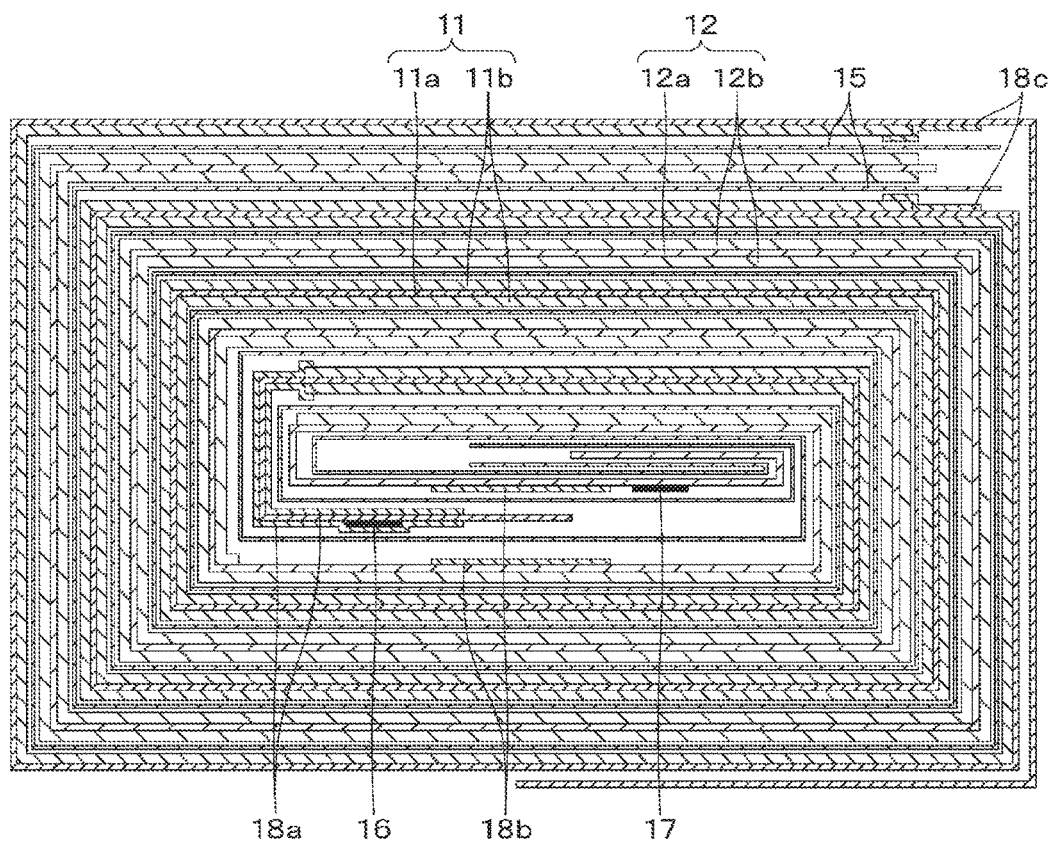
FIG. 2 is a cross-sectional view used for explanation of a wound electrode element.

An example of the wound electrode element 10 will now be described with reference to FIG. 2. FIG. 2 illustrates a cross-sectional structure along line I-I of the wound electrode element 10 illustrated in FIG. 1. The wound electrode element 10 is obtained by stacking a positive electrode 11 and a negative electrode 12 with a separator 15 therebetween, and winding the resulting stacked structure. The outermost periphery of the resulting wound structure is protected with a protective tape where necessary. The wound electrode element 10 has a structure formed by stacking the positive electrode 11, the separator 15, and the negative electrode 12, winding the resulting stacked structure a plurality of times so that the area occupied by the wound electrode element 10 becomes small, and compressing the resulting wound structure. The wound electrode element 10 further has, as an internal main structure, an electrode lead (positive electrode lead) 16 on the positive electrode side, an electrode lead (negative electrode lead) 17 on the negative electrode side, and coating materials 18a, 18b, and 18c.

The positive electrode 11 has a positive electrode current collector 11a and positive electrode active material layers 11b formed on both faces of the positive electrode current collector 11a. Note that the positive electrode 11 may have a portion where a positive electrode active material layer 11b is formed only on one face of the positive electrode current collector 11a. The positive electrode 11 is formed by coating a metal foil electrode, obtained by cutting a rolled aluminum foil into a predetermined outside dimension, with a positive electrode active material. The rolled aluminum foil is used because the rolled aluminum foil has suitable characteristics for a positive electrode such as good conductivity and chemical properties, good processability in winding, lightness and inexpensiveness.

The negative electrode 12 has a negative electrode current collector 12a, and negative electrode active material layers 12b formed on both faces of the negative electrode current collector 12a. Note that the negative electrode 12 may have a portion where a negative electrode active material layer 12b is formed only on one face of the negative electrode current collector 12a. The negative electrode 12 is formed by coating a metal electrode, obtained by cutting a rolled copper foil into a predetermined dimension, with a negative electrode active material, for substantially the similar reasons as above positive electrode 11.

The electrode lead 16 on the positive electrode side and the electrode lead 17 on the negative electrode side are both for extracting electromotive force generated by the stacked structure to the outside. The electrode lead 16 is formed of a thin aluminum alloy plate or the like having good conductivity and resistance to chemical reactions inside the stacked structure.

For the electrolyte, a liquid electrolyte (that is, an electrolytic solution), a gel electrolyte, or a solid electrolyte can be used. In a case where the electrolyte is an electrolytic solution, the inside of the exterior member 22 is filled with the electrolytic solution, and the wound electrode element 10 is impregnated with the electrolytic solution with which the inside of the exterior member 22 is filled. In a case where the electrolyte is a gel electrolyte or a solid electrolyte, the electrolyte is provided between at least one of the positive electrode 11 and the negative electrode 12 and the separator 15. In this case, the wound electrode element 10 has a structure in which the positive electrode 11 and the negative electrode 12 are stacked with the separator 15 and a layer of the electrolyte therebetween and the resulting stacked structure is wound. In this case, the separator 15 may be omitted.

The electrolytic solution is a non-aqueous electrolytic solution containing a non-aqueous solvent and an electrolyte salt dissolved in the solvent, for example. The gel electrolyte is gelatinous, which has electrochemical characteristics suitable for electrolyte layers for the respective electrodes, does not turn into liquid and leak, and is tolerant of bending and warping. A suitable electrolyte that satisfies such characteristics is an electrolyte in which an electrolytic solution is uniformly dispersed in a polymer matrix, for example. The solid electrolyte is a solid polymer electrolyte having an ion conducting polymer, a solid inorganic electrolyte having an ion conducting inorganic material, or the like, for example.

The separator 15 is made of a material preventing electric contact between the positive electrode 11 and the negative electrode 12 and allowing ions to move sufficiently freely in practice between the positive electrode 11 and the negative electrode 12, and microporous polypropylene or the like is suitable, for example.

The coating materials 18a, 18b, and 18c provided at respective positions are each made of an insulating material (such as an insulating polymer material, for example) that electrically insulates one electrode from the other even when a pressing force is externally applied to the stacked structure causing the electrodes to come close to each other or when a cutting burr is present at an end of the positive electrode current collector 11a or the negative electrode current collector 12a. In addition, the coating materials 18a, 18b, and 18c have a thickness and a material having a mechanical strength with which the coating materials 18a, 18b, and 18c are not torn or broken even when one electrode is deformed by such application of a pressing force and brought into contact with the other electrode. The coating materials 18a, 18b, and 18c are formed by adhering insulating tapes such as tapes made of polyimide or polypropylene, for example, at the corresponding positions.

Note that no coating material is provided at an end where the electrode lead 17 on the negative electrode 12 is connected. This is because only parts of the negative electrode 12 face each other with the separator 15 therebetween at this end as illustrated in FIG. 1, and short circuit over such a short distance that is negligible, if any, has little substantial adverse effect on electromotive capacity of a battery.

Examples of the materials for the components of the battery as described above will be described in more detail.

[Positive Electrode Active Material]

For a positive electrode material capable of occluding and releasing lithium, a lithium-containing compound is preferable, for example. This is because a high energy density will be achieved. Examples of the lithium-containing compound include a composite oxide containing lithium and a transition metal element, and a phosphate compound containing lithium and a transition metal element. Among others, a lithium-containing compound containing at least one transition metal element selected from a group consisting of cobalt (Co), nickel (Ni), manganese (Mn), and iron (Fe) is preferable. This is because a relatively higher voltage will be achieved.

Examples of the composite oxide containing lithium and a transition metal element include lithium-cobalt composite oxide ($Li_xCoO_2$), lithium-nickel composite oxide ($Li_xNiO_2$), lithium-nickel-cobalt composite oxide ($Li_xNi_{1-z}Co_zO_2$ (0<z<1)), lithium-nickel-cobalt-manganese composite oxide ($Li_xNi_{(1-v-w)}Co_vMn_wO_2$ (0<v+w<1, v>0, w>0)), and lithium-manganese composite oxide ($LiMn_2O_4$) and lithium-manganese-nickel composite oxide ($LiMn_{2-t}Ni_tO_4$ (0<t<2)) having a spinel structure. Among others, a composite oxide containing cobalt is preferable. This is because a high capacity will be achieved and excellent cycle characteristics will be achieved. In addition, examples of the phosphate compound containing lithium and a transition metal element include a lithium-iron-phosphate compound ($LiFePO_4$) or lithium-iron-manganese phosphate compound ($LiFe_{1-u}Mn_uPO_4$ (0<u<1)), and $LixFe_{1-y}M2_yPO_4$ (in this formula, M2 represents at least one selected from a group consisting of manganese (Mn), nickel (Ni), cobalt (Co), zinc (Zn), and magnesium (Mg); x represents a value within a range of 0.9<x≤1.1.

In addition, examples of the positive electrode material capable of occluding and releasing lithium include oxides such as vanadium oxide ($V_2O_5$), titanium dioxide ($TiO_2$), and manganese dioxide ($MnO_2$), disulfides such as iron disulfide ($FeS_2$), titanium disulfide ($TiS_2$), and molybdenum disulfide ($MoS_2$), chalcogenides not containing lithium (in particular, layered compounds and spinel compounds) such as niobium diselenide ($NbSe_2$), lithium-containing compounds containing lithium, and conductive polymers such as sulfur, polyaniline, polythiophene, polyacetylene or polypyrrole. Needless to say, the positive electrode material capable of occluding and releasing lithium may be other than the above. Furthermore, two or more of the positive electrode materials mentioned above may be mixed in any combination.

[Negative Electrode Active Material]

The negative electrode active material layers contain, as a negative electrode active material, any one or more of negative electrode materials capable of occluding and releasing lithium, and may also contain other materials such as a binder and a conductive agent where necessary. In this case, the capacity chargeable by the negative electrode materials capable of occluding and releasing lithium is preferably larger than the discharge capacity of the positive electrode. Examples of the negative electrode materials capable of occluding and releasing lithium include a carbon material. Examples of the carbon material include easily graphitizable carbon, hardly graphitizable carbon having an interplanar spacing of a (002) plane of 0.37 nm or larger, and graphite having an interplanar spacing of a (002) plane of 0.34 nm or smaller. More specifically, the examples include pyrolytic carbon, coke, glassy carbon fiber, an organic polymer compound fired body, activated carbon, and carbon black. Among the above, examples of the coke include pitch coke, needle coke, and petroleum coke. The organic polymer compound fired body refers to a carbonized material obtained by firing a phenol resin, a furan resin or the like at an appropriate temperature. The carbon material is preferable because its crystal structure is changed very little by lithium occlusion and release and thus a high energy density and excellent cycle characteristics are achieved, and further because the carbon material also functions as a conductive agent. Note that the shape of the carbon material may be any of fiber, spheres, granules, and scales.

In addition to the carbon material mentioned above, examples of the negative electrode materials capable of occluding and releasing lithium include a material capable of occluding and releasing lithium and containing at least one of metal elements and metalloid elements as a constituent element. This is because a high energy density will be achieved. Such a negative electrode material may be a single metal element or metalloid element, an alloy thereof, or a compound thereof, or may partially contain phases of one or more of the metal elements and the metalloid elements. Note that an "alloy" in the present invention includes, in addition to an alloy made of two or more metal elements, an alloy containing one or more metal elements and one or more metalloid elements. In addition, an "alloy" may contain a non-metal element. Examples of a structure thereof include a solid solution, a eutectic (eutectic mixture), an intermetallic compound, and coexistence of two or more kinds thereof.

Examples of the metal elements and the metalloid elements described above include a metal element and a metalloid element capable of forming an alloy with lithium. Specifically, examples of the metal elements and the metalloid elements include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Among others, at least one of silicon and tin is preferable, and silicon is more preferable. This is because these elements are highly capable of occluding and releasing lithium and thus a high energy density will be achieved.

Examples of the negative electrode materials having at least one of silicon (Si) and tin (Sn) include a single silicon element, alloys thereof, and compounds thereof, a single tin element, alloys thereof, and compounds thereof, and materials partially contain phases of one or more of them.

Examples of alloys of silicon include alloys containing, as a second constituent element other than silicon, at least one selected from a group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of alloys of tin include alloys containing, as a second constituent element other than tin (Sn), at least one selected from a group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of compounds of tin and compounds of silicon include compounds containing oxygen (O) or carbon (C), and may contain the second constituent elements mentioned above in addition to tin (Sn) or silicon (Si).

In particular, for the negative electrode material containing at least one of silicon (Si) and tin (Sn), a material containing tin (Sn) as a first constituent element, and containing a second constituent element and a third constituent element in addition to tin (Sn) is preferable, for example. Needless to say, this negative electrode material may be used with the negative electrode materials mentioned above. The second constituent element at least one selected from a group consisting of cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cerium (Ce), hafnium (Hf), tantalum (Ta), tungsten (W), bismuth (Bi), and silicon (Si). The third constituent element is at least one selected from a group consisting of boron (B), carbon (C), aluminum (Al), and phosphorus (P). This is because the cycle characteristics will be improved with the second element and the third element contained.

Among others, a CoSnC-containing material containing tin (Sn), cobalt (Co), and carbon (C) as constituent elements, in which the content of carbon (C) is within a range from 9.9% by mass to 29.7% and the ratio (Co/(Sn+Co)) of cobalt (Co) to a total of (Sn) and cobalt (Co) is within a range from 30% by mass to 70% by mass, is preferable. This is because a high capacity will be achieved and excellent cycle characteristics will be achieved within these composition ranges. The SnCoC-containing material may further contain another constituent element where necessary.

For the additional constituent element, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), and bismuth (Bi) are preferable, for example, and two or more of them may be contained. This is because capacitance characteristics or cycle characteristics will be further improved. Note that the SnCoC-containing material preferably has a phase containing tin (Sn), cobalt (Co), and carbon (C), and the phase preferably has a low crystalline structure or an amorphous structure. In addition, in the SnCoC-containing material, at least part of carbon that is a constituent element is preferably bonded to a metal element or a metalloid element that is another constituent element. This is because decrease in cycle characteristics is considered to be due to aggregation or crystallization of tin (Sn) or the like, and such aggregation or crystallization is reduced by bonding of carbon to other elements.

[Binder]

A binder contains any one or more of synthetic rubbers, polymer materials, and the like, for example. Examples of the synthetic rubbers include styrene-butadiene rubber, fluoro-rubber, and ethylene propylene diene. Examples of the polymer materials include polyvinylidene fluoride and polyimide.

[Conductive Agent]

A conductive agent contains any one or more of carbon materials and the like, for example. Examples of the carbon materials include graphite, carbon black, acetylene black, and Ketjen black. Note that the conductive agent may be a metal material, a conductive polymer, or the like that is conductive.

[Separator]

A separator has functions of isolating the positive electrode and the negative electrode from each other and allowing lithium ions to pass therethrough while preventing short circuit of current caused by contact between the electrodes, and can be made of a of synthetic resin, ceramic, or the like. Furthermore, for securing the safety of a lithium ion battery, the separator can have a shut-down function. The shut-down function used herein refers to a function of closing pores of a microporous film to shut off current when the temperature of the battery has risen, which serves to prevent thermal runaway of the battery. Examples of materials having all of these functions include polyolefin, and a microporous polyethylene film.

Depending on the battery design, the battery may become further higher in temperature after shut-down, the separator may be melted, and short circuit may occur inside the battery, which may cause smoke and ignition, or the like. Thus, technologies of coating one face or both faces of the microporous polyethylene film with a heat-resistant porous layer, stacking a non-woven fabric layer made of heat-resistant fiber on one or both faces, and making these layers contain ceramic powder are proposed. For example, a non-aqueous electrolyte battery separator in which a heat-resistant porous layer made of a heat-resistance polymer such as aromatic aramide, polyimide, or polyvinylidene fluoride is stacked on one or both faces of a microporous polyethylene film by a wet coating method is known, and this separator may be used. For forming the polymer compound layer, a base layer may be coated with a solution in which a polymer material is dissolved and then dried, or a base layer may be immersed in the solution and then dried, for example.

[Electrolytic Solution]

The electrolytic solution contains a solvent and an electrolyte salt.

Examples of the solvent include ethylene carbonate (EC), propylene carbonate (PC), butylene carbonate, dimethyl carbonate, diethyl carbonate, ethylmethyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3 dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxy acetonitrile, 3-methoxy propylonitrile, N,N-dimethylformamide, N-methylpyrrolidinone, N-methyl-oxazolidinone, N,N'-dimethyl imidazolidinone, nitromethane, nitroethane, sulfolane, trimethyl phosphate, and dimethyl sulfoxide. This is because excellent capacity, cycle characteristics and storage characteristics will be achieved when the electrolytic solution is used in an electrochemical device such as a battery. These solvents may be used alone or two or more of them may be mixed to be used. Among others, the solvent is preferably a solvent containing at least one selected from a group consisting of ethylene carbonate, propylene carbonate, dimethyl carbonate, diethyl carbonate, and ethylmethyl carbonate. This is because a sufficient effect will be produced. In this case, in particular, a solvent containing a mixture of ethylene carbonate or a propylene carbonate, which is a high-viscosity (high-permittivity) solvent (relative permittivity $\epsilon r \geq 30$, for example), and dimethyl carbonate, diethyl carbonate, or ethylmethyl carbonate, which is a low-viscosity solvent (viscosity $\leq 1$ mPa·s, for example) is preferable. This is because the dissociation of the electrolyte salt and the mobility of ions will increase and a greater effect will thus be produced. Note that the solvent may be of a material other than those mentioned above.

The electrolyte salt contains one or more light metal salts such as a lithium salt, for example. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Among other, at least one selected from a group consisting of lithium hexafluorophosphate, lithium tetrafluoroborate, lithium perchlorate, and lithium hexafluoroarsenate is preferable, and lithium hexafluorophosphate is more preferable. This is because the resistance of electrolytic solution will be lowered. Note that the electrolyte salt may be of a material other than those mentioned above.

Alternatively, a solution obtained by gelating the aforementioned electrolytic solution by a matrix polymer may be used. The matrix polymer may be any matrix polymer that is compatible with an electrolytic solution obtained by dissolving the electrolyte salt in the solvent and that can be gelated. Examples of such a matrix polymer include polymers including vinylidene fluoride (VdF), ethylene oxide (EO), propylene oxide (PO), acrylonitrile (AN), or methacrylonitrile (MAN) as repeating units. A single polymer among such polymers may be used alone or two or more among them may be mixed to be used. A gel electrolyte is preferable because a high ionic conductivity (1 mS/cm or higher at room temperature, for example) will be achieved and leakage will be prevented. In addition, the electrolytic solution may contain a metal oxide.

Next, an outline of a method for manufacturing the lithium ion secondary battery will be explained particularly focusing on a process of forming the coating materials and a process of applying a pressing force to the stacked structure.

As described above, the positive electrode 11 having an electrode application part to which the gel electrolyte is applied, the separator 15, and the negative electrode 12 having an electrode application part to which the gel electrolyte is applied are stacked, the electrode lead 16 on the positive electrode side is connected to the positive electrode 11, the electrode lead 17 on the negative electrode side is connected to the negative electrode 12, so that a stacked structure having a flat shape before being wound is formed.

Then, before the stacked structure is wound spirally, the coating material 18a, which is made of an insulating tape such as a polyethylene terephthalate (PET), polypropylene (PP), or polyimide (PI) tape to cover over a surface of the electrode lead 16 on the positive electrode side and which has insulating properties and mechanical strength, is adhered to a part, facing the negative electrode current collector, of a current collector exposed surface of an end of the positive electrode 11. In the meantime, the coating material 18b which is made of an insulating tape such as a polyethylene terephthalate (PET), polypropylene (PP), or polyimide (PI) tape to cover a current collector exposed surface of a part, facing the current collector exposed part on the positive electrode inner periphery side, of an end of the negative electrode 12, is adhered. Note that the inner periphery used in the present technology refers to an area, located near one of the ends in the longitudinal direction of each electrode closer to the center of the wound electrode element, and an outer periphery refers to an area, located near the other of the ends in the longitudinal direction of each electrode closer to the exterior member.

After adhesion of the coating materials 18a, 18b, and 18c in this manner, the stacked structure is wound into a relatively fattened spiral, and a pressing force is further applied externally thereto so that the stacked structure becomes more flattened and thinner. In this process, even when an end of the positive electrode 11 and the negative electrode 12 come closer to each other or an end of the negative electrode 12 and the positive electrode 11 come closer to each other owing to the application of the pressing force, the coating materials 18a, 18b, and 18c prevent the electrodes from coming in contact with each other and causing electrical short circuit. In a case where the gel electrolyte is used, hot press may be performed thereafter as a process for impregnating the positive and negative electrodes and the separator with the electrolytic solution. In a case where the liquid electrolytic solution is used, the electrolytic solution can be injected after the flattened thin element is inserted in the laminate.

2. Embodiment of Present Technology

Figure 3:
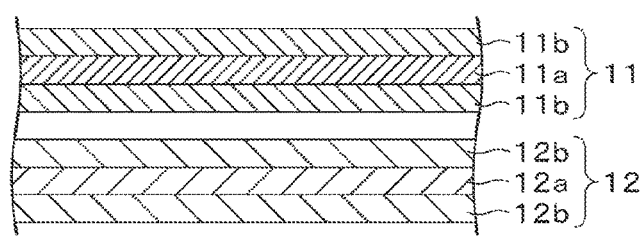
FIG. 3 is a partially enlarged view of the wound electrode element.

The present technology improves safety without decreasing energy density. The present technology will now be described with reference to the drawings. For simplicity, the drawings of the wound electrode element illustrate current collectors on the outer periphery side, which are different in structure, and illustrate the positive electrode 11 where the positive electrode active material layer 11b is applied to the positive electrode current collector 11a and the negative electrode 12 where the negative electrode active material layer 12b is applied to the negative electrode current collector 12a, as illustrated in FIG. 3. The separator, the protective tape, and the structure on the inner periphery side will not be illustrated except some drawings.

Figure 4:
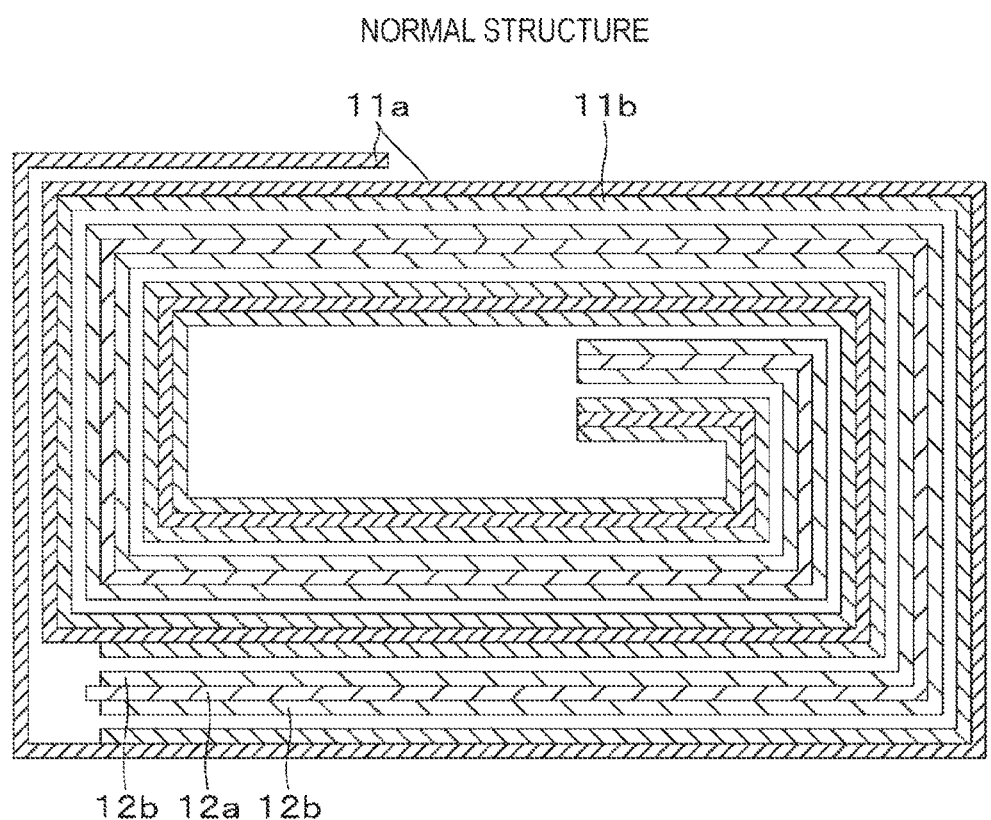
FIG. 4 is a cross-sectional view used for explanation of an example of a conventional wound electrode element.

FIG. 4 illustrates an example (normal structure) of a wound structure for comparison. In this structure, a part of the negative electrode where the active material layer is formed only on one face is only present on the inner periphery side, a part of the positive electrode where the active material layer is formed only on one face is only present on the outer periphery side, and there is no part where the current collector exposed surfaces of the positive electrode and the negative electrode face each other with the separator therebetween, except portions necessary for connection of the electrode leads. The occupancy of the current collectors in the battery is basically the smallest when this normal structure is used.

Figure 5:
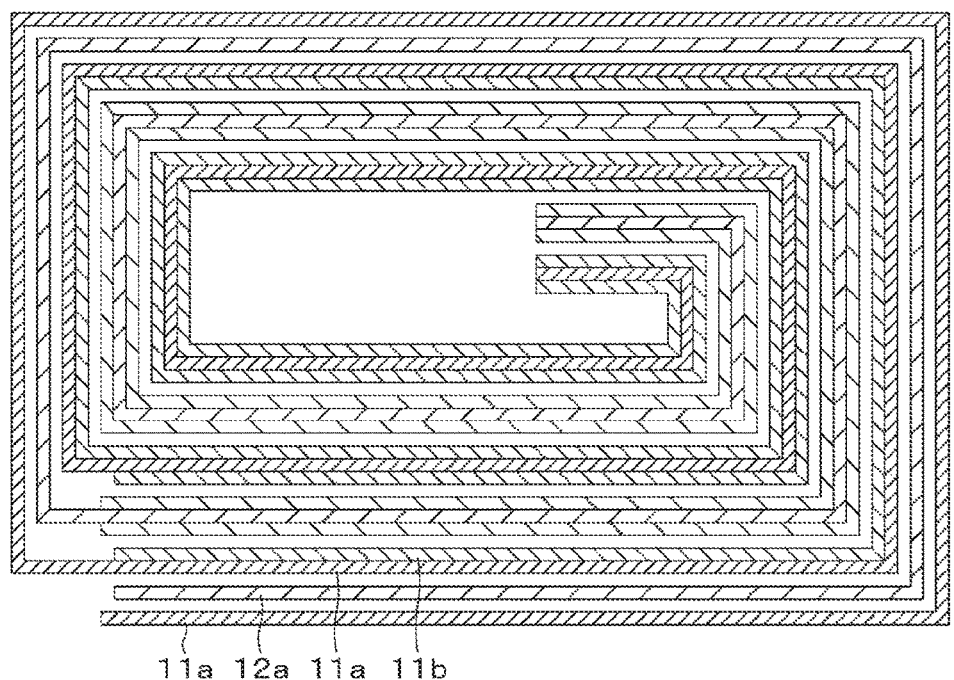
FIGS. 5A and 5B are cross-sectional views used for explanation of other examples of a conventional wound electrode element.
Figure 5:
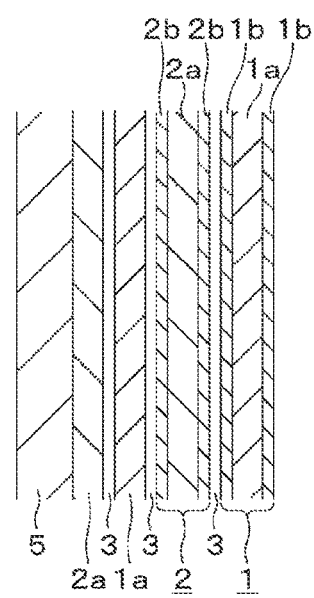

FIGS. 5A and 5B illustrate other examples (wound foil structures) of the wound structure for comparison. The wound foil structure corresponds to a structure in which the configuration of Patent Document 1 described at the beginning is used in a battery having an exterior material of a laminated film. FIG. 5B illustrates part of the structure in FIG. 2 of Patent Document 1. The wound foil structure is a structure in which parts of the positive electrode current collector 11a and the negative electrode current collector 12a where no active material layer is present on both faces are arranged adjacent to each other in the outermost periphery. In the case of this structure, safety is improved as compared to a case where the positive and negative electrode current collectors are not provided in the outermost periphery, but the volumes of the current collectors that do not contributed to charge and discharge are increased in the outermost periphery, which causes a problem of lower energy density.

FIG. 5B illustrates details of the outermost periphery and its vicinity of the electrode element having the wound structure. In FIG. 5B, 1 represents a sheet-like positive electrode, and 2 represents a sheet-like negative electrode. The positive electrode 1 is produced by formation of active material layers 1b on both faces of a positive electrode current collector 1a. The negative electrode 2 is produced by formation of active material layers 2b on both faces of a negative electrode current collector 2a. The positive electrode 1 and the negative electrode 2 are then wound spirally with a separator 3 therebetween, and accommodated as an electrode element having a spiral wound structure with an electrolytic solution in a battery can 5. In the outermost periphery of the positive electrode 1, a part where no active material layer 1b is formed on the respective faces and only a part of the positive electrode current collector 1a is present is provided. Similarly, in the outermost periphery, a part where no active material layer 2b is formed and only a part of the negative electrode current collector 2a is present is provided. In the structure illustrated in FIG. 5B, the active material layer 2b is also present outside of a part of the negative electrode 2 facing the positive electrode current collector 1a, which does not function as a battery. Thus, the structure of FIG. 5B is further lower in energy density than the wound foil structure illustrated in FIG. 5A.

Figure 6:
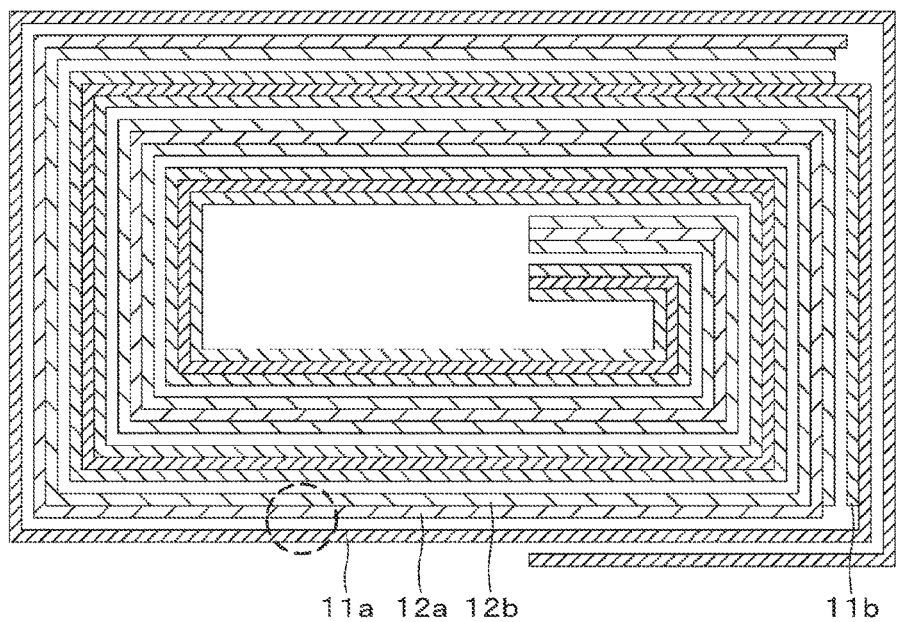
FIG. 6 is a cross-sectional view of an example of a wound electrode element to which the present technology is applied.

FIG. 6 illustrates a first example (referred to as one-side foil-foil structure (1)) of the wound structure of the present technology. The one-side foil-foil structure (1) is a structure in which a current collector exposed part of a one-side applied part of the negative electrode 12 faces the positive electrode current collector 11a of the positive electrode 11, as illustrated in a broken circle. Specifically, the one-side foil-foil structure (1) is a battery having a part where a current collector exposed surface of a one-side applied part on the outer side of the winding of either one of the positive and negative electrodes faces a current collector of the other of the electrodes with an insulator (separator) therebetween.

Figure 7:
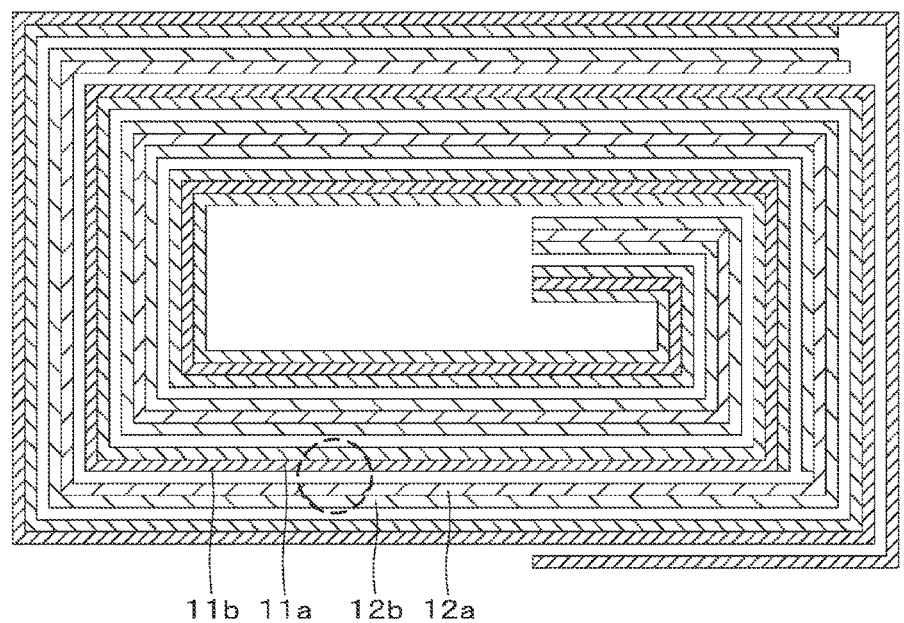
FIG. 7 is a cross-sectional view of another example of a wound electrode element to which the present technology is applied.

FIG. 7 illustrates a second example (referred to as one-side foil-foil structure (2)) of the wound structure of the present technology. The one-side foil-foil structure (2) is a structure in which a foil current collector exposed part of a one-side applied part of the positive electrode 11 faces a current collector exposed part of a one-side applied part of the negative electrode 12, as illustrated in a broken circle. Specifically, the one-side foil-foil structure (2) is a battery having a part where the current collector exposed surface sides of one-side applied parts on the outer side of the winding of the positive and negative electrodes face each other.

Thus, the mechanism of safety improvement under nail penetration with the wound foil structures as compared to the normal structure has been analyzed. As a result, the following has been found:

1. since low-resistance short circuit is caused at a part where the positive and negative electrode current collectors face each other, the heat generation quantity at the part where the electrode application parts face each other is decreased; and 2. when the part where the positive and negative electrode current collectors face each other is provided in the outermost periphery, the heat generation quantity at the part where the electrode application parts face each other is decreased from the initiation of nail penetration.

The synergistic effect of the above two effects makes the battery less likely to be subjected to thermal runaway.

In addition, it has been found that the current path at the part where the positive and negative electrode current collectors face each other is mainly on a path where the positive and negative electrode current collectors are in direct contact with each other rather than a path where the positive electrode current collector and the negative electrode current collector are short-circuited by a nail.

These results show that metal surfaces of both faces of both of the positive and negative electrode current collectors need not be exposed, but that surfaces where the metal surfaces face each other only need to be provided on the outer periphery side.

Thus, it has been studied what structures are possible as a structure in which metal surfaces of the current collectors face each other on the outer periphery of the battery, and batteries have actually been produced, so that the relation between the thickness and the safety would be clarified.

Figure 8:
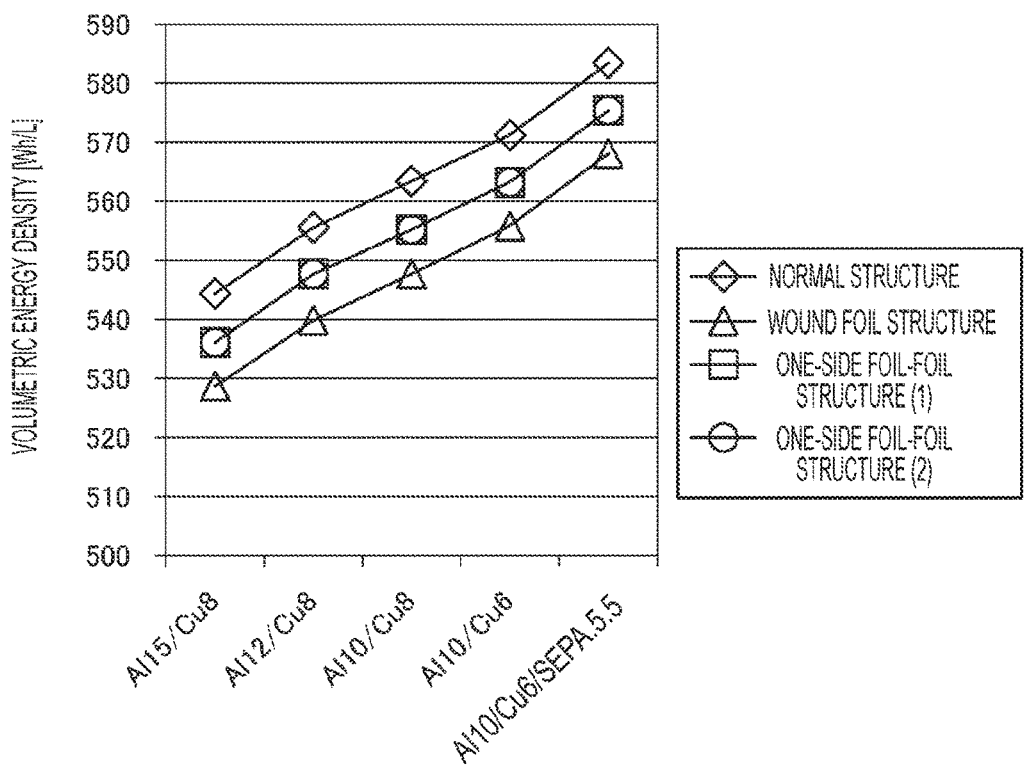
FIG. 8 is a graph of results of experiments on energy density.
Figure 9:
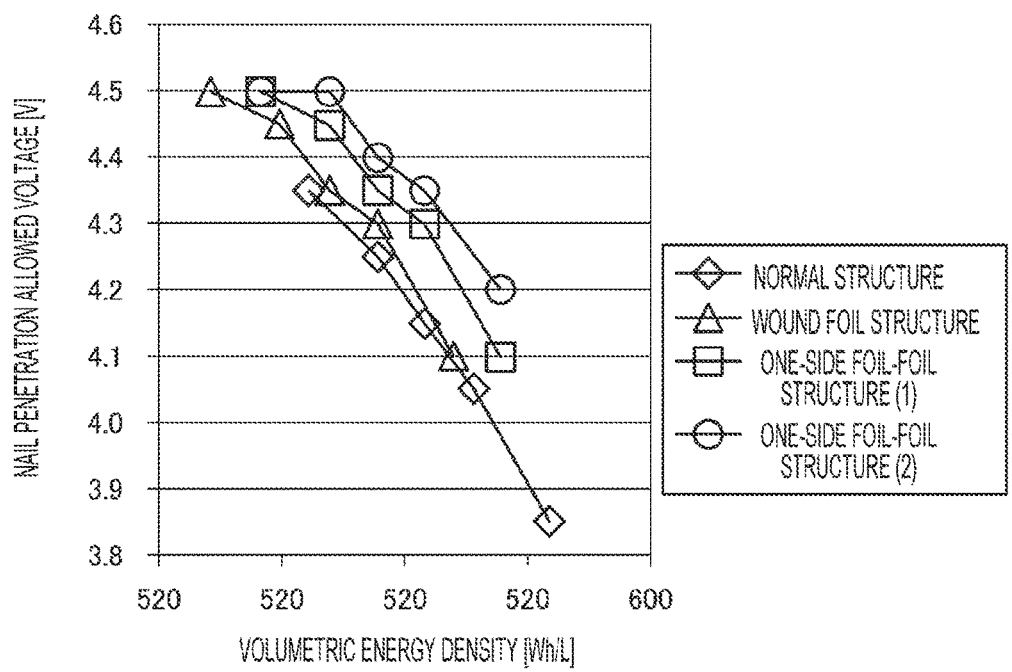
FIG. 9 is a graph of results of experiments on nail penetration allowed voltage.

Graphs of FIGS. 8 and 9 show results of experiments on the normal structure, the wound foil structure, the one-side foil-foil structure (1), and the one-side foil-foil structure (2) illustrated in FIGS. 4 to 7, respectively. Plots in the graphs are based on the results of experiments shown in Table 1 below. In one example, aluminum (Al) is used for the positive electrode current collector 11a, and copper (Cu) is used for the negative electrode current collector 12a.

Note that, since Table 1 is large in size, it is divided vertically and horizontally into four. An upper-left part of Table 1 is Table 1A, an upper-right part of Table 1 is Table 1B, a lower-left part of Table 1 is Table 1C, and a lower-right part of Table 1 is Table 1D. Furthermore, in each of the tables obtained by division, the leftmost fields (Examples 1 to 20, Comparative examples 1 to 11, and structure names) on the respective rows and the uppermost fields ("presence of portion where current collectors face each other," "thickness of positive electrode current collector [μm]," and "warpage at full charge [μm]") on the respective columns are added.

The following parameters in the uppermost fields on the respective columns in Table 1 will be described below:

"height of electrode element," "length of positive electrode lead inside electrode element," "length of negative electrode lead inside electrode element," "$P_{CL}$," "$P_{CR}$," "$P_{AL}$," "$P_{AR}$," "width of electrode element," "$X_L$," "$X_R$," "$Y_L$," "$Y_R$," and "warpage at full charge."

TABLE 1A

|  |  |  | Presence of portion where current collectors face each other | Thickness of positive electrode current collector [μm] | Thickness of negative electrode current collector [μm] | Thickness of separator [μm] |
|---|---|---|---|---|---|---|
| Examples | 1 | One-side foil-foil structure (1) | Entire surface | 15 | 8 | 7 |
|  | 2 | One-side foil-foil structure (1) | Entire surface | 12 | 8 | 7 |
|  | 3 | One-side foil-foil structure (1) | Entire surface | 10 | 8 | 7 |
|  | 4 | One-side foil-foil structure (1) | Entire surface | 10 | 6 | 7 |
|  | 5 | One-side foil-foil structure (1) | Entire surface | 10 | 6 | 5.5 |
|  | 6 | One-side foil-foil structure (2) | Entire surface | 15 | 8 | 7 |
|  | 7 | One-side foil-foil structure (2) | Entire surface | 12 | 8 | 7 |
|  | 8 | One-side foil-foil structure (2) | Entire surface | 10 | 8 | 7 |
|  | 9 | One-side foil-foil structure (2) | Entire surface | 10 | 6 | 7 |
|  | 10 | One-side foil-foil structure (2) | Entire surface | 10 | 6 | 5.5 |
|  | 11 | One-side foil-foil structure (2) | Half surface on positive electrode lead side | 12 | 8 | 7 |
|  | 12 | One-side foil-foil structure (2) | Half surface on positive electrode lead side | 12 | 8 | 7 |
|  | 13 | One-side foil-foil structure (2) | Half surface on positive electrode lead side | 12 | 8 | 7 |
|  | 14 | One-side foil-foil structure (2) | Half surface on positive electrode lead side | 12 | 8 | 7 |

TABLE 1A-continued

| | | | | | | |
|---|---|---|---|---|---|---|
| 15 | One-side foil-foil structure (2) | Entire surface | 10 | 6 | 5.5 |
| 16 | One-side foil-foil structure (2) | Entire surface | 10 | 6 | 5.5 |
| 17 | One-side foil-foil structure (2) | Entire surface | 10 | 6 | 5.5 |
| 18 | One-side foil-foil structure (2) | Entire surface | 10 | 6 | 5.5 |
| 19 | One-side foil-foil structure (2) | Half surface on positive electrode lead side | 12 | 8 | 7 |
| 20 | One-side foil-foil structure (2) | Half surface on positive electrode lead side | 12 | 8 | 7 |

| | | Height of electrode element [mm] | Length of positive electrode lead inside electrode element [mm] | Length of negative electrode lead inside electrode element [mm] | $P_{CL}$ [mm] | $P_{CR}$ [mm] | $P_{AL}$ [mm] | $P_{AR}$ [mm] |
|---|---|---|---|---|---|---|---|---|
| Examples | 1 | 70 | 20 | 20 | −14 | −10 | 10 | 14 |
| | 2 | 70 | 20 | 20 | −14 | −10 | 10 | 14 |
| | 3 | 70 | 20 | 20 | −14 | −10 | 10 | 14 |
| | 4 | 70 | 20 | 20 | −14 | −10 | 10 | 14 |
| | 5 | 70 | 20 | 20 | −14 | −10 | 10 | 14 |
| | 6 | 70 | 20 | 20 | −14 | −10 | 10 | 14 |
| | 7 | 70 | 20 | 20 | −14 | −10 | 10 | 14 |
| | 8 | 70 | 20 | 20 | −14 | −10 | 10 | 14 |
| | 9 | 70 | 20 | 20 | −14 | −10 | 10 | 14 |
| | 10 | 70 | 20 | 20 | −14 | −10 | 10 | 14 |
| | 11 | 70 | 20 | 20 | −14 | −10 | 10 | 14 |
| | 12 | 70 | 20 | 20 | −14 | −10 | 10 | 14 |
| | 13 | 70 | 20 | 20 | −14 | −10 | 10 | 14 |
| | 14 | 70 | 20 | 20 | −14 | −10 | 10 | 14 |
| | 15 | 70 | 30 | 30 | −14 | −10 | 10 | 14 |
| | 16 | 70 | 40 | 40 | −14 | −10 | 10 | 14 |
| | 17 | 70 | 20 | 40 | −14 | −10 | 10 | 14 |
| | 18 | 70 | 40 | 20 | −14 | −10 | 10 | 14 |
| | 19 | 70 | 20 | 20 | −14 | −10 | −6 | −2 |
| | 20 | 70 | 20 | 20 | −14 | −10 | 10 | 14 |

TABLE 1B

| | | | Width of electrode element [mm] | $X_L$ [mm] | $X_R$ [mm] | X [mm] | $X_L$ [mm] | $X_R$ [mm] |
|---|---|---|---|---|---|---|---|---|
| Examples | 1 | One-side foil-foil structure (1) | 60 | −30 | 30 | 60 | −30 | 28 |
| | 2 | One-side foil-foil structure (1) | 60 | −30 | 30 | 60 | −30 | 28 |
| | 3 | One-side foil-foil structure (1) | 60 | −30 | 30 | 60 | −30 | 28 |
| | 4 | One-side foil-foil structure (1) | 60 | −30 | 30 | 60 | −30 | 28 |
| | 5 | One-side foil-foil structure (1) | 60 | −30 | 30 | 60 | −30 | 28 |
| | 6 | One-side foil-foil structure (2) | 60 | −30 | 30 | 60 | −30 | 28 |
| | 7 | One-side foil-foil structure (2) | 60 | −30 | 30 | 60 | −30 | 28 |
| | 8 | One-side foil-foil structure (2) | 60 | −30 | 30 | 60 | −30 | 28 |
| | 9 | One-side foil-foil structure (2) | 60 | −30 | 30 | 60 | −30 | 28 |
| | 10 | One-side foil-foil structure (2) | 60 | −30 | 30 | 60 | −30 | 28 |
| | 11 | One-side foil-foil structure (2) | 60 | −30 | 0 | 30 | −30 | −28 |
| | 12 | One-side foil-foil structure (2) | 60 | −30 | 0 | 30 | −30 | −2 |
| | 13 | One-side foil-foil structure (2) | 60 | −30 | 0 | 30 | −30 | 2 |
| | 14 | One-side foil-foil structure (2) | 60 | −30 | 0 | 30 | −30 | 28 |
| | 15 | One-side foil-foil structure (2) | 60 | −30 | 30 | 60 | −30 | 28 |
| | 16 | One-side foil-foil structure (2) | 60 | −30 | 30 | 60 | −30 | 28 |
| | 17 | One-side foil-foil structure (2) | 60 | −30 | 30 | 60 | −30 | 28 |
| | 18 | One-side foil-foil structure (2) | 60 | −30 | 30 | 60 | −30 | 28 |
| | 19 | One-side foil-foil structure (2) | 60 | −30 | 0 | 30 | −30 | −16 |
| | 20 | One-side foil-foil structure (2) | 60 | −30 | 0 | 30 | −30 | −16 |

| | | Y [mm] | Capacity [mAh] | Cell thickness during charging [mm] | Energy density [Wh/L] | Nail penetration allowed voltage [V] | Cycle performance | Warpage at full charge [μm] |
|---|---|---|---|---|---|---|---|---|
| Examples | 1 | 58 | 3000 | 4.55 | 536 | 4.50 | ○ | 40 |
| | 2 | 58 | 3000 | 4.46 | 548 | 4.45 | ○ | 50 |
| | 3 | 58 | 3000 | 4.39 | 555 | 4.35 | ○ | 60 |
| | 4 | 58 | 3000 | 4.33 | 563 | 4.30 | ○ | 80 |
| | 5 | 58 | 3000 | 4.24 | 576 | 4.10 | ○ | 80 |
| | 6 | 58 | 3000 | 4.55 | 536 | 4.50 | ○ | 40 |
| | 7 | 58 | 3000 | 4.46 | 548 | 4.50 | ○ | 50 |
| | 8 | 58 | 3000 | 4.39 | 555 | 4.40 | ○ | 60 |
| | 9 | 58 | 3000 | 4.33 | 563 | 4.35 | ○ | 80 |
| | 10 | 58 | 3000 | 4.24 | 576 | 4.20 | ○ | 80 |

TABLE 1B-continued

| | | | | | | | |
|---|---|---|---|---|---|---|---|
| 11 | 2 | 2959 | 4.42 | 545 | 4.50 | ○ | 50 |
| 12 | 28 | 3007 | 4.42 | 553 | 4.50 | ○ | 50 |
| 13 | 32 | 3015 | 4.52 | 543 | 4.50 | Δ | 50 |
| 14 | 58 | 3063 | 4.52 | 551 | 4.50 | Δ | 50 |
| 15 | 58 | 3000 | 4.24 | 576 | 4.20 | ○ | 80 |
| 16 | 58 | 3000 | 4.24 | 576 | 4.20 | ○ | 20 |
| 17 | 58 | 3000 | 4.24 | 576 | 4.20 | ○ | 20 |
| 18 | 58 | 3000 | 4.24 | 576 | 4.20 | ○ | 30 |
| 19 | 14 | 2981 | 4.34 | 558 | 4.50 | ○ | 80 |
| 20 | 14 | 2981 | 4.42 | 548 | 4.50 | ○ | 80 |

TABLE 1C

| | | | Width of electrode element [mm] | $X_L$ [mm] | $X_R$ [mm] | X [mm] | $X_L$ [mm] | $X_R$ [mm] |
|---|---|---|---|---|---|---|---|---|
| Examples | 1 | One-side foil-foil structure (1) | 60 | −30 | 30 | 60 | −30 | 28 |
| | 2 | One-side foil-foil structure (1) | 60 | −30 | 30 | 60 | −30 | 28 |
| | 3 | One-side foil-foil structure (1) | 60 | −30 | 30 | 60 | −30 | 28 |
| | 4 | One-side foil-foil structure (1) | 60 | −30 | 30 | 60 | −30 | 28 |
| | 5 | One-side foil-foil structure (1) | 60 | −30 | 30 | 60 | −30 | 28 |
| | 6 | One-side foil-foil structure (2) | 60 | −30 | 30 | 60 | −30 | 28 |
| | 7 | One-side foil-foil structure (2) | 60 | −30 | 30 | 60 | −30 | 28 |
| | 8 | One-side foil-foil structure (2) | 60 | −30 | 30 | 60 | −30 | 28 |
| | 9 | One-side foil-foil structure (2) | 60 | −30 | 30 | 60 | −30 | 28 |
| | 10 | One-side foil-foil structure (2) | 60 | −30 | 30 | 60 | −30 | 28 |
| | 11 | One-side foil-foil structure (2) | 60 | −30 | 0 | 30 | −30 | −28 |
| | 12 | One-side foil-foil structure (2) | 60 | −30 | 0 | 30 | −30 | −2 |
| | 13 | One-side foil-foil structure (2) | 60 | −30 | 0 | 30 | −30 | 2 |
| | 14 | One-side foil-foil structure (2) | 60 | −30 | 0 | 30 | −30 | 28 |
| | 15 | One-side foil-foil structure (2) | 60 | −30 | 30 | 60 | −30 | 28 |
| | 16 | One-side foil-foil structure (2) | 60 | −30 | 30 | 60 | −30 | 28 |
| | 17 | One-side foil-foil structure (2) | 60 | −30 | 30 | 60 | −30 | 28 |
| | 18 | One-side foil-foil structure (2) | 60 | −30 | 30 | 60 | −30 | 28 |
| | 19 | One-side foil-foil structure (2) | 60 | −30 | 0 | 30 | −30 | −16 |
| | 20 | One-side foil-foil structure (2) | 60 | −30 | 0 | 30 | −30 | −16 |

| | | | Y [mm] | Capacity [mAh] | Cell thickness during charging [mm] | Energy density [Wh/L] | Nail penetration allowed voltage [V] | Cycle performance | Warpage at full charge [μm] |
|---|---|---|---|---|---|---|---|---|---|
| Examples | 1 | | 58 | 3000 | 4.55 | 536 | 4.50 | ○ | 40 |
| | 2 | | 58 | 3000 | 4.46 | 548 | 4.45 | ○ | 50 |
| | 3 | | 58 | 3000 | 4.39 | 555 | 4.35 | ○ | 60 |
| | 4 | | 58 | 3000 | 4.33 | 563 | 4.30 | ○ | 80 |
| | 5 | | 58 | 3000 | 4.24 | 576 | 4.10 | ○ | 80 |
| | 6 | | 58 | 3000 | 4.55 | 536 | 4.50 | ○ | 40 |
| | 7 | | 58 | 3000 | 4.46 | 548 | 4.50 | ○ | 50 |
| | 8 | | 58 | 3000 | 4.39 | 555 | 4.40 | ○ | 60 |
| | 9 | | 58 | 3000 | 4.33 | 563 | 4.35 | ○ | 80 |
| | 10 | | 58 | 3000 | 4.24 | 576 | 4.20 | ○ | 80 |
| | 11 | | 2 | 2959 | 4.42 | 545 | 4.50 | ○ | 50 |
| | 12 | | 28 | 3007 | 4.42 | 553 | 4.50 | ○ | 50 |
| | 13 | | 32 | 3015 | 4.52 | 543 | 4.50 | Δ | 50 |
| | 14 | | 58 | 3063 | 4.52 | 551 | 4.50 | Δ | 50 |
| | 15 | | 58 | 3000 | 4.24 | 576 | 4.20 | ○ | 80 |
| | 16 | | 58 | 3000 | 4.24 | 576 | 4.20 | ○ | 20 |
| | 17 | | 58 | 3000 | 4.24 | 576 | 4.20 | ○ | 20 |
| | 18 | | 58 | 3000 | 4.24 | 576 | 4.20 | ○ | 30 |
| | 19 | | 14 | 2981 | 4.34 | 558 | 4.50 | ○ | 80 |
| | 20 | | 14 | 2981 | 4.34 | 558 | 4.50 | ○ | 80 |

TABLE 1D

| | | | Width of electrode element [mm] | $X_L$ [mm] | $X_R$ [mm] | X [mm] | $Y_L$ [mm] | $Y_R$ [mm] |
|---|---|---|---|---|---|---|---|---|
| Comparative examples | 1 | Normal structure | 60 | −30 | 30 | 60 | −30 | 28 |
| | 2 | Normal structure | 60 | −30 | 30 | 60 | −30 | 28 |
| | 3 | Normal structure | 60 | −30 | 30 | 60 | −30 | 28 |
| | 4 | Normal structure | 60 | −30 | 30 | 60 | −30 | 28 |
| | 5 | Normal structure | 60 | −30 | 30 | 60 | −30 | 28 |
| | 6 | Wound foil structure | 60 | −30 | 30 | 60 | −30 | 28 |

TABLE 1D-continued

|  |  |  |  |  |  |  |  |
|---|---|---|---|---|---|---|---|
| 7 | Wound foil structure | 60 | −30 | 30 | 60 | −30 | 28 |
| 8 | Wound foil structure | 60 | −30 | 30 | 60 | −30 | 28 |
| 9 | Wound foil structure | 60 | −30 | 30 | 60 | −30 | 28 |
| 10 | Wound foil structure | 60 | −30 | 30 | 60 | −30 | 28 |
| 11 | Wound foil structure | 60 | −30 | 30 | 30 | −30 | −2 |

|  |  | Y [mm] | Capacity [mAh] | Cell thickness during charging [mm] | Energy density [Wh/L] | Nail penetration allowed voltage [V] | Cycle performance | Warpage at full charge [μm] |
|---|---|---|---|---|---|---|---|---|
| Comparative examples | 1 | 58 | 3000 | 4.48 | 544 | 4.25 | ○ | 40 |
|  | 2 | 58 | 3000 | 4.39 | 556 | 4.20 | ○ | 50 |
|  | 3 | 58 | 3000 | 4.33 | 563 | 4.15 | ○ | 60 |
|  | 4 | 58 | 3000 | 4.27 | 571 | 4.05 | ○ | 80 |
|  | 5 | 58 | 3000 | 4.18 | 583 | 3.85 | ○ | 80 |
|  | 6 | 58 | 3000 | 4.62 | 529 | 4.50 | ○ | 40 |
|  | 7 | 58 | 3000 | 4.52 | 540 | 4.45 | ○ | 50 |
|  | 8 | 58 | 3000 | 4.46 | 548 | 4.35 | ○ | 60 |
|  | 9 | 58 | 3000 | 4.39 | 556 | 4.30 | ○ | 80 |
|  | 10 | 58 | 3000 | 4.30 | 568 | 4.10 | ○ | 80 |
|  | 11 | 28 | 2892 | 4.38 | 537 | 4.45 | Δ | 50 |

The graph illustrated in FIG. 8 shows a change in volumetric energy density when the thicknesses of aluminum (Al) that is the positive electrode current collector, copper (Cu) that is the negative electrode current collector, and the separator (SEPA.) are reduced in each of Examples 1 to 5 (one-side foil-foil structure (1)), Examples 6 to 10 (one-side foil-foil structure (2)), Comparative examples 1 to 5 (normal structure), and Comparative examples 6 to 10 (wound foil structure). The graph of FIG. 8 shows that the one-side foil-foil structure (1) and the one-side foil-foil structure (2) to which the present technology is applied have intermediate energy densities between those of the wound foil structure and the normal structure.

The graph illustrated in FIG. 9 shows the relation between volumetric energy density and nail penetration allowed voltage when the thicknesses of members that do not contribute to charge and discharge in each of the one-side foil-foil structure (1), the one-side foil-foil structure (2), the normal structure, and the wound foil structure. Note that the one-side foil-foil structure (1) corresponds to Examples 1 to 5, the one-side foil-foil structure (2) corresponds to Examples 6 to 10, the normal structure corresponds to Comparative examples 1 to 5, and the wound foil structure corresponds to Comparative examples 6 to 10. The nail penetration allowed voltage refers to a voltage to which charging is performed before a nail penetration test, and no gas is ejected under the nail penetration test. The graph of FIG. 9 shows that the one-side foil-foil structure (1) and the one-side foil-foil structure (2) to which the present technology is applied are higher in nail penetration allowed voltage than both of the normal structure and the wound foil structure when compared with the same volumetric energy density; that is, the one-side foil-foil structure (1) and the one-side foil-foil structure (2) achieve higher safety while maintaining higher energy density.

Note that the nail penetration allowed voltage in Table 1 is obtained as follows. Batteries having different charging voltages for respective levels are provided. In Examples 1 to 10 and Comparative examples 1 to 10, an iron nail having a diameter of 2.5 mm is stuck into a center portion of each of the batteries at a rate of 100 mm/sec. Thereafter, if the laminate is burst and gas is ejected with a sudden rise in temperature, the battery is determined to be an NG battery. The test is conducted on five cells from both sides at a voltage. If no cells are determined to be NG, the voltage is determined to be a nail penetration allowed voltage in the corresponding specification. In Examples 11 to 14, 19, and 20 and Comparative example 11, the position where the nail is stuck is not the battery center portion but a position shifted only in the battery width direction by an amount calculated by $(Y_L+Y_R)/2$, and the nail penetration allowed voltage is examined similarly to the above. For example, in the case of Example 12, since $Y_L=-30$ and $Y_R=-2$, nail penetration is performed at a position shifted by $((-30+(-2)/2=))-16$ only in the width direction from the battery center.

Furthermore, the battery thickness during charging in Table 1 is defined as a thickness measured by sandwiching the battery with two metal plates that change in interval between the surfaces while being kept parallel to each other.

As described above, it has been found that the one-side foil-foil structure having a part where the current collector exposed surface sides of one-side applied parts on the outer periphery side of the positive and negative electrodes face each other (the one-side foil-foil structure (2) illustrated in FIG. 7) and the one-side foil-foil structure (1) (FIG. 6) having a part where the current collector exposed surface of the one-side applied part on the outer periphery side of either one of the positive and negative electrodes and the current collector of the other electrode face each other with an insulator (separator) therebetween are structures that no longer have the relation between safety and energy density obtained in the normal structure and the wound foil structure but are capable of achieving higher energy density while maintaining safety. Note that the results of the energy density and the safety shown in FIG. 9 are merely those obtained by combinations of materials used in the examples and the sizes of the produced batteries. Thus, in a case where a battery is produced using a further thermostable material and in a battery size with which temperature does not easily rise, a higher energy density can be achieved while a high safety is maintained with use of thinner members in combination.

Among others, it has been found that, in the case of the one-side foil-foil structure (2) in which a part where one layer of the positive electrode and one layer of the negative electrode face each other is provided on an outer side of the part where the current collector exposed surface sides of the one-side application parts on the outer periphery of the positive and negative electrodes face each other, particularly high safety is achieved (Examples 6 to 10). As a result of breaking up and observation of batteries after penetration, the reason why the one-side foil-foil structure (2) is high in safety is considered to be as follows. Since the position of a foil-to-foil facing part (the part where the current collector exposed surface sides of the positive and negative electrodes face each other) is away from the exterior member, inhibition of short circuit of the foil-to-foil facing part is less likely to be caused by the exterior member being caught; and since the foil current collector exposed parts applied to one sides of the positive and negative electrodes face each other to form the foil-to-foil facing part, release of short circuit due to melting of current collectors under heat generation is less likely to occur as compared to a case where current collectors alone form the foil-to-foil facing part.

Note that the foil-to-foil facing part need not cover the entire surfaces in the battery but may be partially provided. The purposes in this case will be explained.

First, regarding the surfaces on which the foil-to-foil facing part is provided, provision of the foil-to-foil facing part on the outer periphery side is very effective for improving safety. Thus, if external damage is only expected to a surface on one side, it is expected that provision of the foil-to-foil facing part on the outer side of the surface will improve safety. Furthermore, since the effect is more likely to be maintained as the number of foil-to-foil facing parts is larger, foil-to-foil facing parts can be provided on both of the side subjected to external damage and the surface on the other side for further improvement of safety.

Furthermore, depending on the use of the battery and the location of the battery in a device, there are cases where penetration safety at only one part such as "a left half part of the battery" or "only the middle part" needs to be improved. Alternatively, depending on the internal structure, there are cases where parts of high safety and parts of low safety under penetration of a nail or the like are present. In these cases, a motivation for providing a foil-to-foil facing part only at one part on the outer periphery side is caused.

In a case of a wound battery, measures are taken to produce a highly reliable battery each time an electrode part is switched to a current collector exposed part. A first measure is to apply a negative electrode active material layer relatively longer than a positive electrode active material layer, and a second measure is to cover the ends of positive electrode application with tapes. These measures consume extra volumes, which lowers energy density. Thus, in view of energy density, each of the positive and negative electrode is preferably formed by a seamless electrode application part within one wound electrode element.

Figure 10:
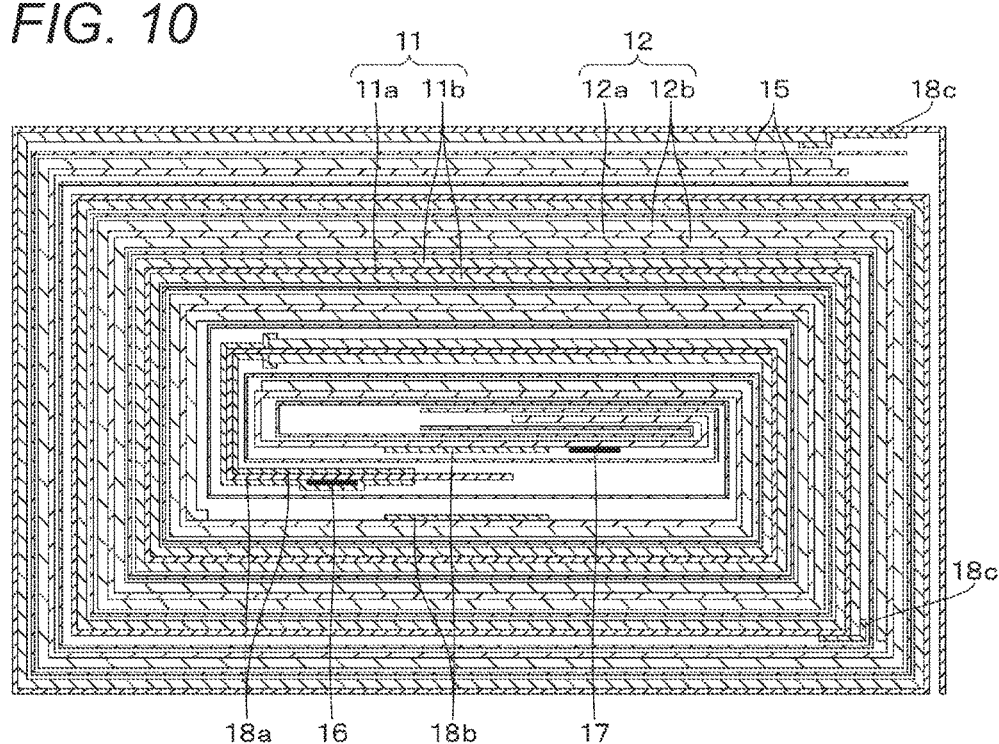
FIG. 10 is a more detailed cross-sectional view of another example of the wound electrode element to which the present technology is applied.

FIG. 10 illustrates a one-side foil-foil structure (2) in which a coating material (protective tape) 18a is provided to cover from an application start end of a positive electrode active material containing coating film 11b and including a lead-out portion of the positive electrode lead 16, a coating material (protective tape) 18b is provided on a negative electrode current collector 12a facing a cut end of the positive electrode current collector 11a, and a coating material (protective tape) 18c is provided at a position where the positive electrode active material containing coating film 11b is switched from double-side application to one-side application.

Figure 11:
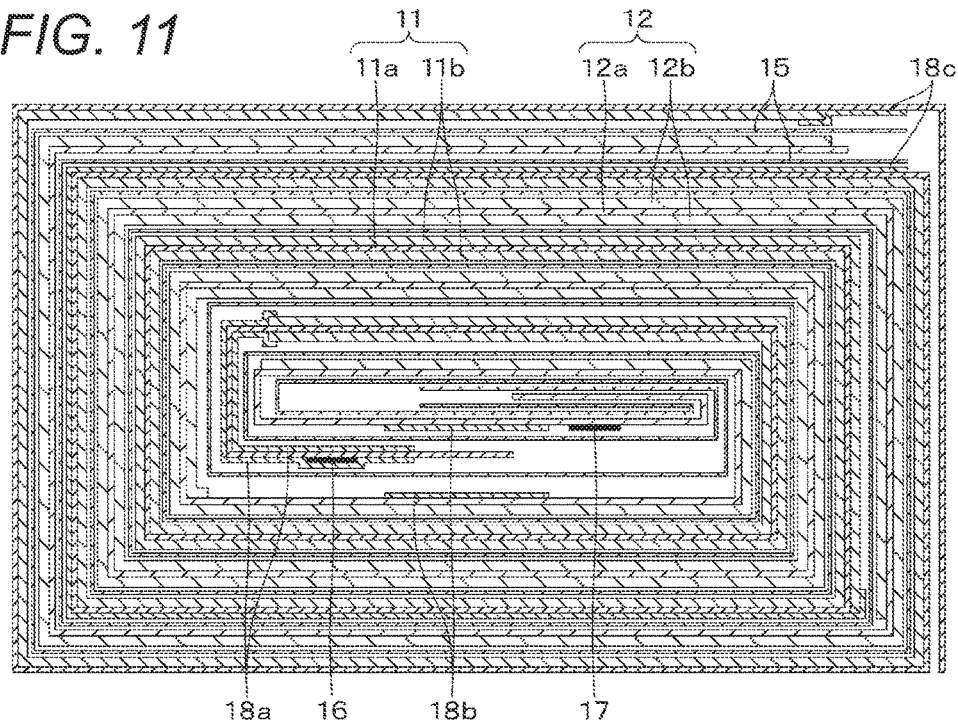
FIG. 11 is a more detailed cross sectional view of another example of the wound electrode element to which the present technology is applied.

FIG. 11 illustrates a one-side foil-foil structure (2) in which a protective tape 18c is provided over the entire outer periphery starting from the position where the positive electrode active material containing coating film 11b is switched from double-side application to one-side application. Either of the structures of FIGS. 10 and 11 may be used.

Figure 12:
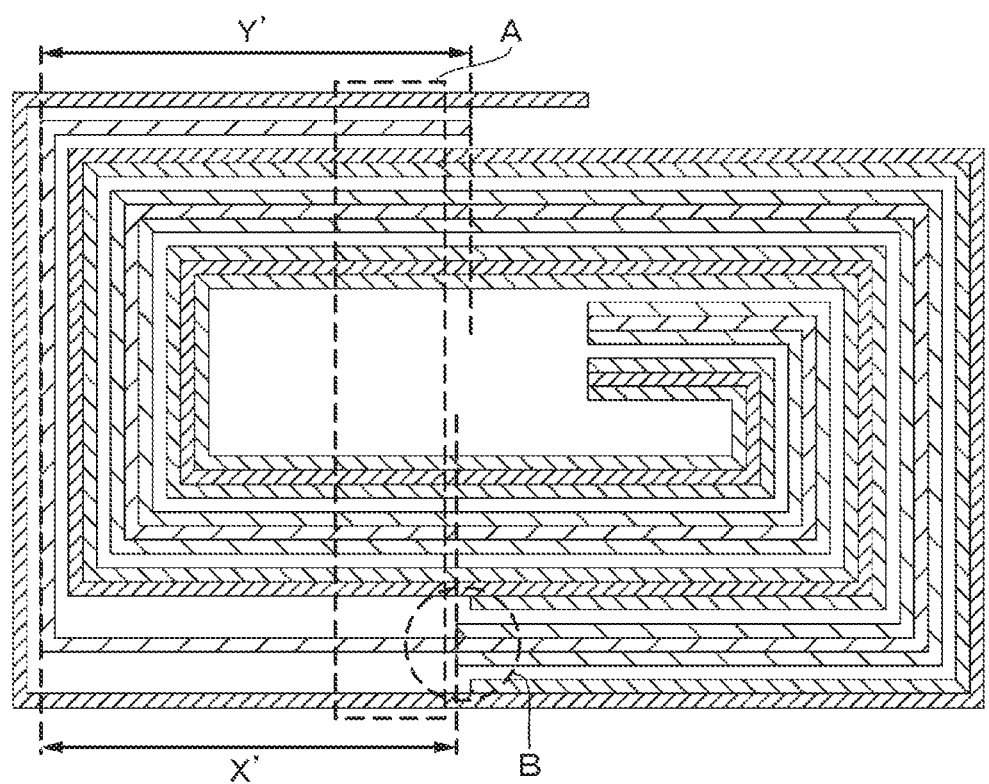
FIG. 12 is a cross-section view for explaining the wound foil structure.

For example, in a wound foil structure illustrated in FIG. 12, for increasing penetration safety of a range A enclosed by a dotted line, a foil-to-foil facing part is started from a position B, so that both of safety and energy density can be achieved. In FIG. 12, X' represents the length from the start of the foil-to-foil facing part to the start of a bent part when the electrodes are viewed from the inner periphery side toward the outer periphery side. Y' represents the length from the send of a bent part (the start of a flat part) to the end of the foil-to-foil facing part when the electrodes are viewed from the inner periphery side toward the outer periphery side.

Figure 13:
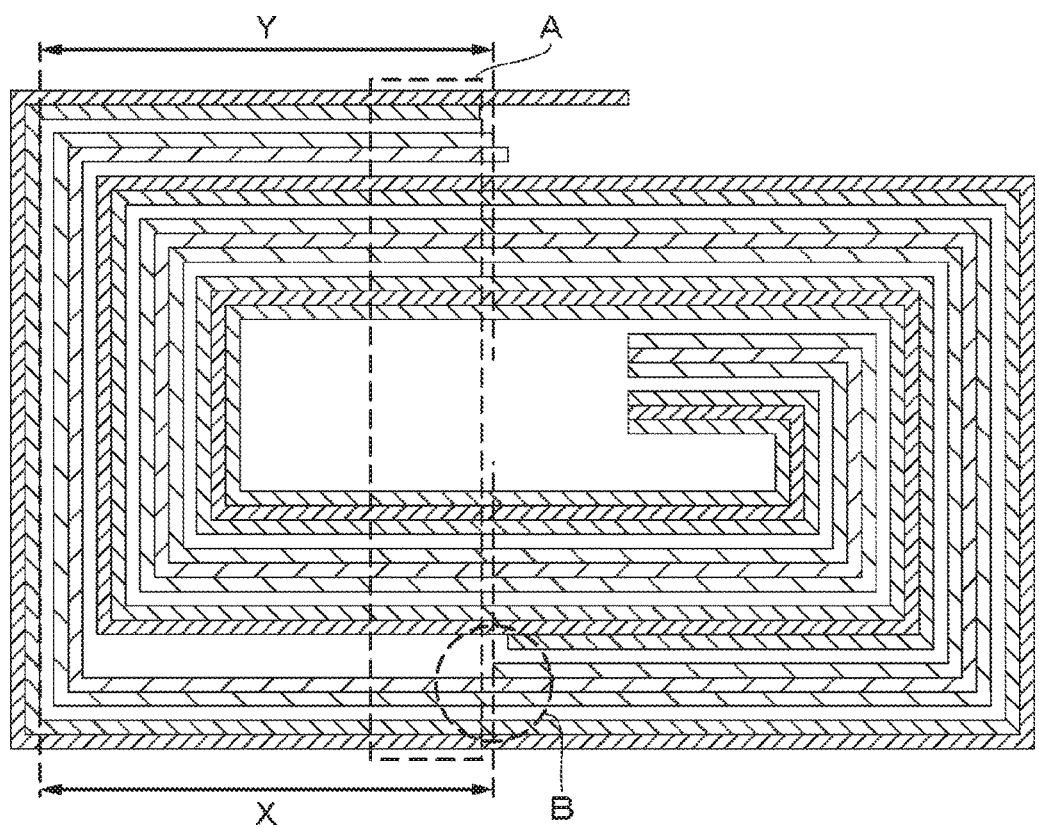
FIG. 13 is a cross-sectional view for explaining the wound electrode element to which the present technology is applied.

In a case of a one-side foil-foil structure (2) illustrated in FIG. 13 as well, for increasing penetration safety of a range A enclosed by a dotted line, a foil-to-foil facing part is started from a position B, so that this purpose is achieved. Parts where foil exposed surfaces face each other are present on both faces of the battery, where the length from the start of a foil-to-foil facing part to the corner of a bent part is defined as X and the length from a corner of a bent part to an end of a foil-to-foil facing part is defined as Y. It has been found in this case that, when the lengths X and Y are changed, the resulting capacity retention ratio after charge-discharge cycles is also changed. This will be described hereinafter.

As a result of comparing the discharge capacities of the respective structure after repeating 200 cycles of 1-C charging (CC (constant current)/CV (constant voltage) 4.35 V, (1/20) C cut-off) and 1-C discharging (CC discharge, 3 V cut-off), a battery having a one-side foil-foil structure and a dimension of (X≥Y) has the highest retention ratio.

As a result of breaking up and examination of the batteries after performing cycles to figure out the cause of the result, lithium is locally precipitated mainly to a bent part or the like in a battery with a low cycle retention ratio battery and the thickness of the battery is increased. This is considered to have triggered the decrease in the cycle retention ratio.

A process of pressing in a planar direction to stabilize the shape of the battery may be performed after winding the electrodes. In this case, however, the structure in which lithium (Li) is precipitated to the bent part is a structure to which pressure is less likely to be applied uniformly to the entire surfaces when being pressed, and the pressure applied to the bent part is non-uniform.

Figure 14:
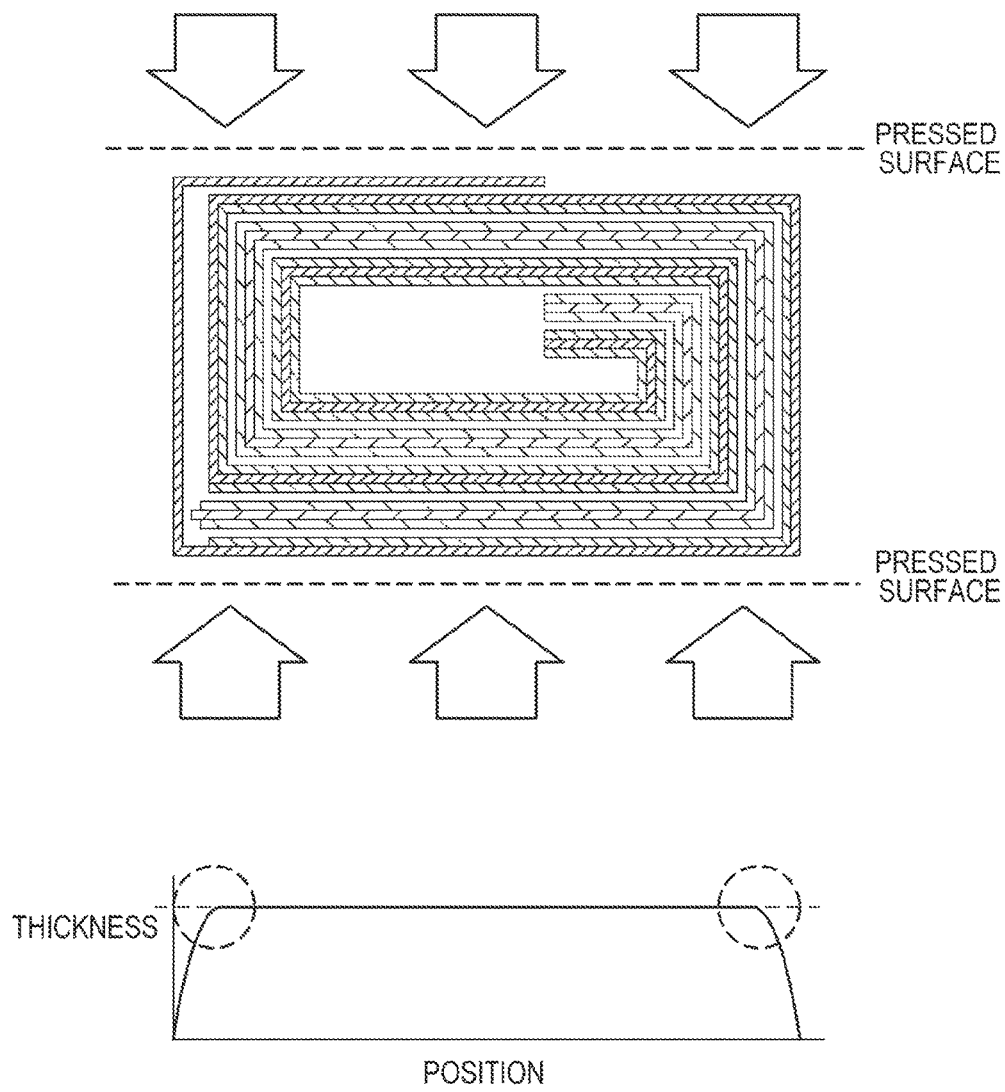
FIG. 14 is a schematic diagram used for explanation of the thickness of a conventional wound electrode element (normal structure).

FIG. 14 illustrates the thickness of a battery in a case of the normal structure (Comparative example 2). In the case of the normal structure, since the pressure applied around the bent parts in the wound structure is uniform as shown in broken circles, the thickness obtained by pressing is also uniform.

Figure 15:
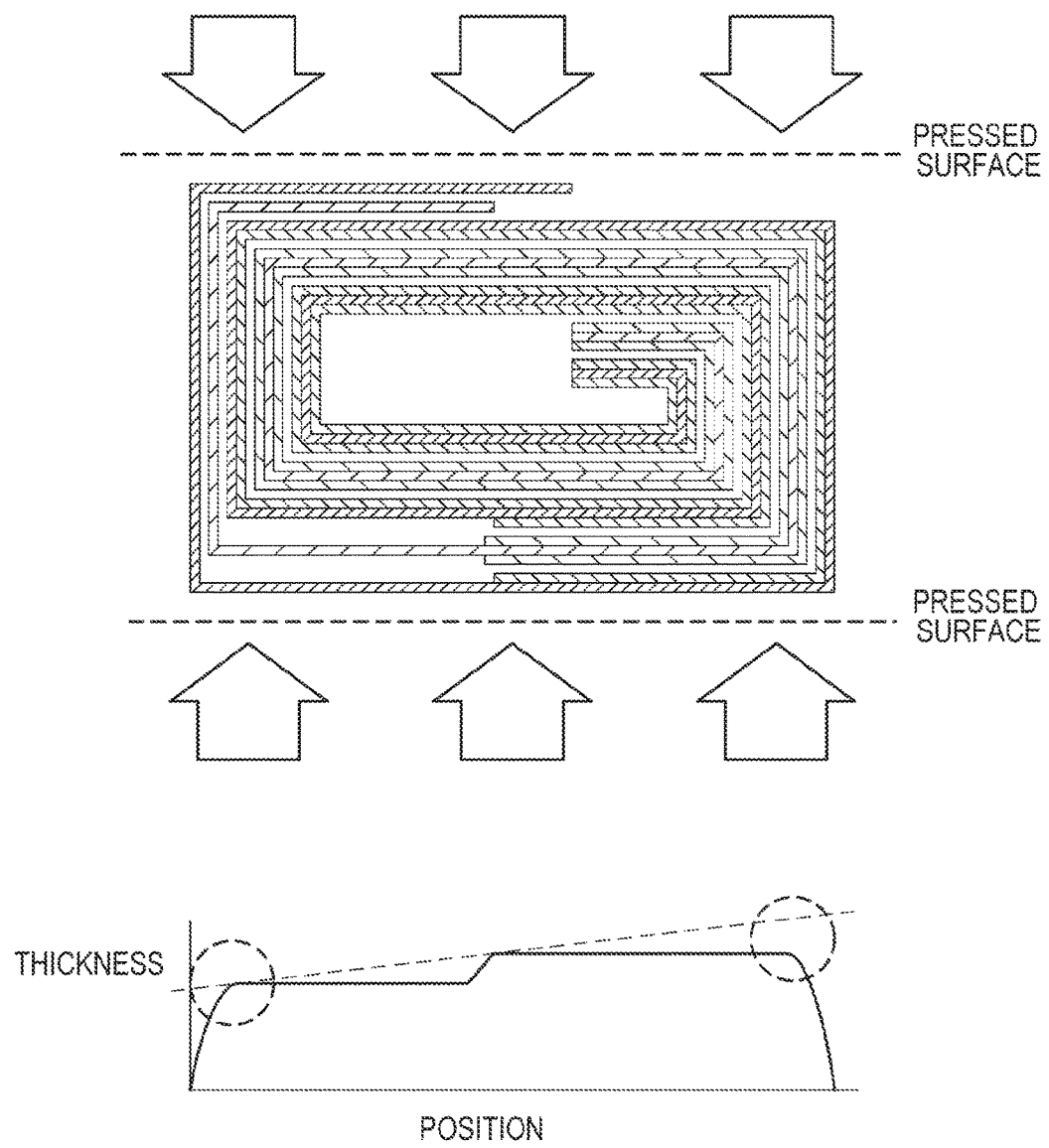
FIG. 15 is a schematic diagram used for explanation of the thickness of a conventional wound electrode element (wound foil structure).

FIG. 15 shows the thickness of a battery in a case of a wound foil structure (half-turn) (Comparative example 7). In the case of the wound foil structure, since the pressure applied around the bent parts in the wound structure is non-uniform as shown in broken circles, the thickness obtained by pressing is also non-uniform.

Figure 16:
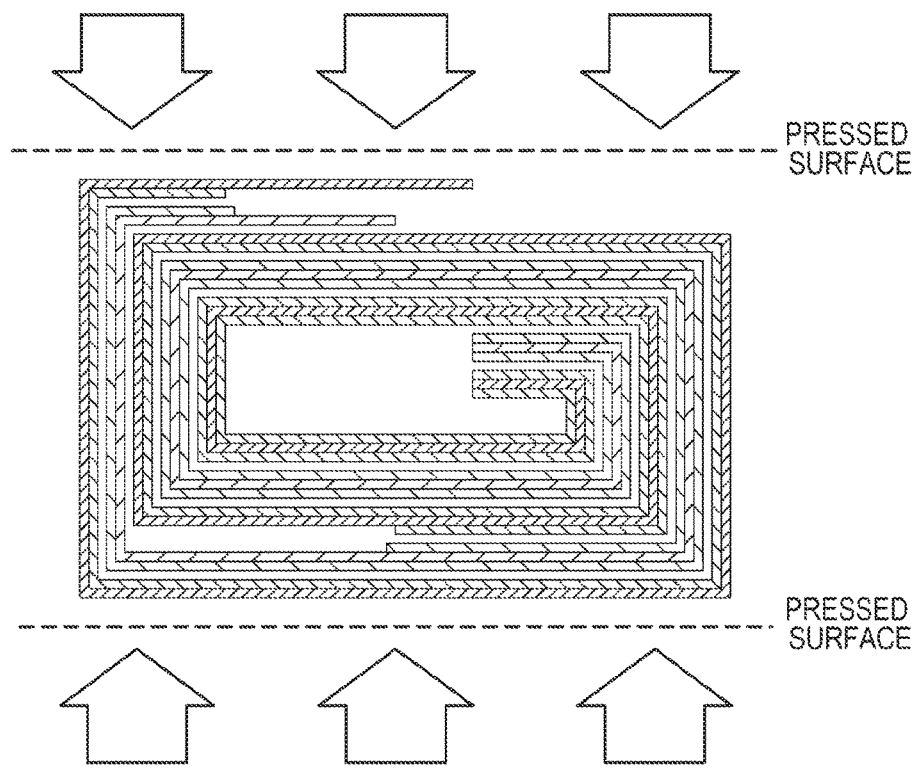
FIG. 16 is a schematic diagram used for explanation of the thickness of a wound electrode element to which the present technology is applied.
Figure 16:
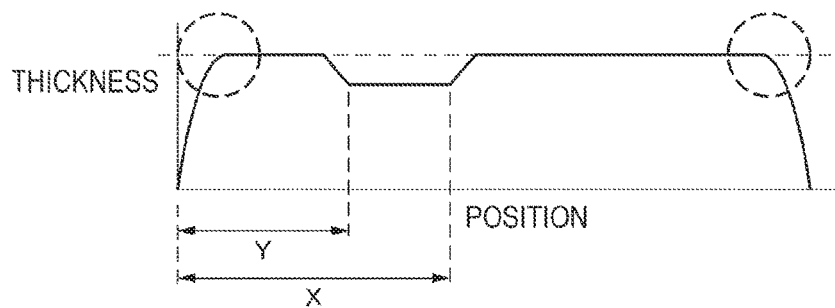

FIG. 16 shows the thickness of a battery in a case of a one-side foil-foil structure (Example 11, Y<X). In the case of the wound foil structure, since the pressure applied around the bent parts in the wound structure is uniform as shown in broken circles, the thickness obtained by pressing is also uniform.

Figure 17:
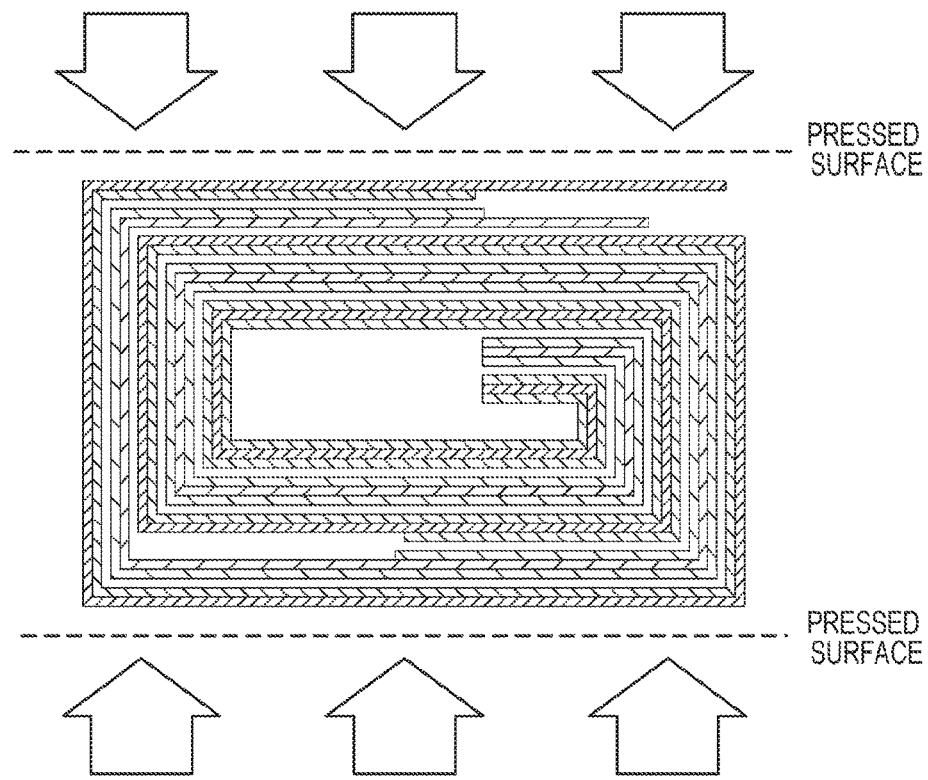
FIG. 17 is a schematic diagram used for explanation of the thickness of a wound electrode element to which the present technology is applied.
Figure 17:
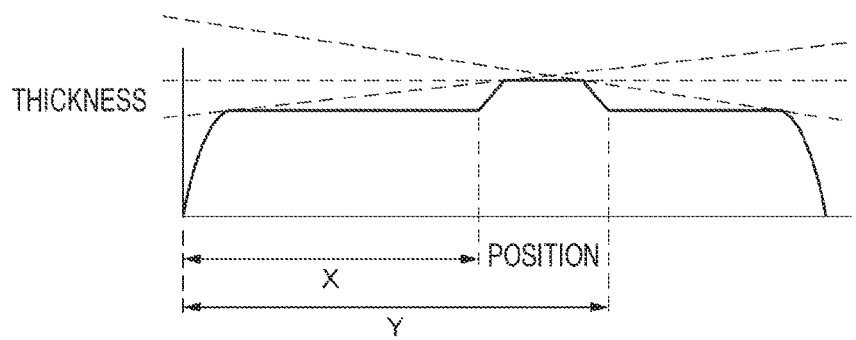

FIG. 17 shows the thickness of a battery in a case of a one-side foil-foil structure (Example 13, Y>X). In the case of the wound foil structure, since the pressure applied around the bent parts in the wound structure is non-uniform as shown in broken circles, the thickness obtained by pressing is also non-uniform.

As described above, it is considered that, in a battery having a one-side foil-foil structure and a dimension of (Y<X), since the thickness around the bent parts is uniform, the pressing pressure is applied uniformly, precipitation of lithium Li around the bent parts is suppressed, and the cycle retention ratio is thus increased.

In addition, in terms of energy density as well, the dimension of (Y<X) is preferable because the thickness distribution of the battery is more uniform, and more preferably, Y is set to be as close as possible to X.

Figure 18:
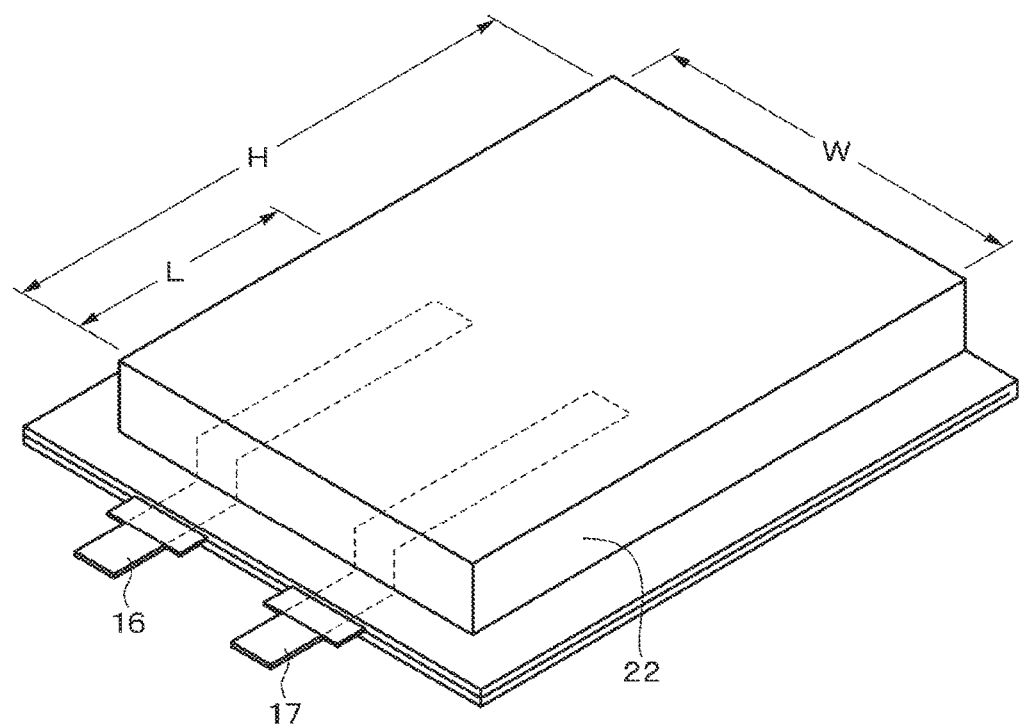
FIG. 18 is a perspective view for explaining electrode leads of a battery pack.

Next, measures for warpage of batteries will be described. FIG. 18 illustrates an external view of a battery 21. A positive electrode lead 16 and a negative electrode lead 17 are led out from an exterior member 22. These leads have thicknesses in a range from 70 [μm] to 100 [μm], and are attached to current collector exposed parts provided on the inner periphery side of the wound electrode element (referred to as an electrode element where appropriate). The width H of a negative electrode included in the wound electrode element (referred to as an electrode element where appropriate) accommodated in the exterior member 22 will be referred to as a height [mm] of the electrode element (see Table 1). In addition, the width W of a face where the leads are lead out will be referred to a width [mm] of the electrode element (see Table 1). Furthermore, the lengths L by which the positive electrode lead 16 and the negative electrode lead 17 are inserted in the wound electrode element (referred to an electrode element where appropriate) accommodated in the exterior member 22 will be referred to as a length [mm] of the positive electrode lead inside the electrode element and a length [mm] of the negative electrode lead inside the electrode element, respectively (see Table 1).

Figure 19:
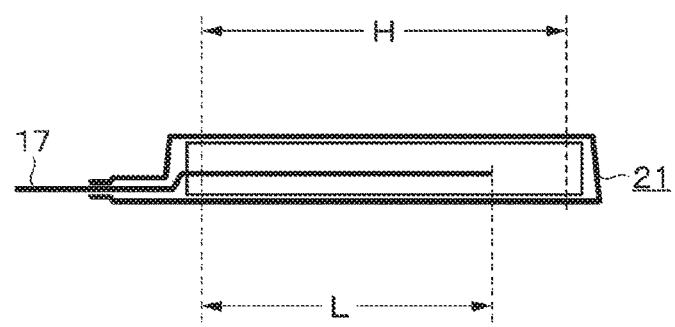
FIGS. 19A and 19B are schematic diagrams for explaining lengths of electrode leads inside a wound electrode element.
Figure 19:
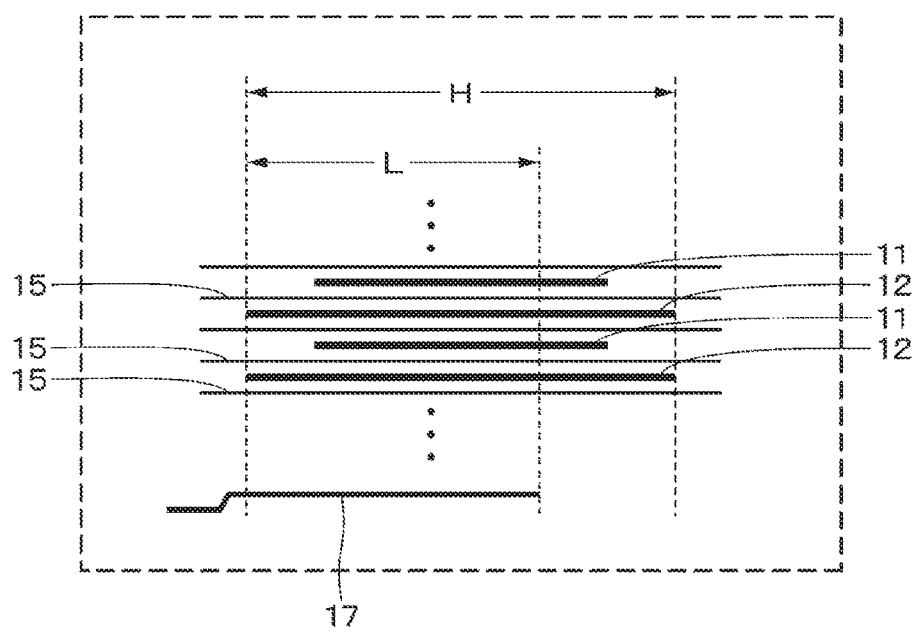

FIG. 19A shows the height H of the electrode element and the length L of the negative electrode lead inside the electrode element in relation to a cross section of the battery 21. In the cross section of the battery 21, as schematically illustrated in FIG. 19B, the positive electrode 11 and the negative electrode 12 are stacked with the separator 15 therebetween. FIGS. 19A and 19B show a configuration relating to the negative electrode lead 17; and the configuration of the positive electrode lead 16 is similar thereto.

Figure 20:
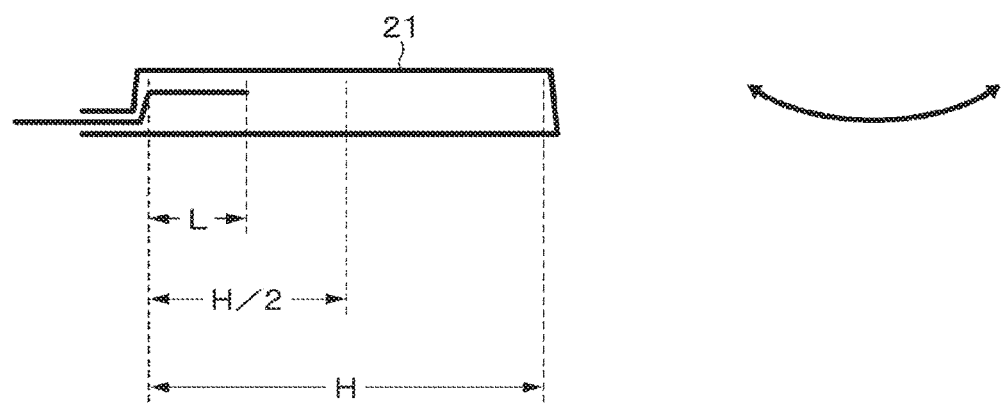
FIGS. 20A and 20B are schematic diagrams for explaining positions where the electrode leads are provided.
Figure 20:
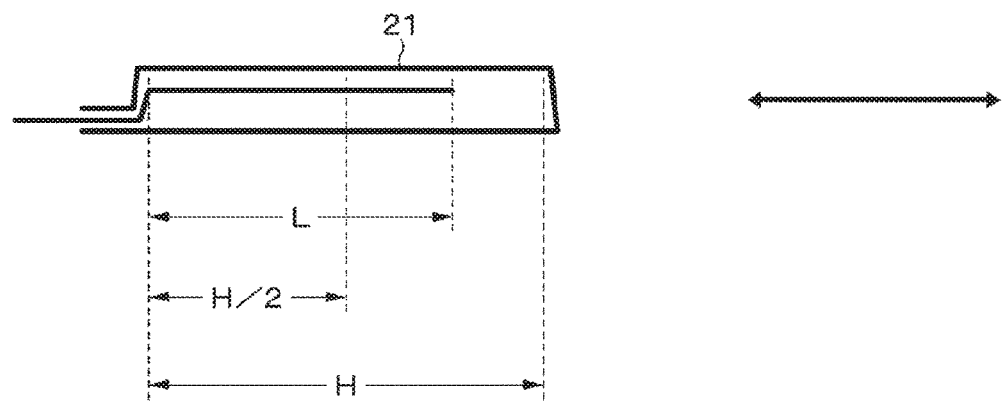

In the battery 21, warpage is caused by combined factors such as the balance of the number of layers above and below the start of winding as the center, and a repulsive force or the like the electrode element receives from the exterior member. The degree of curvature of the warpage is large around the center of the battery. As illustrated in FIG. 20A, when both of the lengths of the positive electrode lead and the negative electrode lead inside the electrode element are equal to or smaller than half (H/2) of the height H of the electrode element, the warpage cannot be suppressed. As illustrated in FIG. 20B, when at least one of the lengths of the positive electrode lead and the negative electrode lead inside the electrode element is longer than half (H/2) the height H of the electrode element, the warpage can be suppressed. Thus, warpage is effectively suppressed by the presence of rigid metal plates such as the leads around the center of the battery.

The definition of warpage will be explained. A thickness measured by sandwiching a battery by two flat plates movable in parallel is represented by A, and a value of thickness at the center of the top surface of the battery measured by placing the battery on a surface plate so that one face of the battery face downward and using a thickness measuring device having a semispherical tip with a diameter of 3 [mm] is represented by B1. A value of thickness at the center of the top surface of the battery measured by placing the battery on the surface plate so that the top and bottom surfaces are opposite to those of the battery for measurement of B1 and in a manner similar to B1 is represented by B2. The difference between the value of the smaller of B1 and B2 and the value of A is defined as a warpage amount. For the measurement, a gauge head or the flat plates are pressed against the battery by a force of 1.5 N. If warpage occurs, the value of A is increased in addition to the pure thickness of the battery. If the battery is attempted to be stored within a space of a rectangular parallelepiped, this means that the volume of the rectangular parallelepiped is increased, and the energy density becomes relatively smaller with the same capacity.

Table 1 described above includes data of "height of electrode element," "length of positive electrode lead inside electrode element," "length of negative electrode lead inside electrode element," and "warpage at full charge." For example, in Example 10, the length of the positive electrode lead inside the electrode element and the length of the negative electrode lead inside the electrode element are both 20 [mm] relative to the height of the electrode element (70 [mm]). Since the lengths are smaller than ½ of the height of electrode element (35 [mm]), warpage at full charge (80 [μm]) has occurred.

Example 15 is different from Example 10 in that the length of the positive electrode lead inside the electrode element and the length of the negative electrode lead inside the electrode element are both 30 [mm]. Since this value is also smaller than ½ of the height of the electrode element (35 [mm]), warpage at full charge (80 [μm]) has occurred.

Example 16 is different from Example 10 in that the length of the positive electrode lead inside the electrode element and the length of the negative electrode lead inside the electrode element are both 40 [mm]. Since this value is larger than ½ of the height of the electrode element (35 [mm]), warpage at full charge is suppressed to (20 [μm]).

Example 17 is different from Example 10 in that the length of the positive electrode lead inside the electrode element is 20 [mm] and the length of the negative electrode lead inside the electrode element is 40 [mm]. Since the length of the negative electrode lead inside the electrode element is larger than ½ of the height of the electrode element (35 [mm]), warpage at full charge is suppressed to (20 [μm]).

Example 18 is different from example 10 in that the length of the positive electrode lead inside the electrode element is 40 [mm] and the length of the negative electrode lead inside the electrode element is 20 [mm]. Since the length of the positive electrode lead inside the electrode element is larger than ½ of the height of electrode element (35 [mm]), warpage at full charge is suppressed to (20 [μm]). As described above, if at least one of the length of the positive electrode lead inside the electrode element and the length of the negative electrode lead inside the electrode element is larger than ½ of the height of electrode element (35 [mm]), warpage of the battery can be suppressed.

Figure 21:
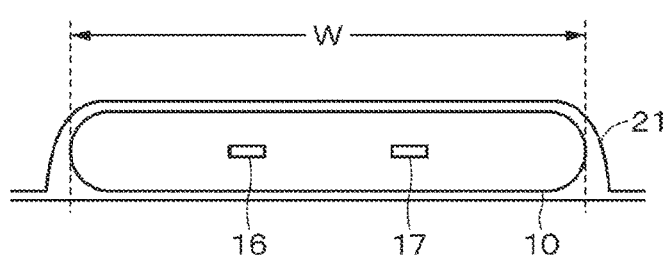
FIGS. 21A and 21B are schematic diagrams for explaining lengths of electrode leads inside a wound electrode element.
Figure 21:
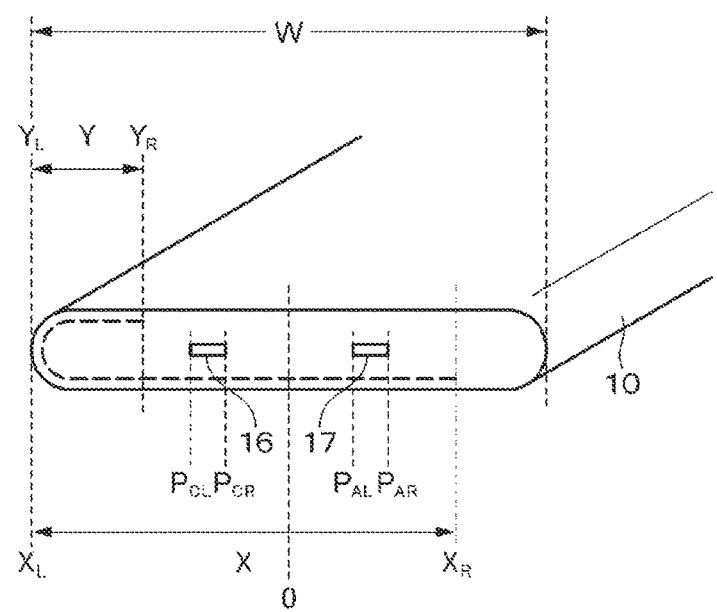

Next, changes in energy density depending on the positions where the electrode leads are led out will be explained. FIG. 21A illustrates an outline of a cross section of the battery 21. The positive electrode lead 16 and the negative electrode lead 17 are attached to the electrode element (wound electrode element) 10 having an electrode element width W. As described above, the one-side foil-foil structure (1) having a part where the current collector exposed surface of the one-side applied part on the outer periphery side of either one of the positive and negative electrodes and the current collector of the other electrode face each other with an insulator (separator) therebetween, and the one-side foil-foil structure (2) having a part where the current collector exposed surface sides of one-side applied parts on the outer periphery side of the positive and negative electrodes face each other improve safety under nail penetration as compared to the normal structure.

Parts where the current collector exposed surfaces provided on the outer periphery side of the electrodes are present on both outer faces of the wound battery. In the parts where the current collector exposed surfaces face each other, when the length from a position (referred to as start position) of the start of a foil-to-foil facing part in the electrode element width direction to a position (referred to as a first bending position) of the corner of a bent part in the electrode element width direction when the electrodes are viewed from the inner periphery side toward the outer periphery side (toward the winding direction) is defined as X, and the length from a position (referred to as a second bending position) of the corner of a bent part in the electrode element width direction to a position (referred to as an end position) of the end of a foil-to-foil facing part in the electrode element width direction when the electrodes are viewed from the inner periphery side toward the outer periphery side (toward the winding direction) is defined as Y, the relation X≥Y is satisfied. In the one-side foil-foil structure (2), parts where a foil exposed surface and a foil on the other of the electrodes face each other are present on both faces of the battery. In the parts where the foil exposed surface and the foil face each other, when the length from a position (referred to as start position) of the start of a foil-to-foil facing part in the electrode element width direction to a position (referred to as a first bending position) of the corner of a bent part in the electrode element width direction when the electrodes are viewed from the inner periphery side toward the outer periphery side (toward the winding direction) is defined as X, and the length from a position (referred to as a second bending position) of the corner of a bent part in the electrode element width direction to a position (referred to as an end position) of the end of a foil-to-foil facing part in the electrode element width direction when the electrodes are viewed from the inner periphery side toward the outer periphery side (toward the winding direction) is defined as Y, the relation X≥Y is satisfied. Note that when only one corner of a bent part is present, the first bending position and the second bending position are the same position, but when a plurality of corners of bent parts are present, the position of a first bent part in the electrode element width direction when the electrodes are viewed from the inner periphery side toward the outer periphery side is the first bending position, and the position of a last bent part in the electrode element width direction when the electrodes are viewed from the inner periphery side toward the outer periphery side is the second bending position.

In FIG. 21B, the start position of a foil-to-foil facing part is represented by $X_R$, the first bending position is represented by $X_L$, the second bending position is represented by $Y_L$, and the end position of a foil-to-foil facing part is represented by $Y_R$. Positions $P_{CL}$ (a position on the side of $X_L$) and $P_{CR}$ (a position on the side of $X_R$) in the electrode element width direction where the positive electrode lead 16 is present are defined. Similarly, positions $P_{AL}$ and $P_{AR}$ in the electrode element width direction of the negative electrode lead 17 are defined. Coordinates of these positions are expressed in [mm] using the midpoint of the width W of the electrode element as 0, the left side ($X_L$) thereof as −, and the right side ($X_R$) thereof as +. The energy density can be increased in such a manner that the positions in the electrode element width direction of both of the positive electrode lead 16 and the negative electrode lead 17 are set between $X_R$ and $Y_R$.

Table 1 described above includes data of "$P_{CL}$," "$P_{CR}$," "$P_{AL}$," "$P_{AR}$," "width of electrode element," "$X_L$," "$X_R$," "X," "$Y_L$," "$Y_R$," and "Y." For example, Example 19 is an example in which the lengths of the positive electrode lead 16 and the negative electrode lead 17 inside the electrode element are both 20 [mm], which are smaller than half the height of 70 [mm] of the electrode element. In addition, ($P_{CL}'$=−14 [mm], $P_{CR}$=−10 [mm], $P_{AL}$=−6 [mm], $P_{AR}$=−2 [mm], width of electrode element=60 [mm], $X_L$=−30 [mm], $X_R$=0 [mm], X=30 [mm], $Y_L$=−30 [mm], $Y_R$=−16 [mm], and Y=14 [mm]) are set. Thus, the condition in which the positions in the electrode element width direction of both of the positive electrode lead 16 and the negative electrode lead 17 are between $X_R$ and $Y_R$ is satisfied. In Example 19, the energy density is 558 [Wh/L], and the safety is highest (nail penetration allowed voltage: 4.50 V).

Example 20 is different from Example 19 in that only the positions of the leads are changed. Specifically, ($P_{CL}$=−14 [mm], $P_{CR}$=−10 [M], $P_{AL}$=10 [mm], $P_{AR}$=14 [mm], width of electrode element=60 [mm], $X_L$=−30 [mm], $X_R$=0 [mm], X=30 [mm], $Y_L$=−30 [mm], $Y_R$=−16 [mm], and Y=14 [mm]) are set. In this case, the negative electrode lead 17 is positioned on a side opposite to $Y_R$ as viewed from $X_R$. Thus, the condition in which the positions in the electrode element width direction of both of the positive electrode lead 16 and the negative electrode lead 17 are between $X_R$ and $Y_R$ is not satisfied. In Example 20, the energy density is 548 [Wh/L], which is smaller than that in Example 19.

As shown by comparison between Example 19 and Example 20, the energy density is increased when the condition in which the positions in the electrode element width direction of the leads are between $X_R$ and $Y_R$ is satisfied.

As described above, in the embodiment of the present technology, the warpage amount of the battery is suppressed, and the energy density is further increased. Note that, since a part where the current collector is exposed is present on the innermost periphery side for about a half to one turn, the position of the electrode lead to be attached to the exposed part can be freely set. In addition, since the thickness of the electrode element does not change when the lengths of the electrode leads inside the electrode element are increased, the problem of lower energy density is not caused.

Next, the positions, the material types, and the like of the protective tape (coating materials) in the present technology have been examined. Note that a coating material includes a base. In addition, an adhesive may be provided on one principal surface of the base of the coating material, which is, however, not essential. As already described, in the present technology, the reason why safety can be enhanced by provision of a foil-to-foil facing part on the outer periphery side of the battery is estimated to be because low-resistance short circuit occurs from the initiation of nail penetration and the heat generation quantity at the part where the electrode application parts face each other is decreased. The foil-to-foil facing parts can be provided with coating materials where appropriate, in addition to the separator, for the purposes of preventing short circuit due to a cutting burr on a current collector or the like. Since the separator is typically made of a porous material and contracts at the same time as heat generation, the separator is less likely to be a cause of inhibition of short circuit of the foil-to-foil facing part. Regarding the coating materials, however, it is suggested that when a material that is hart to melt under heat generation or a material having a large thickness is used, short circuit of the foil-to-foil facing part will be inhibited. Thus, the conditions under which short circuit is inhibited has been examined for various tapes to be the coating materials. The results will be provided below.

The OCV defective rate in Table 2 is defined as follows.

(Definition of OCV Defective Rate)

After a battery is assembled, first charging of the battery is performed, and the battery is then left in the fully charged state for three days. The open circuit voltages (OCV) of the battery before and after being left for three days are compared, and a drop of 0.05 V or larger is counted as defective,

TABLE 2

Figure 23:
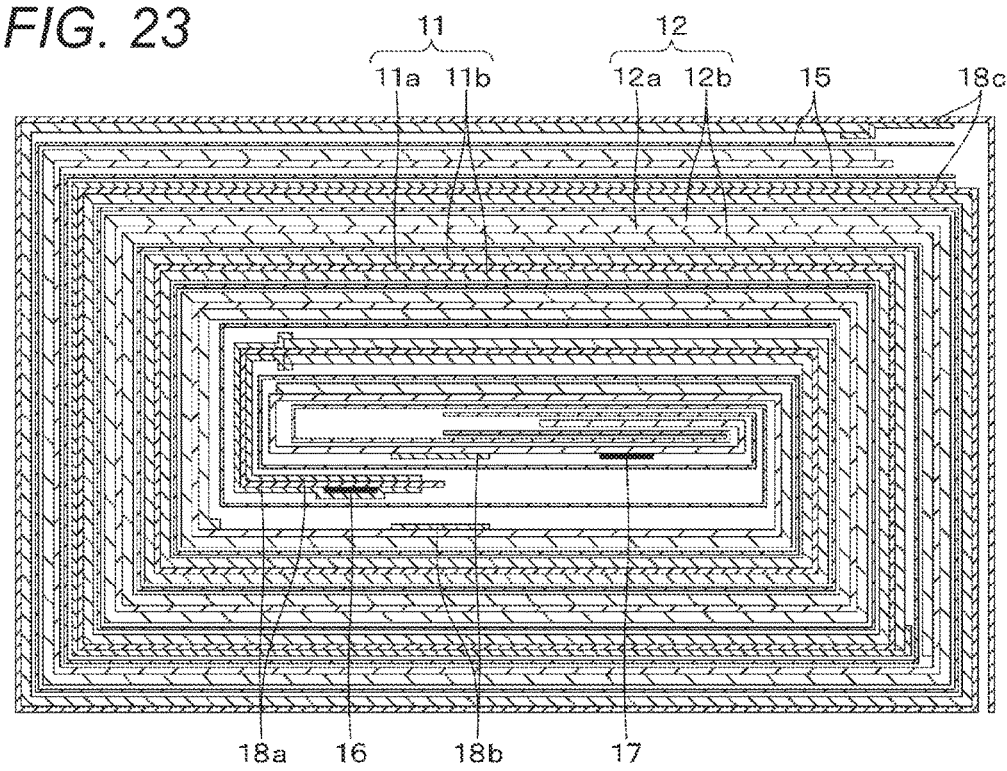
FIG. 23 is a cross-sectional view for explaining a wound electrode element of an example.
Figure 24:
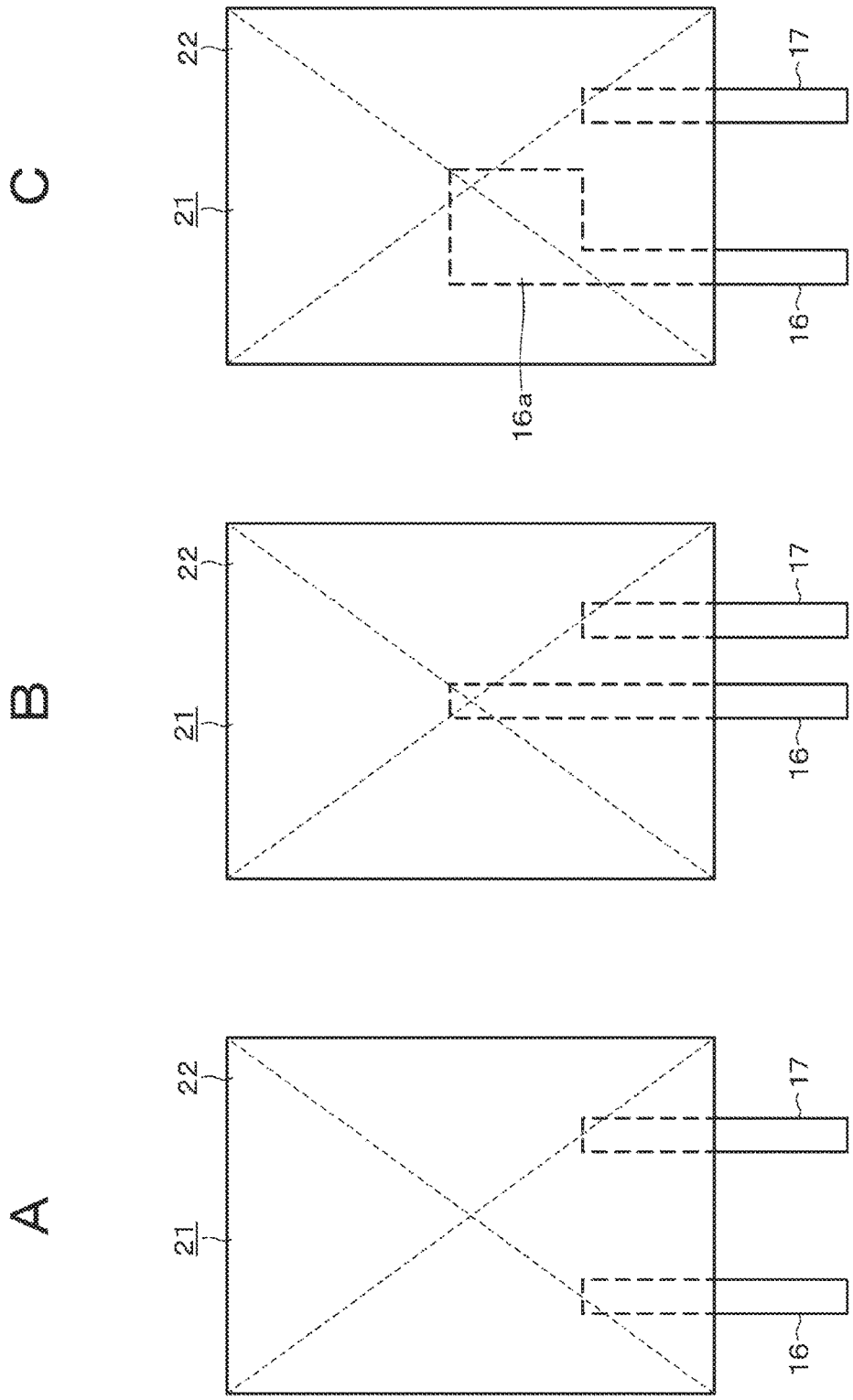
FIGS. 24A to 24C are schematic diagrams illustrating example configurations for increasing safety against nail penetration.

| | | | Inner central portion: foil facing portion protective tape | | | | | |
|---|---|---|---|---|---|---|---|---|
| | | Cross-sectional view of wound electrode element | Tape position | Base material type | Melting point [° C.] | Thickness of adhesive [µm] | Thickness of base material [µm] | Base material melting point × base material thickness [° C. · mm] |
| Examples | 21 | FIG. 11 | 18b | PET | 253 | 3 | 7 | 3.5 |
| | 10 | FIG. 11 | 18b | PET | 253 | 3 | 12 | 6.1 |
| | 22 | FIG. 11 | 18b | PET | 253 | 10 | 20 | 10.1 |
| | 23 | FIG. 11 | 18b | PET | 253 | 10 | 30 | 15.2 |
| | 24 | FIG. 11 | 18b | PET | 253 | 10 | 40 | 20.2 |
| | 25 | FIG. 11 | 18b | PP | 163 | 10 | 40 | 13.0 |
| | 26 | FIG. 11 | 18b | PP | 163 | 10 | 90 | 29.3 |
| | 27 | FIG. 11 | 18b | PI | N/A | 5 | 25 | — |
| | 28 | FIG. 23 | 18a | PET | 253 | 3 | 9 | 8.5 |
| | | | 18b | PP | 163 | 3 | 12 | |
| | 29 | FIG. 23 | 18a | PET | 253 | 3 | 9 | 9.1 |
| | | | 18b | PET | 253 | 3 | 9 | |
| | 30 | FIG. 23 | 18a | PET | 253 | 3 | 12 | 10.0 |
| | | | 18b | PP | 163 | 3 | 12 | |
| | 31 | FIG. 23 | 18a | PET | 253 | 10 | 20 | 14.0 |
| | | | 18b | PP | 163 | 3 | 12 | |
| | 32 | FIG. 24 | 18b | — | — | — | — | — |
| | 33 | FIG. 11 | 18b | PET | 253 | 3 | 12 | 6.1 |
| | 34 | FIG. 11 | 18b | PET | 253 | 3 | 12 | 6.1 |
| Comparative examples | 12 | FIG. 11 | 18b | PET | 253 | 3 | 12 | 6.1 |
| | 13 | FIG. 11 | 18b | PET | 253 | 3 | 12 | 6.1 |
| | 14 | FIG. 11 | 18b | PET | 253 | 3 | 12 | 6.1 |
| Examples | 35 | FIG. 11 | No tape | No tape | — | — | — | — |
| | 36 | FIG. 11 | 18b | PET | 253 | 3 | 12 | 6.1 |
| | 37 | FIG. 11 | No tape | No tape | — | — | — | — |
| | 38 | FIG. 11 | No tape | No tape | — | — | — | — |
| | 39 | N/A | 18b | PET | 253 | 3 | 12 | 6.1 |

| | | Outer central portion: foil facing portion protective tape | | | | | | |
|---|---|---|---|---|---|---|---|---|
| | | Tape position | Base material type | Melting point [° C.] | Thickness of adhesive [µm] | Thickness of base material [µm] | Base material melting point × base material thickness [° C. · mm] | Nail penetration allowed voltage [V] | OCV defective rate (%) |
| Examples | 21 | 18c | PET | 253 | 3 | 12 | 3.0 | 4.20 | 0 |
| | 10 | 18c | PET | 253 | 3 | 12 | 3.0 | 4.20 | 0 |
| | 22 | 18c | PET | 253 | 3 | 12 | 3.0 | 4.20 | 0 |
| | 23 | 18c | PET | 253 | 3 | 12 | 3.0 | 4.15 | 0 |
| | 24 | 18c | PET | 253 | 3 | 12 | 3.0 | 4.15 | 0 |
| | 25 | 18c | PET | 253 | 3 | 12 | 3.0 | 4.20 | 0 |
| | 26 | 18c | PET | 253 | 3 | 12 | 3.0 | 4.15 | 0 |
| | 27 | 18c | PET | 253 | 3 | 12 | 3.0 | 4.15 | 0 |
| | 28 | 18c | PET | 253 | 3 | 12 | 3.0 | 4.20 | 0 |
| | 29 | 18c | PET | 253 | 3 | 12 | 3.0 | 4.20 | 0 |
| | 30 | 18c | PET | 253 | 3 | 12 | 3.0 | 4.20 | 0 |
| | 31 | 18c | PET | 253 | 3 | 12 | 3.0 | 4.15 | 0 |
| | 32 | 18c | PET | 253 | 3 | 12 | 3.0 | 4.15 | 0 |
| | 33 | 18c | PET | 253 | 3 | 9 | 2.3 | 4.20 | 0 |
| | 34 | 18c | PET | 253 | 6 | 14 | 3.5 | 4.20 | 0 |
| Comparative examples | 12 | 18c | PET | 253 | 7 | 18 | 4.6 | 3.85 | 0 |
| | 13 | 18c | PET | 253 | 10 | 20 | 5.1 | 3.85 | 0 |
| | 14 | 18c | PI | — | 5 | 25 | — | 3.85 | 0 |
| Examples | 35 | 18c | PET | 253 | 3 | 12 | 3.0 | 4.20 | 3 |
| | 36 | No tape | — | — | — | — | — | 4.20 | 24 |
| | 37 | No tape | — | — | — | — | — | 4.20 | 29 |
| | 38 | No tape | — | — | — | — | — | 4.20 | 0 |
| | 39 | 18c | PET | 253 | 3 | 12 | 6.1 | 4.20 | 0 | and the ratio of the number of defective cells to 100 assembled cells is defined as an OCV defective rate.

The method of measuring the melting points of the protective tape bases is as follows.

(Method of Measuring Melting Point)

The melting point of a tape base is measured by a differential scanning calorimetry (DSC). The measurement is conducted by cutting a 5 mg of specimen having a thickness of 0.1 mm to fit the shape of a measurement container, encapsulating the specimen into the calorimetry, raising the temperature at 10° C./min, measuring a DSC curve, and obtaining the temperature at a peak of the melting point of the base on the DSC curve as the melting point. In this process, α-alumina powder is encapsulated in a different container and used as a reference, the amount of the α-alumina powder being about the same volume as the specimen.

An outline of the examples and the comparative examples in Table 2 is as follows.

Examples 21 to 24

In Examples 21 to 24, the wound electrode element having the cross-sectional structure illustrated in FIG. 11 is used. The tape 18c on the positive electrode outer periphery side is similar to that in Example 10, and the thickness of the tape 18b on the negative electrode inner periphery side is changed as shown in Table 2.

Examples 25 to 27

In Examples 25 to 27, the wound electrode element having the cross-sectional structure illustrated in FIG. 11 is used. The positive electrode outer periphery side tape 18c is similar to that in Example 10, and the material type of the negative electrode inner periphery side tape 18b is changed as shown in Table 2.

Examples 28 to 31

Figure 22:
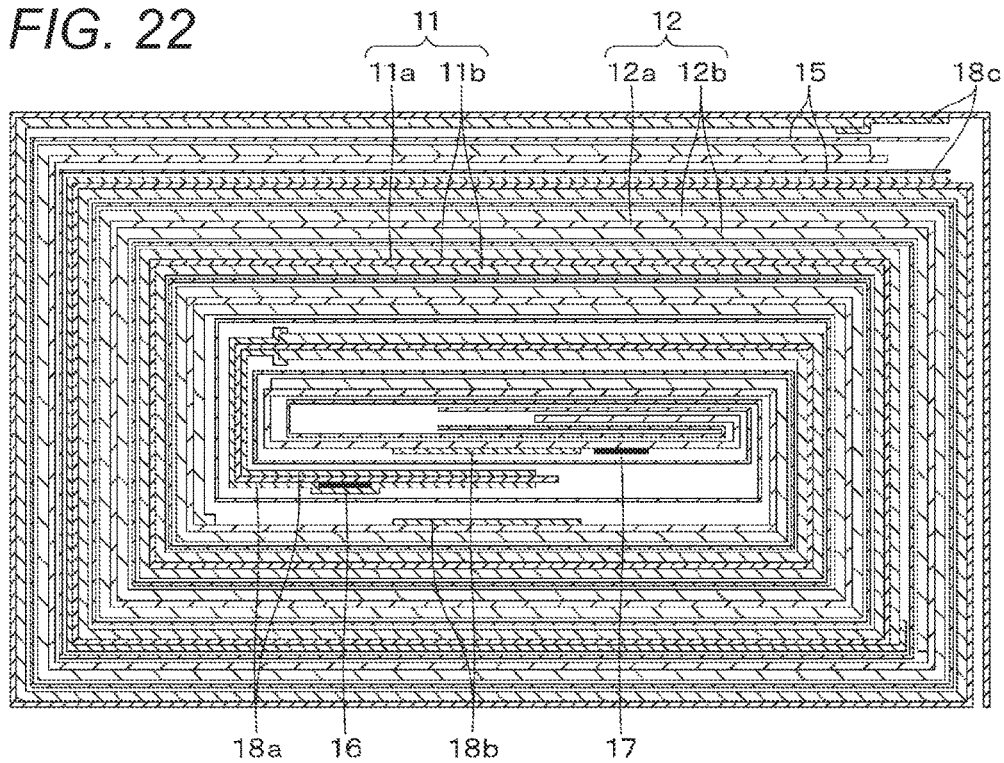
FIG. 22 is a cross-sectional view for explaining a wound electrode element of an example.

In Examples 28 to 31, the wound electrode element having a cross-sectional structure illustrated in FIG. 22 is used. In this wound electrode element, a coating material (positive electrode inner periphery side tape) 18a and a coating material (negative electrode inner periphery side tape) 18b face each other with the separator therebetween in a central part of the battery on the inner periphery side.

Example 32

In Example 32, the wound electrode element having a cross-sectional structure illustrated in FIG. 23 is used. The wound electrode element has a structure in which a positive electrode current collector 11a where no active material is used does not reach the center portion of the battery.

Examples 33 and 34, Comparative Examples 12 to 14

In Examples 33 and 34 and Comparative examples 12 to 14, the wound electrode element having a cross-sectional structure illustrated in FIG. 11 is used. The negative electrode inner periphery side tape 18b is made of PET (polyethylene terephthalate) of 15 μm, and the thickness of the positive electrode outer periphery side tape 18c is changed as shown in Table 2.

Examples 35 to 38

The wound electrode element having the cross-sectional structure illustrated in FIG. 11 is used. Examples 35 to 37 are examples in which the negative electrode inner periphery side tape 18b or the positive electrode outer periphery side tape 18c is present, in which only the negative electrode inner periphery side tape 18b is present, or in which neither of the negative electrode inner periphery side tape 18b and the positive electrode outer periphery side tape 18c is provided.

Example 39

The positions of the positive electrode and the negative electrode in the wound electrode element of Example 10 are replaced with each other, and the resulting structure is used as a wound electrode element of Example 39 (not illustrated).

[Results of Examples and Comparative Examples Shown in Table 2]

Examples 21 to 31 shown in Table 2 are examples in which the thickness and the materials of the outer periphery side tape are constant while the base type and the thickness of the inner periphery side tape are changed. A certain law is derived from the results of Examples 21 to 31.

Specifically, it has been found that when a product of the melting point (° C.) of the tape base between the current collectors and the thickness (mm) of the base is smaller than 14.0 (° C.·mm), the part functions as a foil-to-foil facing part, and when the product is not smaller than 14.0 (° C.·mm), the part does not function as a foil-to-foil facing part. The fact that the foil-to-foil facing part on the inner periphery side has lost its function as a low-resistance short-circuit part is estimated from the fact that comparison shows that the nail penetration allowed voltages are the same in Examples 23, 24 and 26 where the product is not smaller than 14.0 (° C.·mm) and in Example 32 where no foil-to-foil facing part on the inner periphery side is present. It can be considered that the product of the melting point (° C.) and the thickness (mm) of the base is correlated with easiness of melting of the coating material and that the coating material base is less easily melted as the product is larger. If the product of the melting point (° C.) of the base and the thickness (mm) of the base is large, it is estimated that the coating material, which does not melt even under heat generation, blocks short circuit between foils, which lowers the safety under nail penetration.

Note that, since the drop of the nail penetration allowed voltage is as small as 0.05 V even when the foil-to-foil facing part on the inner periphery side is present, and since the nail penetration allowed voltage is a sufficiently high value as compared to that of the normal structure shown in Comparative example 5, the result does not show that the presence of the foil-to-foil facing part on the inner periphery side is essential in the embodiment of the present technology.

In addition, even in a case where polyimide (PI), which is a highly heat-resistant material whose melting point is normally not observed, is used for the base (Example 27), the nail penetration allowed voltage is equivalent to that in Example 32. It has thus been shown that a foil-to-foil facing part provided with a tape having a highly heat-resistant base whose melting point is not observed also loses its function as a foil-to-foil facing part.

Examples 33 and 34 and Comparative examples 12, 13, and 14 are examples in which the thickness and the material of the inner periphery side tape are constant while the base type and the thickness of the outer periphery side are changed. A certain law is derived from the results of Examples 33 and 34 and Comparative examples 12, 13 and 14. Specifically, it has been found that when a product of the melting point (° C.) of the tape base between foils and the total thickness (mm) of the base is smaller than 4.6 (° C.·mm), the part functions as a foil-to-foil facing part, and when the product is not smaller than 4.6 (° C.·mm) the part does not function as a foil-to-foil facing part. The fact that the foil-to-foil facing part on the inner periphery side has lost its function as a low-resistance short-circuit part is estimated from the fact that the nail penetration allowed voltage are the same in Comparative examples 12, 13, and 14 in which the product is not smaller than 4.6(° C.·mm) and in Comparative example 5 in which no foil-to-foil facing part on the outer periphery side is present.

Note that it is unclear for what cause the conditions for a foil-to-foil facing part to function as a low-resistance short-circuit part are different between the inner periphery side and the outer periphery. Since, however, the temperature of the nail tip is low at the start of the nail penetration, it is estimated that the tape present on a foil-to-foil facing part on the outer periphery side needs to be easier to melt, otherwise low-resistance short circuit will be hard to occur. As long as the foil-to-foil facing part satisfies the condition to function as a low-resistance short-circuit part, the same tape can be used or tapes of different base types and thicknesses can be used on the inner periphery side and the outer periphery side.

The roles of a tape on a foil-to-foil facing part now will be described in detail. Basically, as already mentioned above, a tape is provided to prevent short circuit of the positive and negative electrodes. Note that, in a case where foils of a foil-to-foil facing part are isolated from each other only by a separator, a non-uniform part, if any of an electrolytic solution causes local imbalance of voltage, which leads to a state in which metal is likely to be precipitated. When the precipitation of metal grows breaking through the separator, the battery is short-circuited.

Examples 35 to 37 show respective results when some or all of the protective tapes on the foil-to-foil facing parts are removed. The OCV defective rates are larger than that in Example 10 in which no protective tapes are removed. Note that, in the examples and the comparative examples of the present technology except Example 38, the gel electrolytes are directly applied to the positive and negative electrodes so that the electrolytic solution is present in the battery. It is observed in this case that the gel electrolytes are not present in the foil-to-foil facing parts and the electrolytic solution leaks from the electrode application parts to the foil-to-foil facing parts during hot forming, which causes the electrolytic solution to exist non-uniformly in the foil-to-foil facing part as described above. As actually shown in Example 38, when hot forming is performed after the electrode element is inserted in the laminate and a sufficient amount of electrolytic solution is then added in the laminate, the electrolytic solution evenly spreads over the foil-to-foil facing part, and the OCV defective rate is 0% accordingly. The mechanism described above can thus be explained logically.

Here, to summarize the conditions for providing and not providing a tape on a foil-to-foil facing part, even if no tape on a foil-to-foil facing part is provided, the foil-to-foil facing part can cause low-resistance short circuit without causing problems such as decrease in OCV, depending on the battery production processes. Furthermore, if a tape having a material and a thickness that satisfy certain conditions is selected, the tape can be provided without inhibiting the function of low-resistance short circuit of a foil-to-foil facing part. Example 38 shows a result of sufficiently immersing the foil-to-foil facing part in the electrolytic solution containing no polymer. The form of the electrolytic solution present here, however, is not limited, and the electrolyte may be in a form of a gel electrolyte containing a polymer or the like.

Example 39 is an example in which the positions of the positive electrode and the negative electrodes in Example 10 are reversed. As shown in Table 2, the equivalent nail penetration allowed voltage as that in Example 10 is obtained in Example 39. The present technology presents a structure obtained by winding starting basically with a separator alone and then inserting electrodes in an order of a negative electrode and then a positive electrode. Note that the order of the positive electrode and the negative electrode is not limited, and a structure obtained by inserting the positive electrode after the separator and then winding with the negative electrode may be employed in the present technology.

(Reinforcement of Short Circuit Between Foils in Innermost Periphery)

Depending on the state in which a nail penetrates, heat generation at the portion where short circuit between foils has occurred may become greater, which may result in release of the short circuit, and a desired short circuit state may not be achieved. Short circuit between foils refers to short circuit of aluminum foil (the positive electrode current collector 11a) and copper foil (the negative electrode current collector 12a) at a low resistance. As heat generation becomes greater, the aluminum foil may be melted and the state of short circuit at a low resistance may be released. Aluminum foil is often used for the current collector of the positive electrode, and copper foil is often used for the current collector of the negative electrode. In this case, since aluminum foil has a lower melting point, release of short circuit is likely to occur. Thus, release of short circuit can be suppressed by reinforcement with the positive electrode lead 16. Specifically, the positive electrode lead 16 can be provided at a part where safety against nail penetration is to be increased, so that release of short circuit is suppressed and higher safety is achieved. If nail penetration at the center of a cell is assumed, use of structures as illustrated in FIGS. 24A to 24C is effective.

FIGS. 24A, 24B, and 24C illustrate external views of the battery 21 in which the positive electrode lead 16 and the negative electrode lead 17 are led out from the exterior member 22. Normally, as illustrated in FIG. 24A, the positive electrode lead 16 and the negative electrode lead 17 are led out from positions that are substantially symmetric with respect to the center of the battery 21.

In contrast, as illustrated in FIG. 24B, the position of the positive electrode lead 16 is near the center, and the length for which the positive electrode lead 16 is inserted in the electrode element inside the exterior member 22 is extended to near the center of the battery 21. As another configuration, as illustrated in FIG. 24C, a rectangular region 16a is formed at the end of the part of the positive electrode lead 16 inserted in the electrode element inside the exterior member 22, and the rectangular region 16a is located near the center of the battery 21.

Figure 25:
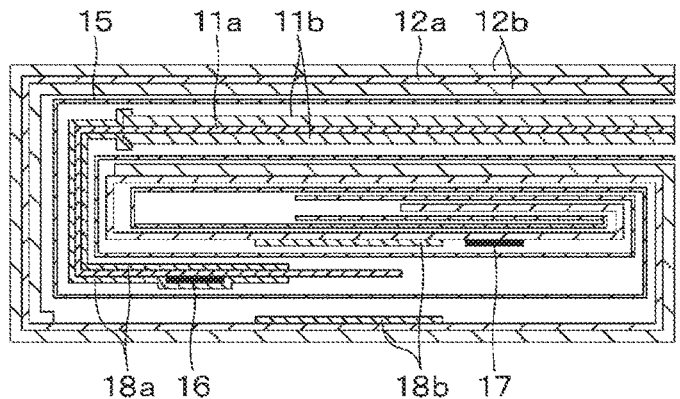
FIGS. 25A to 25C are schematic diagrams illustrating example configurations for suppressing release of short circuit.
Figure 25:
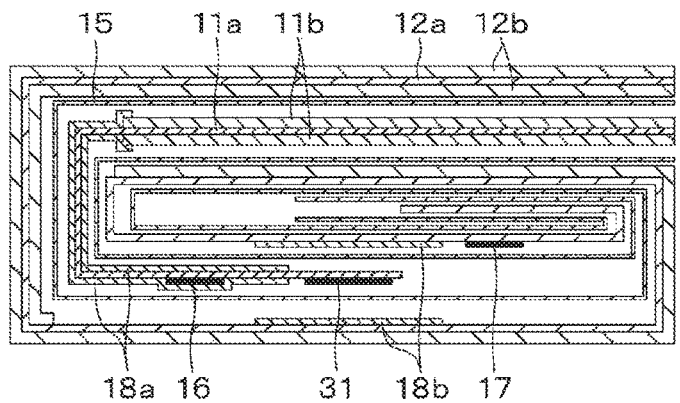
Figure 25:
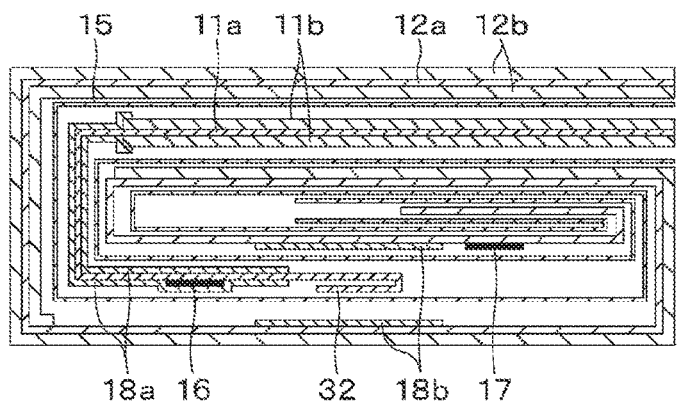

Furthermore, example configurations for suppressing release of short circuit are illustrated in FIGS. 25A to 25C. FIG. 25A illustrates an example of a cross-sectional structure of a wound electrode element (similar to FIG. 23, for example). In the wound electrode element as illustrated, a coating material (positive electrode inner periphery side tape) 18a and a coating material (negative electrode inner periphery side tape) 18b face each other with the separator therebetween in a central part of the battery on the inner periphery side. In an example illustrated in FIG. 25B, foil on the innermost periphery is coated with a conductive member 31. The conductive member 31 may be foil, or a conductive tape. The conductive member only needs to be electrically connected to the original current collecting foil, and thickness of the conductive member is not limited. In addition, as long as the conductive member is provided at a desired position, the conductive member may be welded or fixed by a tape or the like.

In an example illustrated in FIG. 25C, a cut end of foil at the innermost periphery is turned back to form a turned-back portion 32. The turned-back portion 32 may be over the entire width of the current collecting foil or may be over part of the width. In addition, the number of turnbacks is not particularly limited, and it is effective to increase the number of turnbacks when low-resistance short circuit is likely to be released.

(Integration of Multiple Battery Elements by Exterior Member)

To achieve a larger capacity, there is an attempt to accommodate a plurality of battery elements in one exterior member. A battery produced to have a larger capacity in this manner has a problem of decreased safety. In increasing capacity in this manner, safety can be increased by application of the present technology. Specifically, in order to secure safety while maintaining decrease in energy density as little as possible of a battery having a large capacity, a structure in which elements having the one-side foil-foil structure are stacked and inserted in one exterior member can be used.

Figure 26:
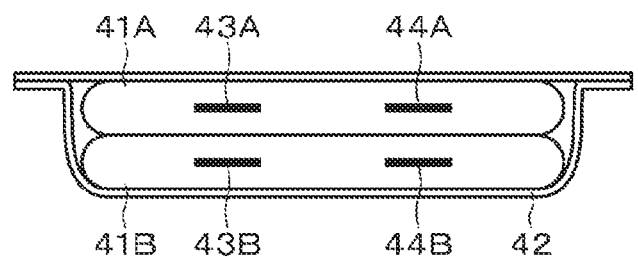
FIGS. 26A and 26B are schematic diagrams for explaining a configuration in which two wound electrode elements are accommodated in one exterior member.
Figure 26:
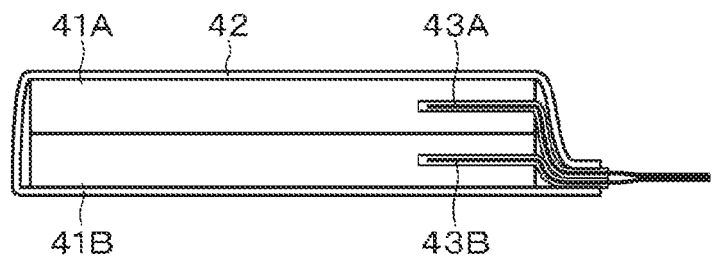

FIG. 26A is a cross-sectional view illustrating a transverse section of a battery 40 having a configuration in which two wound electrode elements 41A and 41B are accommodated in one exterior member 42, for example, and FIG. 26B is a cross-sectional view illustrating a longitudinal section of the battery 40. A positive electrode lead 43A and a negative electrode lead 44A are led out from the wound electrode element 41A, and a positive electrode lead 43B and a negative electrode lead 44B are led out from the wound electrode element 41B. The positive electrode leads 43A and 43B are fixed by thermoplastic resin on the outside and then commonly connected, and the negative electrode leads 44A and 44B are also commonly connected in a similar manner. Positive electrode current collecting foils located on the outermost periphery of the wound electrode elements 41A and 41B come into contact with each other inside the exterior member 42.

The wound electrode elements 41A and 41B are the second example (the one-side foil-foil structure (2)) (see FIG. 7) of the wound structure of the present technology, for example. The one-side foil-foil structure (2) is a structure in which a foil current collector exposed part of a one-side applied part of the positive electrode 11 faces a current collector exposed part of a one-side applied part of the negative electrode 12, as illustrated in a broken circle. Specifically, the one-side foil-foil structure (2) is a battery having a part where the current collector exposed surface sides of one-side applied parts on the outer side of the winding of the positive and negative electrodes face each other. When the number of layers in a case where one wound electrode element is accommodated in the exterior member 42 is represented by n, the number of layers of each of the wound electrode elements 41A and 41B is set to n/2, so that a capacity close to that of the original battery will be achieved. In a case where the original number of layers is indivisible by the number of stacked elements, the wound electrode elements to be inserted are set to have different numbers of layers, so that a structure in which a plurality of elements are integrated and in which changes in the electrode thickness and capacity from those of the original battery are minimized can be obtained. Table 3 shows results of experiments in which the original number of layers is 14. Note that the number of layers is obtained by counting the number of pairs of positive and negative electrodes in the thickness direction of the battery at a position of a negative electrode tab.

TABLE 3

|  |  | Structure | Number of inserted cells | Thickness of members | | |
|---|---|---|---|---|---|---|
|  |  |  |  | Al [μm] | Cu [μm] | Separator [μm] |
| Examples | 10 | One-side foil-foil structure (2) | 1 | 10 | 6 | 5.5 |
|  | 47 | One-side foil-foil structure (2) | 1 | 10 | 6 | 5.5 |
|  | 48 | One-side foil-foil structure (2) | 1 | 15 | 15 | 5.5 |
|  | 49 | One-side foil-foil structure (2) | 2 | 10 | 6 | 5.5 |
|  | 50 | One-side foil-foil structure (2) | 2 | 10 | 6 | 5.5 |
|  | 51 | One-side foil-foil structure (2) | 2 | 10 | 6 | 5.5 |
|  | 52 | One-side foil-foil structure (2) | 2 | 10 | 6 | 5.5 |
|  | 53 | One-side foil-foil structure (2) | 2 | 10 | 6 | 5.5 |
|  | 54 | One-side foil-foil structure (2) | 2 | 10 | 6 | 5.5 |
| Comparative examples | 15 | Normal structure | 1 | 10 | 6 | 5.5 |
|  | 16 | Normal structure | 2 | 10 | 6 | 5.5 |

|  |  | Method of connection between positive and negative electrode leads | Lead resistance between cells [mΩ] *Total of positive and negative electrode leads | Cell resistance [mΩ] | Capacity [mAh] | Cell thickness during charging [mm] | Nail penetration allowed voltage [V] |
|---|---|---|---|---|---|---|---|
| Examples | 10 | — | — | 35.4 | 3000 | 4.24 | 4.2 |
|  | 47 | — | — | 35.4 | 4730 | 6.45 | 4.05 |
|  | 48 | — | — | 27.6 | 4730 | 6.8 | 4.2 |
|  | 49 | Welding lead roots | 4.4 | 17.9 | 4730 | 6.73 | 4.3 |
|  | 50 | Welding entire leads | 4.3 | 17.9 | 4730 | 6.73 | 4.3 |
|  | 51 | Welding lead ends | 8.3 | 18.8 | 4730 | 6.73 | 4.4 |
|  | 52 | Welding lead ends | 8.3 | 18.9 | 4730 | 6.74 | 4.4 |
|  | 53 | Connect resistor between leads | 12 | 19.3 | 4730 | 6.73 | 4.45 |
|  | 54 | Connect PTC thermistor between leads | 12 | 19.3 | 4730 | 6.73 | 4.45 |
| Comparative examples | 15 | — | — | 35.4 | 4730 | 6.31 | 3.8 |
|  | 16 | Welding lead roots | 4.4 | 17.9 | 4730 | 6.59 | 4.0 |

In Table 3, Example 10 corresponds to Example 10 in Table 1. Examples 47 and 48 each show a case where the number of inserted cells (the number of wound electrode elements) is 1. Comparative example 15 is an example in which one wound electrode element having the normal structure is inserted. In a case where the one-side foil-foil structure is employed, the amount by which the safety is lowered when the capacity is increased (Example 47) can be made smaller than that when the capacity is increased with the normal structures (Comparative example 15). With an increased thickness of the members, higher safety is achieved (Example 48).

For example, in a case where a plurality of one-side foil-foil structures (2) illustrated in FIG. 7 are stacked and inserted in the exterior member, a foil-to-foil facing part will be located near the exterior member regardless of which face a nail is stuck into. Thus, since the safing mechanism of the wound foil structure (as orginially-filed in U.S. application Ser. No. 15/517,041) and the safing mechanism of the one-side foil-foil structure (2) (as orginially-filed in U.S. application Ser. No. 15/517,041) are also maintained in the state in which the wound elements are stacked, high safety is deemed to be achieved (comparison between Example 49 and Comparative example 16).

When a battery of a large capacity is formed of a single cell of the one-side foil-foil structure (2), the foil thickness has to be increased so that a result of a nail penetration allowed voltage of 4.2 V is obtained, which results in a cell thickness during charging of 6.8 mm. In contrast, when a battery is formed of a battery of two stacked cells of the one-side foil-foil structures (2), a result of a nail penetration allowed voltage of 4.3 V can be obtained without increasing the foil thickness, and the cell thickness during charging in this case is 6.73 mm. This shows that employment of the two-cell stacked structure is more advantageous in terms of energy density (Examples 48 and 49).

In addition, as a result of examination of current flow under nail penetration in a two-cell stacked structure, it has been found that the heat generation quantity at the start of nail penetration is smaller as the resistance between the two cells is larger. Since it is the method of connecting the electrode leads that determines the resistance between the two cells, the safety is examined with different connection methods thereof. As a result, it has been found that the nail penetration allowed voltage is higher as the resistance between electrode leads is larger.

FIGS. 27A to 27E illustrate a plurality of examples of lead connection methods. Although the connection methods for the positive electrode leads 43A and 43B will be presented, the negative electrode leads 44A and 44B are similarly connected. In addition, the resistance between electrode leads is a resistance measured between the commonly connected positive electrode leads (43A and 43B) and the commonly connected negative electrode leads (44A and 44B).

Figure 27:
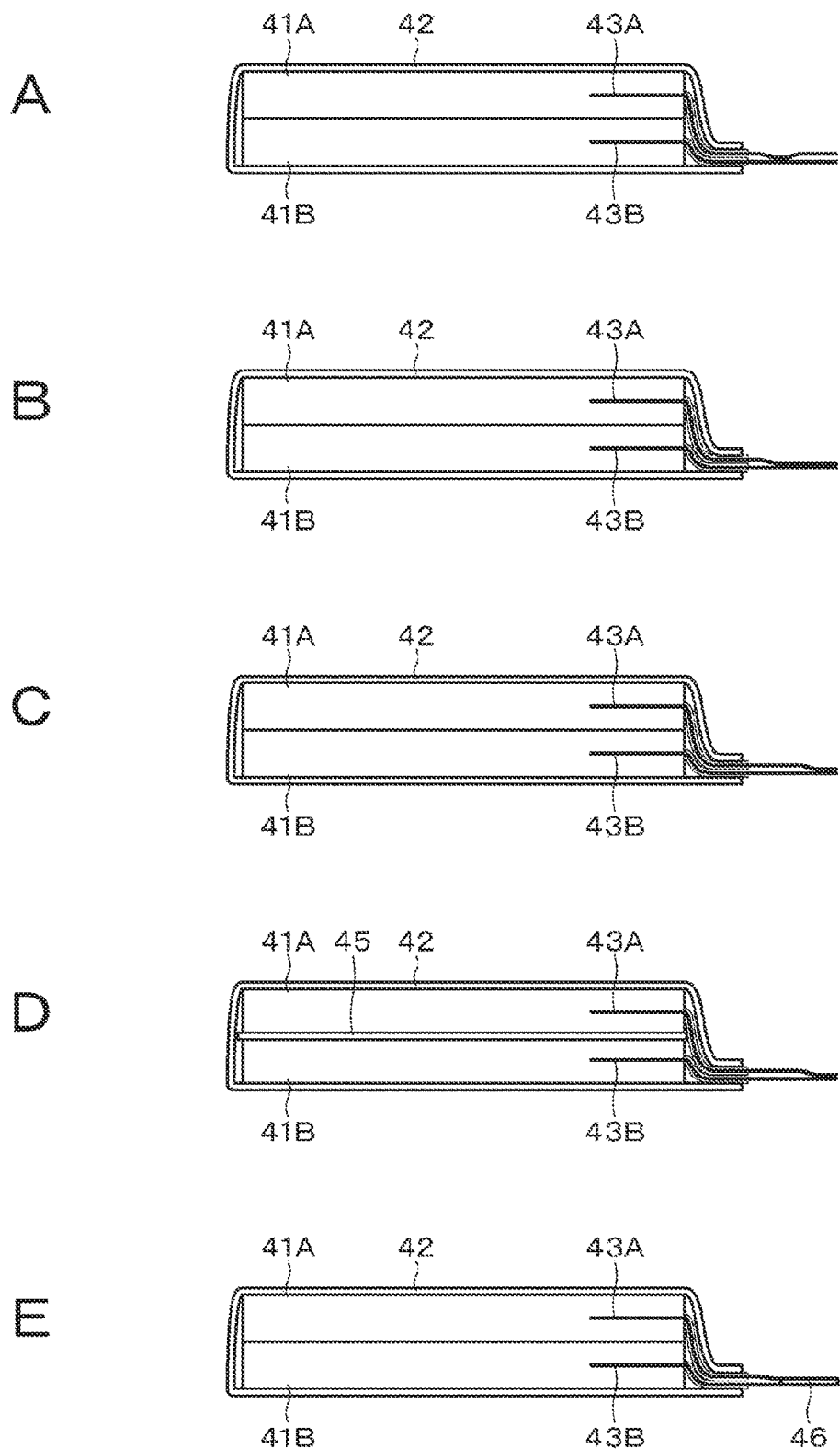
FIGS. 27A to 27E are schematic diagrams illustrating a plurality of examples of lead connection methods.

A connection method of FIG. 27A is a method of welding roots of the positive electrode leads 43A and 43B outside of the exterior member 42. The negative electrode leads 44A and 44B are similarly connected. This connection method is employed in Example 49.

A connection method of FIG. 27B is a method of welding the whole of the positive electrode leads 43A and 43B outside of the exterior member 42. The negative electrode leads 44A and 44B are similarly connected. This connection method is employed in Example 50.

A connection method of FIG. 27C is a method of welding ends of the positive electrode leads 43A and 43B outside of the exterior member 42. The negative electrode leads 44A and 44B are similarly connected. This connection method is employed in Example 51.

A connection method of FIG. 27D is a method of welding ends of the positive electrode leads 43A and 43B outside of the exterior member 42. The negative electrode leads 44A and 44B are similarly connected. Furthermore, a separator 45 made of an insulator for isolating the wound electrode elements 41A and 41B from each other is provided. This connection method is employed in Example 52. Comparison between Examples 51 and 52 show that the effects are also achieved when the elements are not electrically isolated from each other.

When the resistance between the leads is large, the resistance of the entire battery increases as viewed from the device side. Depending on the intended used, it is also effective to place a thermosensitive device 46 such as a positive temperature coefficient (PTC) thermistor, which increases in resistance only when current flows, between the positive electrode leads 43A and 43B as illustrated in FIG. 27E. The negative electrode leads 44A and 44B are similarly connected. The connection method in which a resistor is placed is employed in Example 53, and the connection method in which a PTC is placed is employed in Example 54.

(Explanation of "Lead Resistance Between Cells (Total of Positive and Negative Electrode Leads)")

Figure 28:
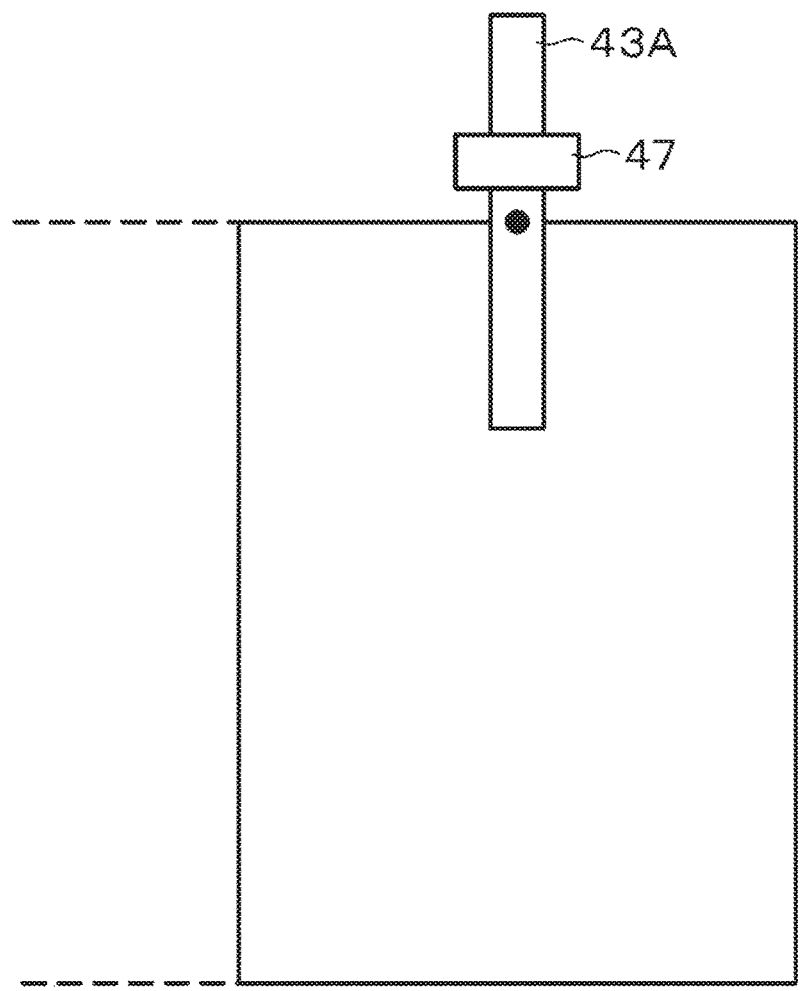
FIG. 28 is a schematic diagram used for explanation of lead resistance between cells in an example.
Figure 29:
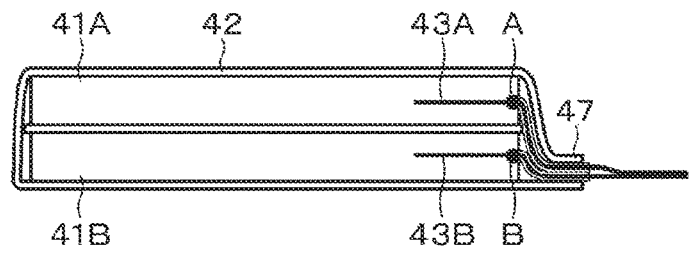
FIG. 29 is a schematic diagram used for explanation of lead resistance between cells in an example.

When a position shown by a black dot in FIG. 28 is defined as a root of an electrode lead (the positive electrode lead 43A, for example) connected to a current collector, the resistance between the roots of the positive electrode leads 43A and 43B of two wound electrode elements (that is, the resistance between point A and point B in FIG. 28) is referred to as the "resistance between leads on the positive electrode side." The resistance between the roots of the electrode leads on the negative electrode side of two wound electrode elements is referred to as the "resistance between leads on the negative electrode side." A total of the resistances between leads on the positive and negative electrode sides is defined as the "lead resistance between cells (total of positive and negative electrode leads)." Note that, in FIGS. 28 and 29, when two lead electrodes are drawn out of the exterior member, thermoplastic resin 47 is provided to fill a gap between lead electrodes and the exterior member and seal the wound electrode element.

3. Applications

<3-1. Example of Battery Pack>

Figure 30:
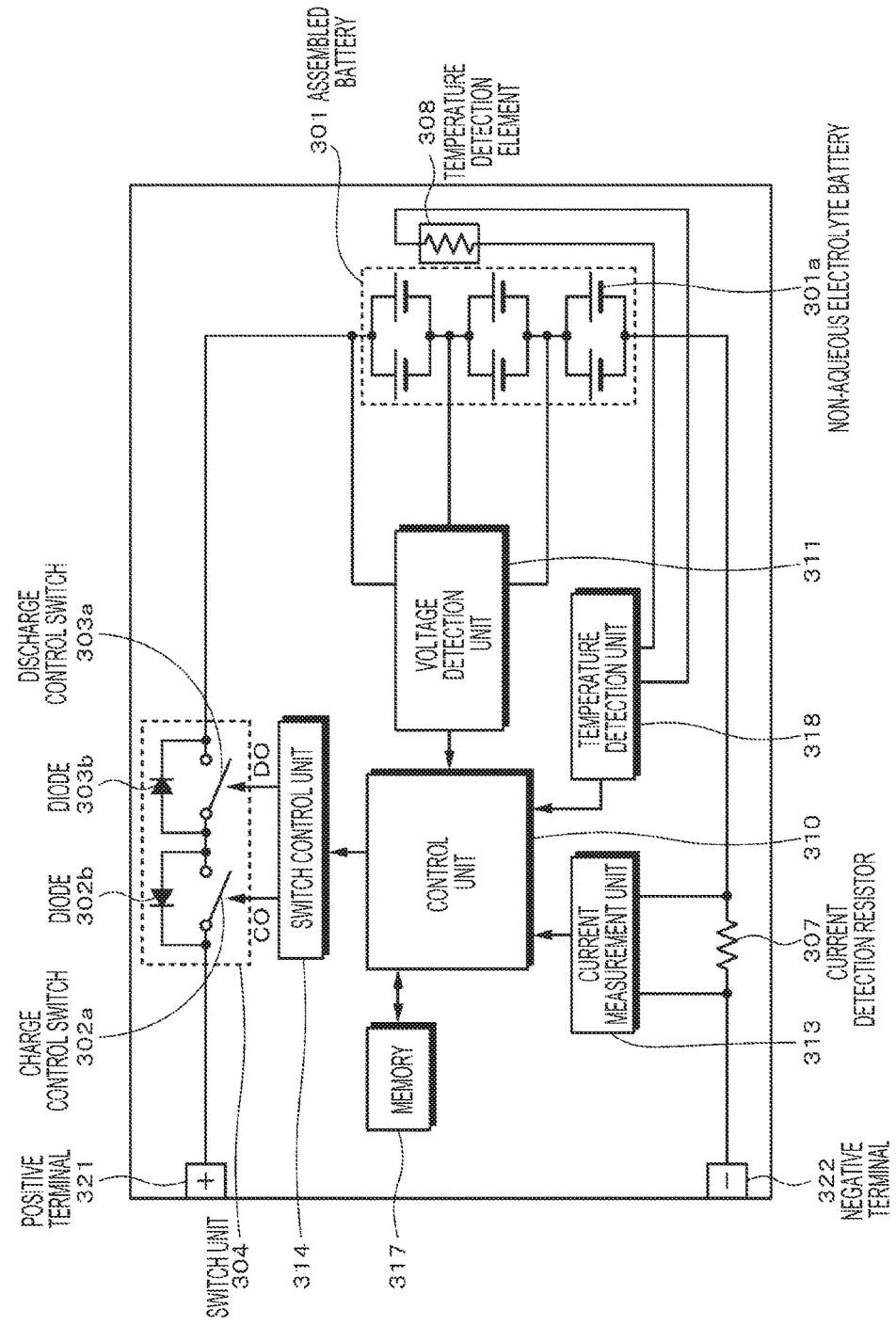
FIG. 30 is a block diagram illustrating an example circuit configuration of a battery pack to which the present technology is applied.

FIG. 30 is a block diagram illustrating an example circuit configuration of a case where a battery (hereinafter referred to as a secondary battery where appropriate) according to an embodiment of the present technology is applied to a battery pack. The battery pack includes an assembled battery 301, an exterior member, a switch unit 304 including a charge control switch 302*a* and a discharge control switch 303*a*, a current detection resistor 307, a temperature detection element 308, and a control unit 310.

In addition, the battery pack includes a positive terminal 321 and a negative electrode lead 322. During charging, the positive terminal 321 and the negative electrode lead 322 are connected to a positive terminal and a negative terminal, respectively, of a charger, for charging. In addition, during use of an electronic device, the positive terminal 321 and the negative electrode lead 322 are connected to a positive terminal and a negative terminal, respectively, of the electronic device, for discharging.

The assembled battery 301 includes a plurality of secondary batteries 301a connected in series and/or in parallel. The secondary batteries 301a are second batteries of the present technology. Note that, while a case where six secondary batteries 301a are connected in 2 parallel and 3 series (2P3S) is illustrated as an example in FIG. 30, batteries may alternatively be connected in any manner such as n parallel and m series (n and m are integers).

The switch unit 304 includes the charge control switch 302a and a diode 302b, and the discharge control switch 303a and a diode 303b, and is controlled by the control unit 310. The diode 302b has a polarity that is reverse to charging current flowing in the direction from the positive terminal 321 toward the assembled battery 301 and in the same direction as discharging current flowing in the direction from the negative electrode lead 322 toward the assembled battery 301. The diode 303b has a polarity that is in the same direction as the charging current and reverse to the discharging current. Note that, while the switch unit 304 is provided on the + side in the example, the switch unit 304 may be provided on the − side.

When the battery voltage has reached an overcharge detection voltage, the charge control switch 302a is turned off and controlled by a charge/discharge control unit so that charging current will not flow through a current path of the assembled battery 301. After the charge control switch 302a is turned off, only discharging through the diode 302b is enabled. In addition, when a large current has flowed during charging, the charge control switch 302a is turned off and controlled by the control unit 310 so that charging current flowing through the current path of the assembled battery 301 will be interrupted.

When the battery voltage has reached an overdischarge detection voltage, the discharge control switch 303a is turned off and controlled by the control unit 310 so that discharging current will not flow through the current path of the assembled battery 301. After the discharge control switch 303a is turned off, only charging through the diode 303b is enabled. In addition, when a large current has flowed during discharging, the discharge control switch 303a is turned off and controlled by the control unit 310 so that discharging current flowing through the current path of the assembled battery 301 will be interrupted.

The temperature detection element 308 is a thermistor, for example, provided near the assembled battery 301, and configured to measure the temperature of the assembled battery 301 and supply the measured temperature to the control unit 310. A voltage detection unit 311 measures the voltage of each of the secondary batteries 301a constituting the assembled battery 301, performs A/D conversion of the measured voltage, and supplies the conversion result to the control unit 310. A current measurement unit 313 measures current by using the current detection resistor 307, and supplies the measured current to the control unit 310.

A switch control unit 314 controls the charge control switch 302a and the discharge control switch 303a of the switch unit 304 on the basis of voltage and current input from the voltage detection unit 311 and the current measurement unit 313. When the voltage of any of the secondary batteries 301a has become the overcharge detection voltage or has become the overdischarge detection voltage or lower, or when a large current has suddenly flowed, the switch control unit 314 send a control signal to the switch unit 304 so as to prevent overcharge, overdischarge, or overcurrent charging/discharging.

Here, in a case where the secondary batteries are lithium ion secondary batteries, for example, the overcharge detection voltage is set to 4.20 V±0.05 V, for example, and the overdischarge detection voltage is set to 2.4 V±0.1 V, for example.

For charge/discharge switches, semiconductor switches such as MOSFETs can be used. In this case, parasitic diodes of MOSFETs function as the diodes 302b and 303b. When P-channel FETs are used for charge/discharge switches, the switch control unit 314 supplies control signals DO and CO to gates of the charge control switch 302a and the discharge control switch 303a, respectively. When the charge control switch 302a and the discharge control switch 303a are of P-channel type, the charge control switch 302a and the discharge control switch 303a are turned on by a gate potential lower than a source potential by a predetermined value or larger. Specifically, in normal charging and discharging operation, the control signals CO and DO are set to low level, and the charge control switch 302a and the discharge control switch 303a are in the ON state.

Then, in a case of overcharge or overdischarge, for example, the control signals CO and DO are set to high level, and the charge control switch 302a and the discharge control switch 303a are in the OFF state.

A memory 317 is constituted by a RAM or a ROM, such as an erasable programmable read only memory (EPROM), which is a nonvolatile memory, for example. The memory 317 stores in advance numerical values computed by the control unit 310, the internal resistances or the like of the battery in the initial state of the secondary batteries 301a measured during a manufacturing process, and is also rewritable where necessary. In addition, full charge capacities of the secondary batteries 301a can be stored, so that a remaining battery level can be calculated with the control unit 310, for example.

A temperature detection unit 318 measures temperature by using the temperature detection element 308, to perform charging/discharging control in abnormal increase in temperature or perform correction in calculation of the remaining battery level.

<3-2. Examples of Electricity Storage System, Etc.>

The battery according to an embodiment of the present technology described above can be mounted on or used for power supply to equipment such as electronic devices, electric vehicles, and electricity storage devices.

Examples of the electronic devices include a laptop personal computer, a smart phone, a tablet terminal, a personal digital assistant (PDA), a mobile phone, a wearable terminal, a cordless handset phone machine, a video movie, a digital still camera, an electronic book, an electronic dictionary, a music player, a radio, a headphone, a game machine, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a load conditioner, and a traffic signal.

In addition, examples of the electric vehicle include a railroad vehicle, a golf cart, an electric cart, and an electric car (including a hybrid car), and the battery is used as a driving power source or an auxiliary power source thereof.

Examples of the electricity storage device include power sources of power storage units for buildings such as residential houses or for power generation facilities.

Hereinafter, specific examples of the electricity storage system using the electricity storage device to which the battery of the present technology described above is applied will be described among the applications mentioned above.

Examples of configurations of the electricity storage system include the following. A first electricity storage system is an electricity storage system in which the electricity storage device is charged by a power generator configured to generate power from renewable energy. A second electricity storage system is an electricity storage system including the electricity storage device, and configured to supply power to an electronic device connected to the electricity storage device. A third electricity storage system is an electronic device that receives power from the electricity storage device. These electricity storage systems are embodied as systems for efficiently supplying power in cooperation with an external power supply network.

Furthermore, a fourth electricity storage system is an electric vehicle including a converter configured to receive power supply from the electricity storage device and convert the power into driving power for the vehicle, and a control device configured to perform information processing related to vehicle control on the basis of information on the electricity storage device. A fifth electricity storage system is a power system including power information transmitting/receiving unit for transmitting/receiving signals to/from other devices via a network, for performing charge/discharge control of the electricity storage device described above on the basis of information received by the transmitting/receiving unit. A sixth electricity storage system is a power system that receives power supply from the electricity storage device described above, and supplies power from a power generator or a power grid to the electricity storage device. The electricity storage system will be described below.

<3-2-1. Electricity Storage System in Home as Application>

Figure 31:
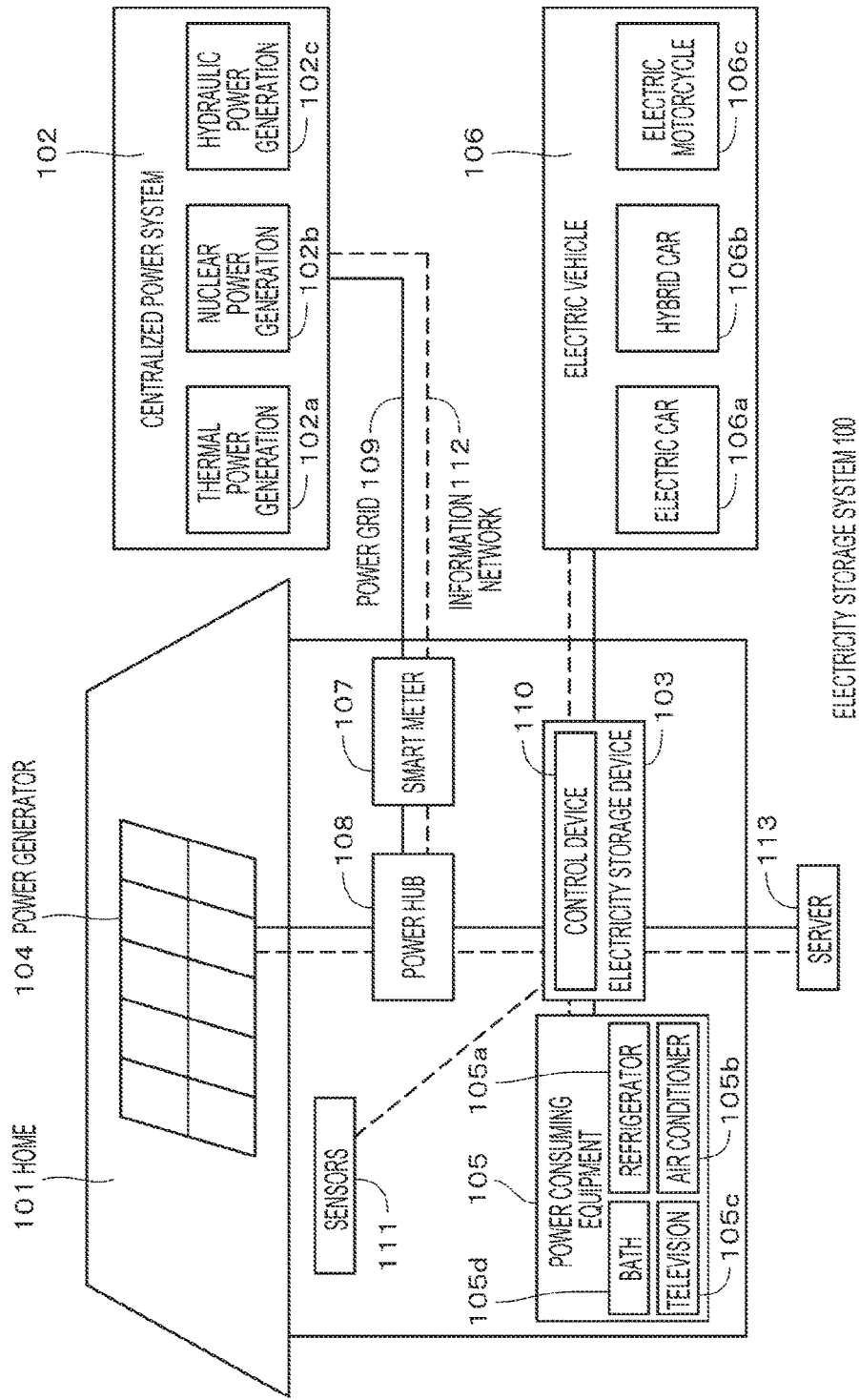
FIG. 31 is a schematic diagram illustrating a home electricity storage system to which the present technology is applied.

An example in which the electricity storage device with the battery of the present technology is applied to a home electricity storage system will be described with reference to FIG. 31. For example, in an electricity storage system 100 for a home 101, power is supplied to an electricity storage device 103 from a centralized power system 102 of thermal power generation 102a, nuclear power generation 102b, hydraulic power generation 102c, and the like via a power grid 109, an information network 112, a smart meter 107, a power hub 108, and the like. In addition, power is supplied from an independent power source such as a home power generator 104 to the electricity storage device 103. The supplied power is stored in the electricity storage device 103. With the electricity storage device 103, the electric power to be used in the home 101 is fed to the home 101. The electricity storage system similar to the above can be used not only in the home 101 but also in an office building.

The power generator 104, power consuming equipment 105, the electricity storage device 103, a control device 110 that controls the respective devices, the smart meter 107, and sensors 111 that acquires various kinds of information are provided in the home 101. The devices are connected via the power grid 109 and the information network 112. Solar cells, fuel cells, or the like are used as the power generator 104, and power generated thereby is supplied to the power consuming equipment 105 and/or the electricity storage device 103. The power consuming equipment 105 includes a refrigerator 105a, an air conditioner 105b, a television 105c that is a television receiver, a bath 105d, and the like. Furthermore, the power consuming equipment 105 further includes electric vehicles 106. The electric vehicles 106 include an electric car 106a, a hybrid car 106b, and an electric motorcycle 106c.

The battery of the present technology is applied to the electricity storage device 103. The battery of the present technology may be constituted by the lithium ion secondary batteries described above, for example. The smart meter 107 has functions of measuring consumption of commercial power and transmitting the measured consumption to an electricity company. The power grid 109 may be any one of DC power supply, AC power supply, and non-contact power supply, or a combination thereof.

Examples of the various sensors 111 include a human sensor, an illuminance sensor, an object detection sensor, a consumed electric power sensor, a vibration sensor, a contact sensor, a temperature sensor, and an infrared sensor. Information acquired by the various sensors 111 is transmitted to the control device 110. Weather conditions, human conditions, and the like are obtained according to information from the sensors 111, which allows automatic control of the power consuming equipment 105 to minimize energy consumption. Furthermore, the control device 110 can transmit information on the home 101 to an external electricity company or the like via the Internet.

The power hub 108 performs processing such as branching of an electric power line or DC-AC conversion. Examples of the communication method for the information network 112 connected with the control device 110 include a method using a communication interface such as universal asynchronous receiver-transmitter (UART), and a method using a sensor network according to a radio communication standard such as Bluetooth (registered trademark), ZigBee (registered trademark), or Wi-Fi (registered trademark). The Bluetooth (registered trademark) method is applicable to multimedia communication and enables communication through one-to-many connection. ZigBee (registered trademark) uses physical layers of IEEE (Institute of Electrical and Electronics Engineers) 802.15.4. IEEE802.15.4 is the name of a short-range wireless network standard called a personal area network (PAN) or wireless (W) PAN.

The control device 110 is connected to an external server 113. The server 113 may be controlled by any of the home 101, an electricity company, and a service provider. The information to be transmitted and received by the server 113 is power consumption information, life pattern information, electric power charges, weather information, natural hazard information, and information related to electricity trading, for example. The information may be transmitted/received to/from power consuming equipment (a television receiver, for example) in a home, or may be transmitted/received from a device (a mobile phone, for example) outside of a home. The information may be displayed on a device having display functions, such as a television receiver, a mobile phone, a personal digital assistant (PDA), or the like.

The control device 110 for controlling the respective units includes a central processing unit (CPU), a random access memory (RAM), a read only memory (ROM), and the like, and is stored in the electricity storage device 103 in this example. The control device 110 is connected with the electricity storage device 103, the home power generator 104, the power consuming equipment 105, the various sensors 111, and the server 113 via the information network 112, and has functions of adjusting the consumption of commercial power and power generation, for example. Note that the control device 110 may also have other functions such as functions of performing power transactions in an electric power market.

As described above, not only power from the centralized power system 102 such as the thermal power generation 102a, the nuclear power generation 102b, and the hydraulic power generation 102c, power generated by the home power generator 104 (photovoltaic power generation, wind power generation) can also be stored in the electricity storage device 103. Thus, even if the amount of power generated by the home power generator 104 fluctuates, control such as making the amount of power to be transmitted to the outside constant or discharging by a necessary amount can be performed. For example, power may be used in such a manner that power acquired by photovoltaic power generation is stored in the electricity storage device 103, power at a lower late-night rate is stored in the electricity storage device 103, and power stored in the electricity storage device 103 is discharged for use during the day when the rate is high.

Note that an example in which the control device 110 is stored in the electricity storage device 103 has been described in this example; however, the control device 110 may be stored in the smart meter 107 or may be a single unit. Furthermore, the electricity storage system 100 may be used for a plurality of homes in a multiple dwelling house or a plurality of detached houses.

<3-2-2. Electricity Storage System in Vehicle as Application>

Figure 32:
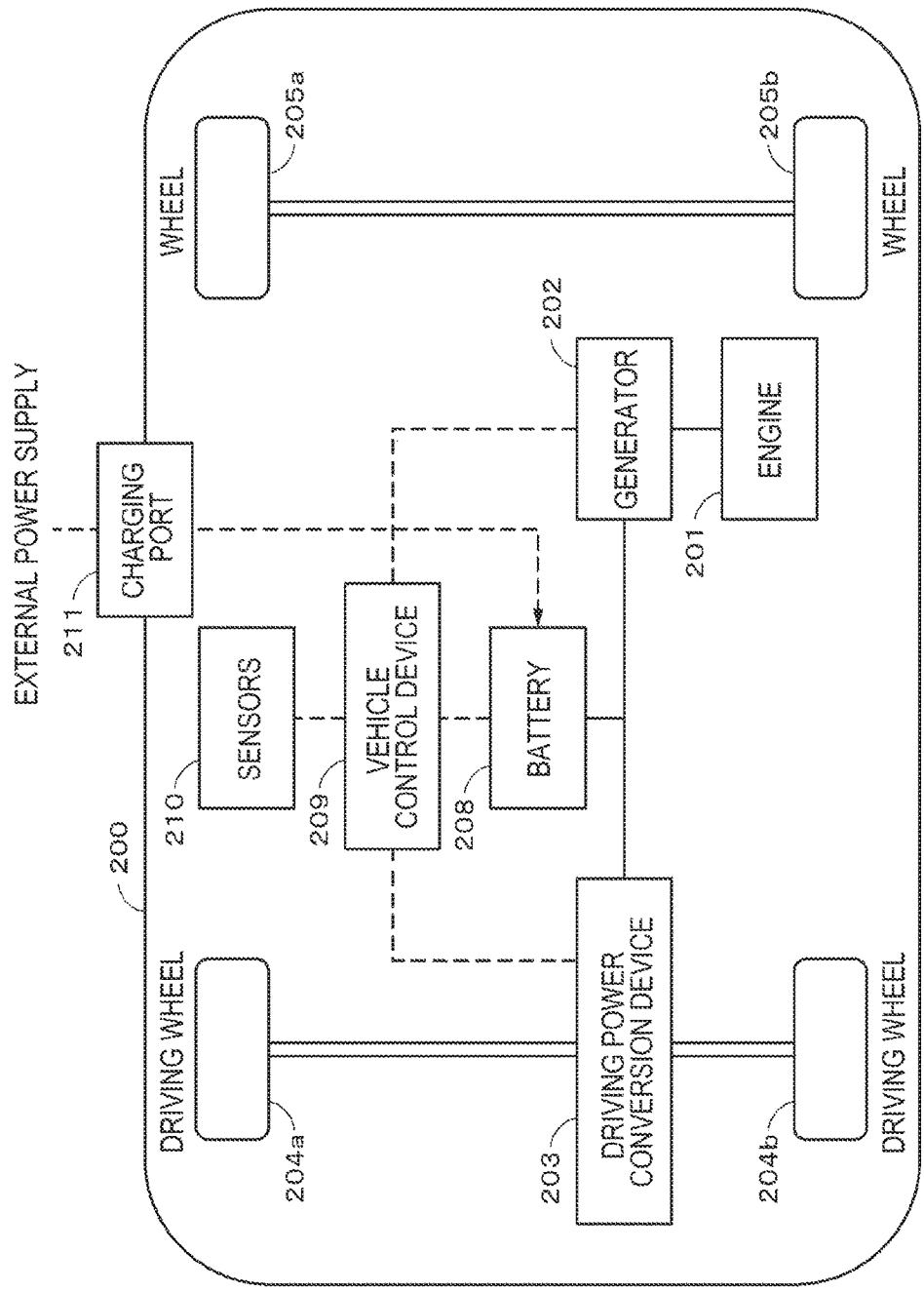
FIG. 32 is a schematic diagram schematically illustrating an example of a configuration of a hybrid vehicle where a series hybrid system to which the present technology is applied is used.

An example in which the present technology is applied to an electricity storage system for a vehicle will be described with reference to FIG. 32. FIG. 32 schematically illustrates an example of a configuration of a hybrid vehicle employing a series-hybrid system to which the present technology is applied. The series-hybrid system is a vehicle using power generated by a generator driven by an engine or power obtained by temporarily storing the generated power in a battery, and being driven by an electric power/driving power converter.

The hybrid vehicle 200 has mounted thereon an engine 201, a generator 202, an electric power/driving power conversion device 203, a driving wheel 204a, a driving wheel 204b, a wheel 205a, a wheel 205b, a battery 208, a vehicle control device 209, various sensors 210, and a charging port 211. The battery of the present technology described above is applied to the battery 208.

The hybrid vehicle 200 travels using the electric power/driving power conversion device 203 as a power source. An example of the driving power conversion device 203 is a motor. The electric power/driving power conversion device 203 is activated by power from the battery 208, and the torque of the electric power/driving power conversion device 203 is transmitted to the driving wheels 204a and 204b. Note that DC-AC conversion or inverse conversion (AC-DC conversion) can be used where necessary, so that the electric power/driving power conversion device 203 can be applied to either of an AC motor and a DC motor. The various sensors 210 control the engine revolving speed via the vehicle control device 209, and control the opening (throttle position) of a throttle valve (not shown). The various sensors 210 include a speed sensor, an acceleration sensor, an engine speed sensor, and the like.

The torque of the engine 201 is transmitted to the generator 202, and power generated by the generator 202 according to the torque can be stored in the battery 208.

When the hybrid vehicle 200 is decelerated by a not-shown brake mechanism, the resistance during the deceleration is applied to the electric power/driving power conversion device 203 as a torque, and regenerative electric power generated by the electric power/driving power conversion device 203 according to the torque is stored in the battery 208.

The battery 208 can also be connected to an external power supply of the hybrid vehicle 200, so as to receive power supply from the external power supply through the charging port 211, which is an inlet port, and store the received power.

Although not illustrated, an information processing device for processing information on vehicle control on the basis of information on a secondary battery may be provided. Such an information processing device may be an information processing device that indicates a remaining battery level on the basis of information about the remaining battery level.

Note that an example of a series-hybrid vehicle using power generated by the generator driven by the engine or power obtained by temporarily storing the generated power in the battery and being driven by a motor has been described above. The present technology, however, is also effectively applicable to a parallel-hybrid vehicle using power output from both of an engine and a motor as driving sources, and switching between three modes of being driven only by the engine, being driven only by the motor, and being driven by the engine and the motor. Furthermore, the present technology is also effectively applicable to a so-called electric-powered vehicle driven only by a drive motor without using an engine.

4. Modifications

While an embodiment of the present technology has been specifically described above, the present technology is not limited to the embodiment described above, but various modifications based on the technical idea of the present technology can be made. For example, the configurations, the methods, the processes, the forms, the materials, the numerical values, and the like exemplified in the above embodiment are only examples, and a configuration, a method, a process, a form, a material, a numerical value, and the like different therefrom may be used, as necessary.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Note that the present technology can also have the following configurations.

(1)

A battery including a wound electrode element in which a positive electrode and a negative electrode are wound with a separator therebetween, wherein the positive electrode has a positive electrode active material layer formed on a first face of a positive electrode current collector in an outer periphery of the wound electrode element, and has a first exposed surface where no positive electrode active material layer is formed on a second face of the positive electrode current collector, the negative electrode has a negative electrode active material layer formed on a first face of a negative electrode current collector in an outer periphery of the wound electrode element, and has a second exposed surface where no negative electrode active material layer is formed on a second face of the negative electrode current collector, and the first and second exposed surfaces face each other with the separator therebetween.

(2)

The battery described in (1), wherein a first coating material is provided on at least part of the first exposed surface or the second exposed surface in an outer periphery of the wound electrode element.

(3)

The battery described in (1) or (2), wherein the first coating material has at least a first base, and a product of a melting point of the first base and a thickness of the first base is smaller than 4.6[° C.·mm].

(4)

The battery described in (1), wherein the positive electrode has a third exposed surface where no positive electrode active material layer is formed on at least one face of a positive electrode current collector in an inner periphery of the wound electrode element, the negative electrode has a fourth exposed surface where no negative electrode active material layer is formed on at least one face of a negative electrode current collector in an inner periphery of the wound electrode element, and the third and fourth exposed surfaces face each other with the separator between the third and fourth exposed surfaces.

(5)

The battery described in (4), wherein a second coating material is provided on at least part of the third exposed surface of the fourth exposed surface.

(6)

The battery described in (5), wherein the second coating material has at least a second base, and a product of a melting point of the second base and a thickness of the second base is smaller than 14.0[° C.·mm].

(7)

The battery described in (1), wherein a facing part where the first and second exposed surfaces face each other includes a bent part, and when a length from a position in an electrode element width direction of a start of the facing part to a position in the electrode element width direction of a corner of the bent part as viewed toward a winding direction is defined as X, and a length from the position in the electrode element width direction of the corner of the bent part to a position in the electrode element width direction of an end of the facing part is defined as Y, a relation of $X \geq Y$ is satisfied.

(8)

The battery described in (1), wherein the battery includes an exterior member, and the exterior member is a laminated film.

(9)

The battery described in (1), wherein the positive electrode and the negative electrode each has an electrode lead, and a length of at least one of the electrode leads inside the wound electrode element is larger than a half of a height of the wound electrode element.

(10)

The battery described in (1), wherein the positive electrode and the negative electrode each has an electrode lead, a facing part where the first and second exposed surfaces face each other includes a bent part, at least one of the electrode leads is positioned so that a position in an electrode element width direction of the at least one of the electrode leads is between a position in the electrode element width direction of one end of the facing part and a position in the electrode element width direction of another end of the facing part.

(11)

A battery including a wound electrode element in which a positive electrode and a negative electrode are wound with a separator therebetween, wherein the positive electrode has a positive electrode active material layer formed on a first face of a positive electrode current collector in an outer periphery of the wound electrode element, and has a first exposed surface where no positive electrode active material layer is formed on a second face of the positive electrode current collector, and the first exposed surface faces an area of a negative electrode current collector with the separator between the first exposed surface and the area, the area being an area where no negative electrode active material layer is provided on both faces of the negative electrode current collector.

(12)

A battery including a wound electrode element in which a positive electrode and a negative electrode are wound with a separator therebetween, wherein the negative electrode has a negative electrode active material layer formed on a first face of a negative electrode current collector in an outer periphery of the wound electrode element, and has a second exposed surface where no negative electrode active material layer is formed on a second face of the negative electrode current collector, and the second exposed surface faces an area of a positive electrode current collector with the separator between the second exposed surface and the area, the area being an area where no positive electrode active material layer is provided on both faces of the positive electrode current collector.

(13)

A battery pack including:

the battery described in (1);

a control unit configured to control the battery; and an exterior member containing the battery.

(14)

An electronic device configured to receive power supply from the battery described in (1).

(15)

An electric vehicle including:

the battery described in (1);

a conversion device configured to receive power supply from the battery, and convert the power into driving power for a vehicle; and a control device configured to perform information processing on vehicle control on a basis of information on the battery.

(16)

An electricity storage device including the battery described in (1), and configured to supply power to an electronic device connected to the battery.

(17)

The electricity storage device described in (16), further including a power information control device configured to transmit a signal to or receive a signal from another device via a network, wherein the electricity storage device performs charge/discharge control of the battery on a basis of information received by the power information control device.

(18)

A power system that receives power supply from the battery described in (1).

(19)

The power system described in (18), wherein power is supplied to the battery from a power generator or a power grid.

REFERENCE SIGNS LIST

10 Wound electrode element
11 Positive electrode
11a Positive electrode current collector
11b Positive electrode active material containing coating film
12 Negative electrode
12a Negative electrode current collector
12b Negative electrode active material containing coating film
15 Separator
16 Positive electrode lead
17 Negative electrode lead
21 Non-aqueous electrolyte battery
22 Exterior member

The invention claimed is:

1. A battery comprising a wound electrode element in which a positive electrode and a negative electrode are wound with a separator therebetween,
wherein the positive electrode has a positive electrode active material layer formed on a first face of a positive electrode current collector in an outer periphery of the wound electrode element, and has a first exposed surface where no positive electrode active material layer is formed on a second face of the positive electrode current collector,
the negative electrode has a negative electrode active material layer formed on a first face of a negative electrode current collector in an outer periphery of the wound electrode element, and has a second exposed surface where no negative electrode active material layer is formed on a second face of the negative electrode current collector, and
the first and second exposed surfaces face each other with the separator therebetween.

2. The battery according to claim 1, wherein a first coating material is provided on at least part of the first exposed surface or the second exposed surface in an outer periphery of the wound electrode element.

3. The battery according to claim 2,
wherein the first coating material has at least a first base, and
a product of a melting point of the first base and a thickness of the first base is smaller than 4.6[° C.·mm].

4. The battery according to claim 1,
wherein the positive electrode has a third exposed surface where no positive electrode active material layer is formed on at least one face of a positive electrode current collector in an inner periphery of the wound electrode element,
the negative electrode has a fourth exposed surface where no negative electrode active material layer is formed on at least one face of a negative electrode current collector in an inner periphery of the wound electrode element, and
the third and fourth exposed surfaces face each other with the separator between the third and fourth exposed surfaces.

5. The battery according to claim 4, wherein a second coating material is provided on at least part of the third exposed surface of the fourth exposed surface.

6. The battery according to claim 5,
wherein the second coating material has at least a second base, and
a product of a melting point of the second base and a thickness of the second base is smaller than 14.0[° C.·mm].

7. The battery according to claim 1,
wherein a facing part where the first and second exposed surfaces face each other includes a bent part, and
when a length from a position in an electrode element width direction of a start of the facing part to a position in the electrode element width direction of a corner of the bent part as viewed toward a winding direction is defined as X, and a length from the position in the electrode element width direction of the corner of the bent part to a position in the electrode element width direction of an end of the facing part is defined as Y, a relation of $$X \geq Y$$

is satisfied.

8. The battery according to claim 1,
wherein the battery includes an exterior member, and the exterior member is a laminated film.

9. The battery according to claim 1,
wherein the positive electrode and the negative electrode each has an electrode lead, and
a length of at least one of the electrode leads inside the wound electrode element is larger than a half of a height of the wound electrode element.

10. The battery according to claim 1,
wherein the positive electrode and the negative electrode each has an electrode lead,
a facing part where the first and second exposed surfaces face each other includes a bent part,
at least one of the electrode leads is positioned so that a position in an electrode element width direction of the at least one of the electrode leads is between a position in the electrode element width direction of one end of the facing part and a position in the electrode element width direction of another end of the facing part.

11. A battery comprising a wound electrode element in which a positive electrode and a negative electrode are wound with a separator therebetween,
wherein the positive electrode has a positive electrode active material layer formed on a first face of a positive electrode current collector in an outer periphery of the wound electrode element, and has a first exposed surface where no positive electrode active material layer is formed on a second face of the positive electrode current collector, and
the first exposed surface faces an area of a negative electrode current collector with the separator between the first exposed surface and the area, the area being an area where no negative electrode active material layer is provided on both faces of the negative electrode current collector.

12. A battery comprising a wound electrode element in which a positive electrode and a negative electrode are wound with a separator therebetween,
wherein the negative electrode has a negative electrode active material layer formed on a first face of a negative electrode current collector in an outer periphery of the wound electrode element, and has a second exposed surface where no negative electrode active material layer is formed on a second face of the negative electrode current collector, and the second exposed surface faces an area of a positive electrode current collector with the separator between the second exposed surface and the area, the area being an area where no positive electrode active material layer is provided on both faces of the positive electrode current collector.

13. A battery pack comprising:
the battery according to claim 1;
a control unit configured to control the battery; and
an exterior member containing the battery.

14. An electronic device configured to receive power supply from the battery according to claim 1.

15. An electric vehicle comprising:
the battery according to claim 1;
a conversion device configured to receive power supply from the battery, and convert the power into driving power for a vehicle; and
a control device configured to perform information processing on vehicle control on a basis of information on the battery.

16. An electricity storage device comprising the battery according to claim 1, and configured to supply power to an electronic device connected to the battery.

17. The electricity storage device according to claim 16, further comprising a power information control device configured to transmit a signal to or receive a signal from another device via a network,
wherein the electricity storage device performs charge/discharge control of the battery on a basis of information received by the power information control device.

18. A power system that receives power supply from the battery according to claim 1.

19. The power system according to claim 18, wherein power is supplied to the battery from a power generator or a power grid.

* * * * *